US009106942B2

(12) United States Patent
Menon

(10) Patent No.: US 9,106,942 B2
(45) Date of Patent: Aug. 11, 2015

(54) METHOD AND SYSTEM FOR MANAGING DISPLAY OF PERSONALIZED ADVERTISEMENTS IN A USER INTERFACE (UI) OF AN ON-SCREEN INTERACTIVE PROGRAM (IPG)

(71) Applicant: Archana Vidya Menon, Bangalore (IN)

(72) Inventor: Archana Vidya Menon, Bangalore (IN)

( * ) Notice: Subject to any disclaimer, the term of this patent is extended or adjusted under 35 U.S.C. 154(b) by 0 days.

(21) Appl. No.: 13/947,246

(22) Filed: Jul. 22, 2013

(65) Prior Publication Data

US 2015/0026719 A1     Jan. 22, 2015

(51) Int. Cl.
| H04N 21/258 | (2011.01) |
| H04N 21/442 | (2011.01) |
| H04N 21/45 | (2011.01) |
| H04N 21/2668 | (2011.01) |
| H04N 21/24 | (2011.01) |
| H04N 21/81 | (2011.01) |

(52) U.S. Cl.
CPC ....... *H04N 21/2668* (2013.01); *H04N 21/2407* (2013.01); *H04N 21/25875* (2013.01); *H04N 21/812* (2013.01)

(58) Field of Classification Search
None
See application file for complete search history.

(56) References Cited

U.S. PATENT DOCUMENTS

| 6,687,906 B1 | 2/2004 | Yuen et al. |
| 6,799,326 B2 | 9/2004 | Boylan, III et al. |
| 7,653,923 B2 | 1/2010 | Flickinger |
| 8,321,889 B2 | 11/2012 | Wong et al. |
| 8,457,475 B2 | 6/2013 | Ellis et al. |
| 2002/0145621 A1* | 10/2002 | Nguyen ......................... 345/718 |
| 2003/0108227 A1* | 6/2003 | Philomin et al. ............... 382/124 |
| 2006/0013554 A1* | 1/2006 | Poslinski ......................... 386/46 |
| 2009/0204901 A1* | 8/2009 | Dharmaji et al. .............. 715/745 |
| 2010/0042485 A1* | 2/2010 | Wang et al. ................... 705/14.5 |

OTHER PUBLICATIONS

Huiying Liu, Qingming Huang, Changsheng Xu, Shuqiang Jiang, @ICT: Attention Based Virtual Content Insertion, MMSJ-D-10-00042, ICTAttentionBasedVirtualContentInsertion.PDF, p. 1-14, 2011, China.
Konstantinos Chorianopoulos, George Lekakos, Diomidis Spinellis, Intelligent User Interfaces in the Living Room: Usability Design for Personalized Television Applications, IntelligentUserInterfacesintheLivingRoom.PDF, p. 1-3, 2003, Greece.
Abhilashsa Mehta, Fontana Fitzwilson, Advertising Effectiveness on the Interactive Television Guide: Lessons Learned, advertisingeffectivenessontheinteractivetvguide.PDF, p. 1-5, October 2001, USA.
RGB Networks, Inc., Digital Program Insertion, DigitalProgramInsertion.PDF, pp. 1-10, 2006, USA.

* cited by examiner

*Primary Examiner* — Brian T Pendleton
*Assistant Examiner* — Jean D Saint Cyr

(57) ABSTRACT

A method and system for managing display of personalized advertisements in a user interface (UI) of an on-screen interactive program guide (IPG). The method comprises determining whether a user group of a current primary user matches with at least one of targeted user groups, selectively adding advertisement asset images corresponding to the matched user group into an advertisement bouquet, calculating a number of impressions of each of the advertisement asset images to display to the current primary user on a given day, calculating an advertisement sequence for each of the advertisement asset images to display to the current primary user on the given day, optimizing performance for delivery and display of the advertisement asset images and displaying the advertisement asset images during at least one of organizing, navigating, gifting, downloading and buffering at least one of AV and multimedia contents.

20 Claims, 28 Drawing Sheets

USER PROFILE 400

| Field | Value |
|---|---|
| NAME | XYZ |
| GENDER | MALE |
| DATE OF BIRTH | DD/MM/YYYY |
| MARITAL STATUS | MARRIED |
| EMPLOYMENT STATUS | EMPLOYED |
| HOUSEHOLD INCOME | $20000-$40000 |
| LOCATION | XCITY |
| PRIMARY LANGUAGE | ENGLISH |

EDIT    ADD USER    REGISTER    CANCEL

DD MM YYYY — TEMPERATURE °C — WELCOME USER | SIGN OUT
HH:MM:SS — XCITY, XCOUNTRY

| HOME | ADVERTISER | QUERY | REPORTS |

ASSET SUBMISSION FORM

- PRODUCT/SERVICE NAME: XYZ REAL ESTATE AGENCY
- MARKET SEGMENT: HIGH / MEDIUM / LOW
- CAMPAIGN DURATION: 05/02/2013 (START DATE) — 06/03/2013 (END DATE)
- ASSET PRIORITY: MEDIUM
- ASSET LANGUAGE: ENGLISH
- DISPLAY DURATION: 3 SECS
- TOTAL NUMBER OF IMPRESSION: 5000

TARGET AUDIENCE

- GENDER: MALE / FEMALE
- AGE GROUP: KIDS (6-12) / TEEN (13-21) / ADULT (22-35) / MATURE (36-60) / OLD (ABOVE 60)
- LOCATION: YCITY
- PROFESSION: HOUSEWIFE / STUDENT / SALARIED / BUSINESS / RETIRED / ANY
- HOUSEHOLD INCOME: < $3000 / $3000-$10000 / $10000-$20000 / $20000-$40000 / > $40000 / ANY

- TYPE OF PRIMARY ASSET: PICTURE / HORIZONTAL IMAGE
- ASSET SHAPE: 
- EXTENSION OF PRIMARY ASSET: JPEG — IMPORT FILE — CHOOSE FILE
- TYPE OF COMPANION ASSET: PICTURE
- EXTENSION OF COMPANION ASSET: JPEG — IMPORT FILE — CHOOSE FILE

SUBMIT ASSET

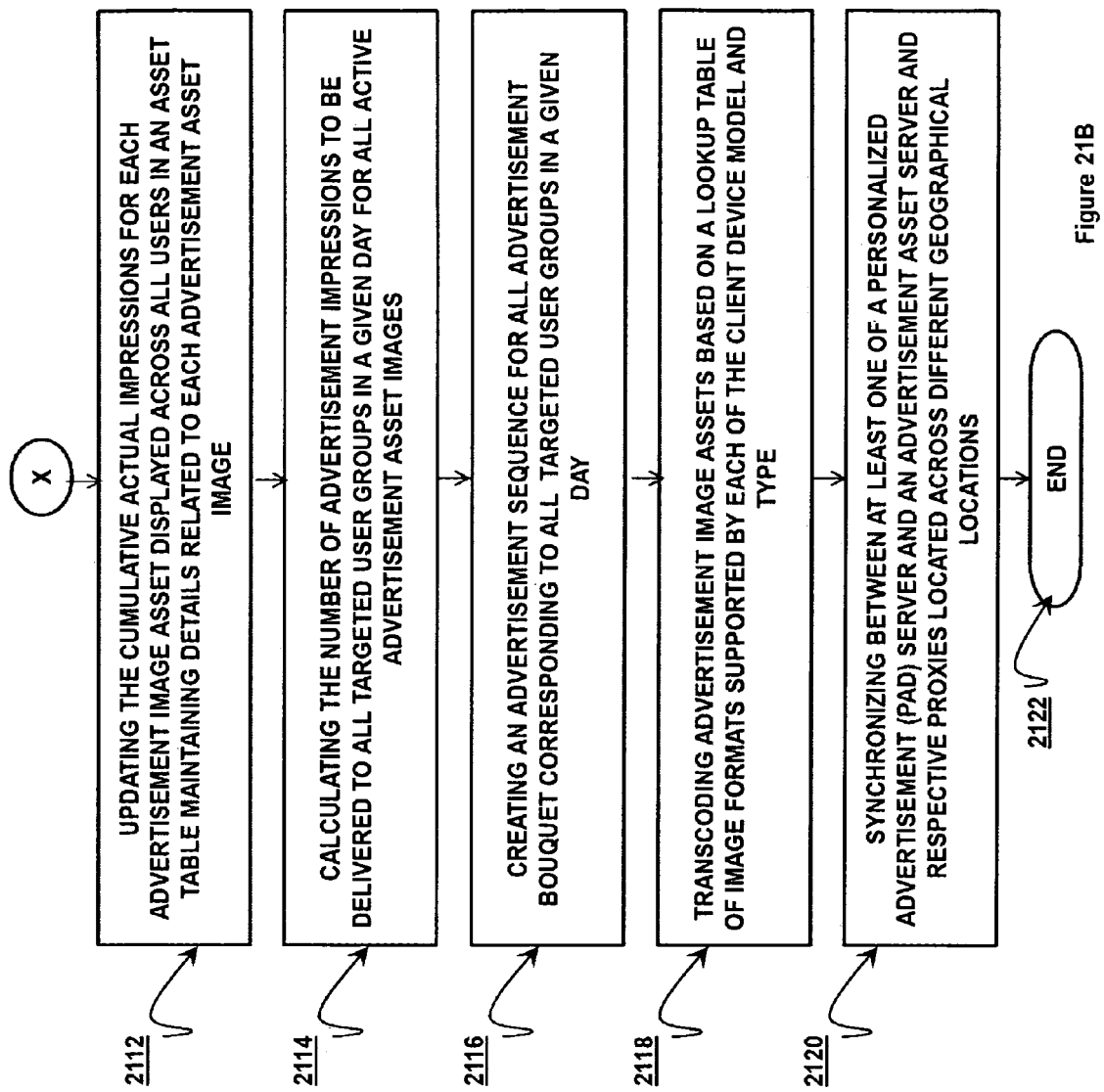

METHOD AND SYSTEM FOR MANAGING DISPLAY OF PERSONALIZED ADVERTISEMENTS IN A USER INTERFACE (UI) OF AN ON-SCREEN INTERACTIVE PROGRAM (IPG)

BACKGROUND OF THE INVENTION

1. Field of the Invention

Embodiments of the present invention generally relate to an on-screen interactive program guide (IPG), and more particularly, to managing display of personalized advertisements (PADs) in a user interface (UI) of an onscreen IPG.

2. Description of the Related Art

In general, television (TV) advertising outnumbers press and online advertising based on revenue earnings. As a result, nowadays TV advertisers are bound to advertise the same advertisements on multiple channels, i.e. inter-channel advertising, and also repeat the same advertisements multiple times on each of the channels, i.e. intra-channel advertising, to attract and gather maximum attention and eyeballs of the viewers. However, TV advertisers both strive and tend to spend money in an efficient manner to reach targeted audience belonging to a specific group of viewers so as to maximize the recall rate. In so doing, TV advertisers are, to some extent, capable of converting economically targeted advertisements into increased sales revenues and brand value.

One problem is that if conventional advertisement models are not customized and enhanced, TV advertisers may fail to attract and engage viewers to see advertisements relevant to the viewers. Another problem is that if money spent by TV advertisers fails to follow the eyeballs of viewers/customers, the TV advertisers may waste a lot of money and may eventually lose out in business.

Still another problem transpires if multiple system operators (MSOs)/local cable operators (LCOs), who in general merely aggregate and distribute AV contents, do not own any channel or contents. In the event that MSOs/LCOs do not own any channel or contents, MSOs/LCOs fail to get direct revenue from advertisements. Typically, a license agreement between MSOs/LCOs and channel/content owners is required if advertisements are displayed on full screen videos. In the event that the MSOs/LCOs do not own any channel or contents then entering into a license agreement to do advertisements with third (or $3^{rd}$) party content/channel owners is not an easy task for the MSOs/LCOs, since the content/channel owners prefer or ensure not to lose control over advertisement revenues, which drive the business of the content/channel owners.

Normally, it takes several years for MSOs/LCOs after launching a product, such as set top box (STB) or digital TV, to reach break-even because of the high infrastructure and CapEx costs of the head-end equipments, satellite transponders, modulators and the rest. Furthermore, only the subscription fee from subscribers/viewers is not sufficient to meet the costs or to make profits.

The overall number of viewers/users recording TV programs or interested in using various types of user interfaces (UIs) for navigating through the contents (or recorded and stored programs) using digital video recorders (DVRs) has been doubling year-on-year. The two-fold increase is because the viewers/users want to view/record and store programs anytime, as per the viewers/users convenience, schedule and availability therein.

Advertisers face additional risk as most users of DVRs fast-forward and skip the advertisements because the advertisements are interruptive in nature and are disliked by viewers, as it disturbs user's continuous viewing experience. Skipping advertisements by DVR viewers/users increase the wasteful spends of advertisers and further reduces the return on investment (ROI).

Therefore, there is a need in the art for a method and apparatus for managing dynamic insertion and display of personalized advertisements in a user interface (UI) of an on-screen interactive program guide (IPG) with enhanced targeting, personalization and interactivity.

SUMMARY

Embodiments of the invention generally relate to a method and system for managing display of personalized advertisements in a user interface (UI) of an on-screen interactive program guide (IPG) comprising determining whether a user group of a current primary user matches with at least one of targeted user groups, selectively adding advertisement asset images corresponding to the matched user group into an advertisement bouquet, calculating a number of impressions of each of the advertisement asset images to display to the current primary user on a given day, calculating an advertisement sequence for each of the advertisement asset images to display to the current primary user on the given day, optimizing performance for delivery and display of the advertisement asset images and displaying the advertisement asset images during at least one of organizing, navigating, gifting, downloading and buffering at least one of AV and multimedia contents.

BRIEF DESCRIPTION OF THE DRAWINGS

FIG. 4 depicts a pop-up on-screen display (OSD) user interface (UI) rendered on a client device for user profile registration with a PAD server, according to one or more embodiments;

FIG. 12 depicts UI of a web server for an advertiser to upload an advertisement asset;

Figure 1:
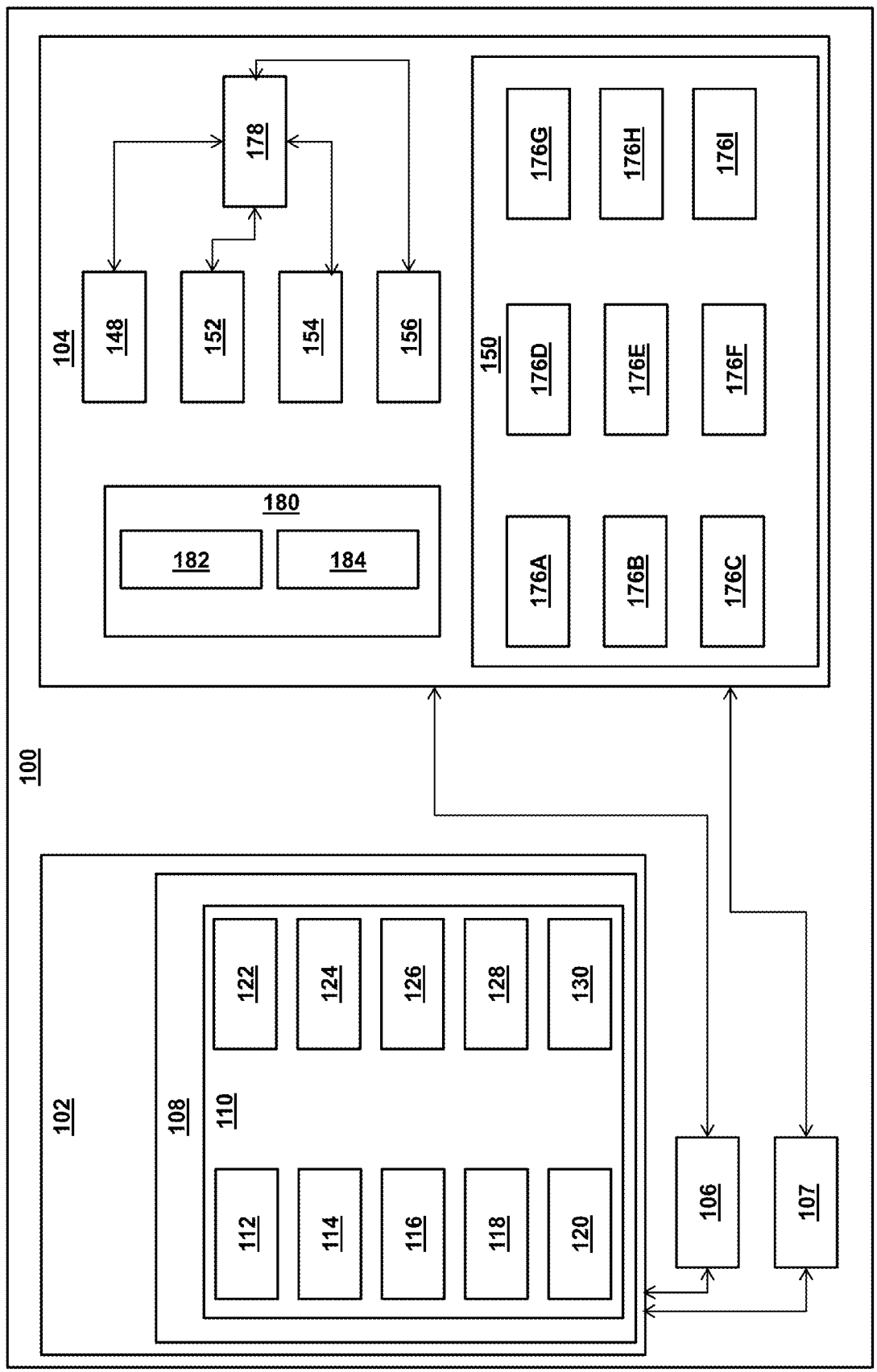
FIG. 1 depicts a block diagram of a system 100 for managing display of personalized advertisements (PADs) in a user interface (UI) of an on-screen interactive program guide (IPG), according to one or more embodiments.
Figure 22:
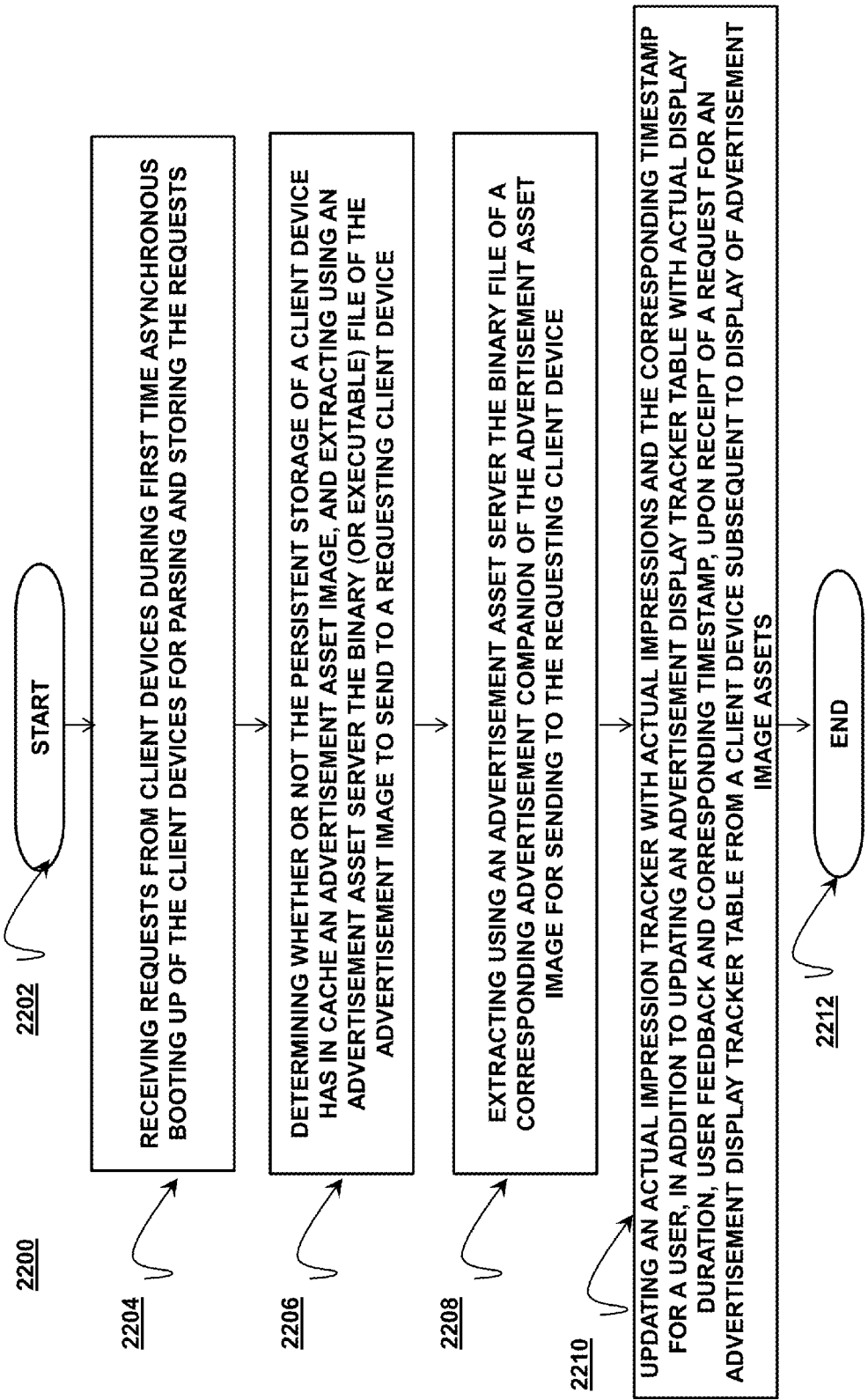
Figure 23:
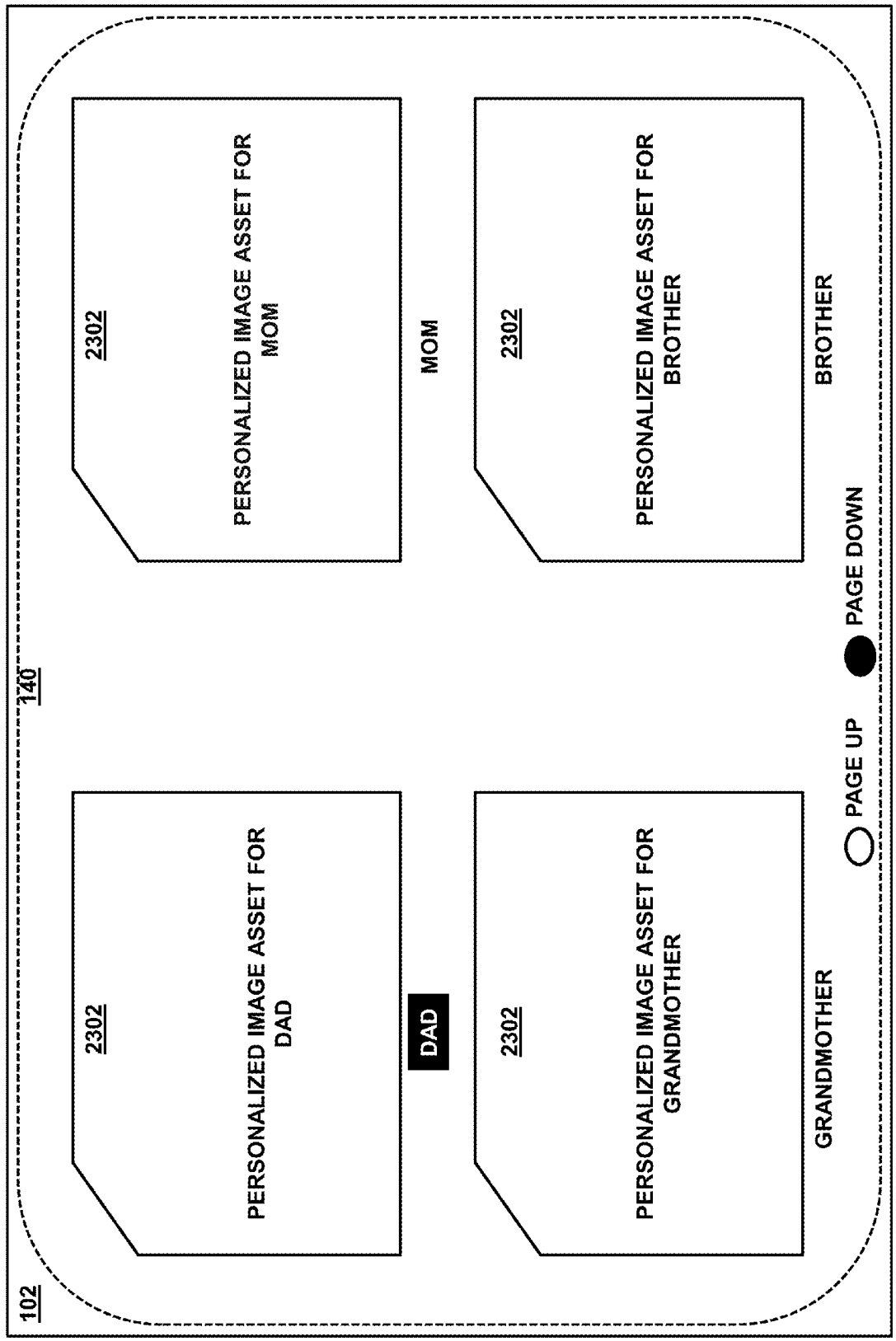
Figure 24:
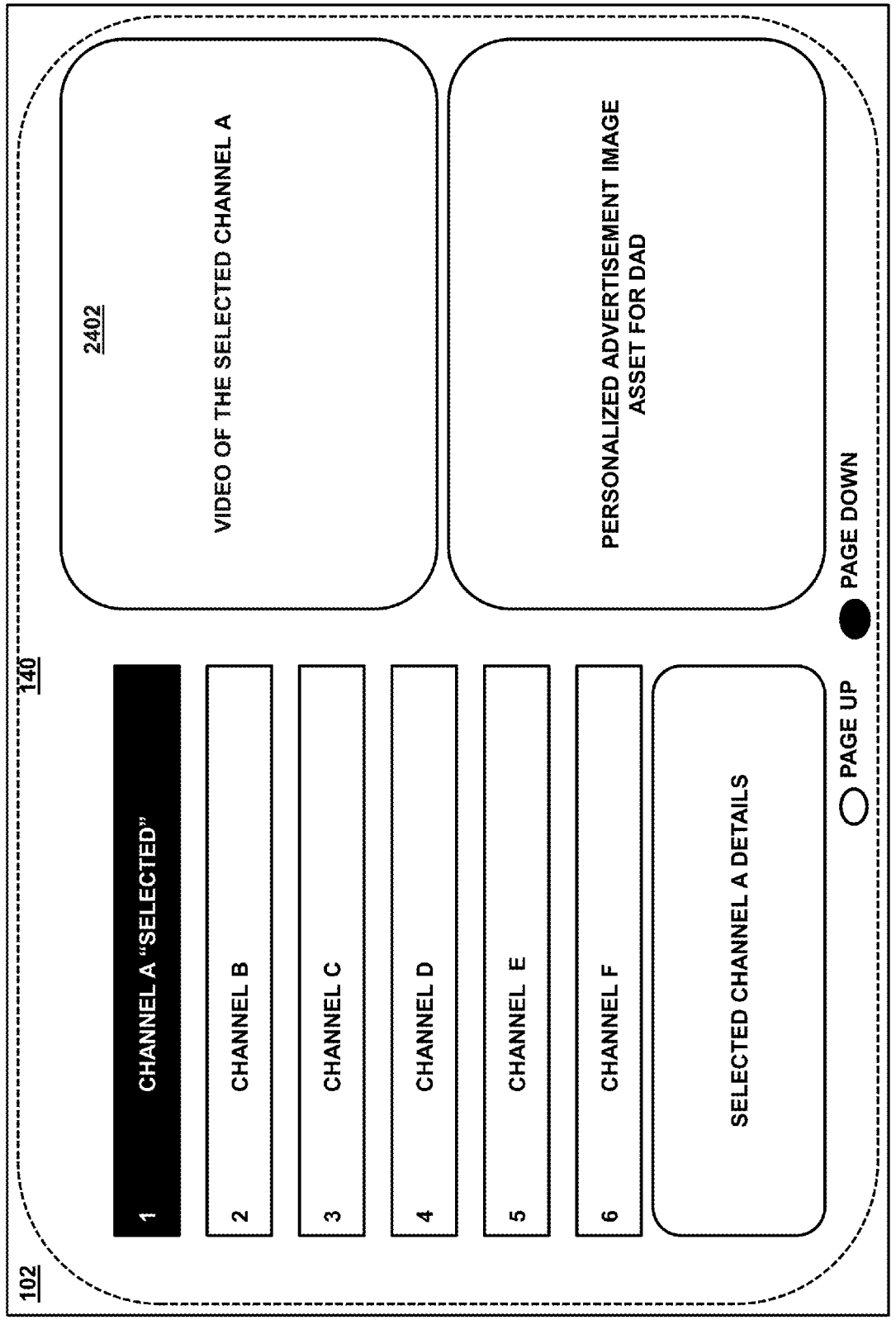
Figure 25:
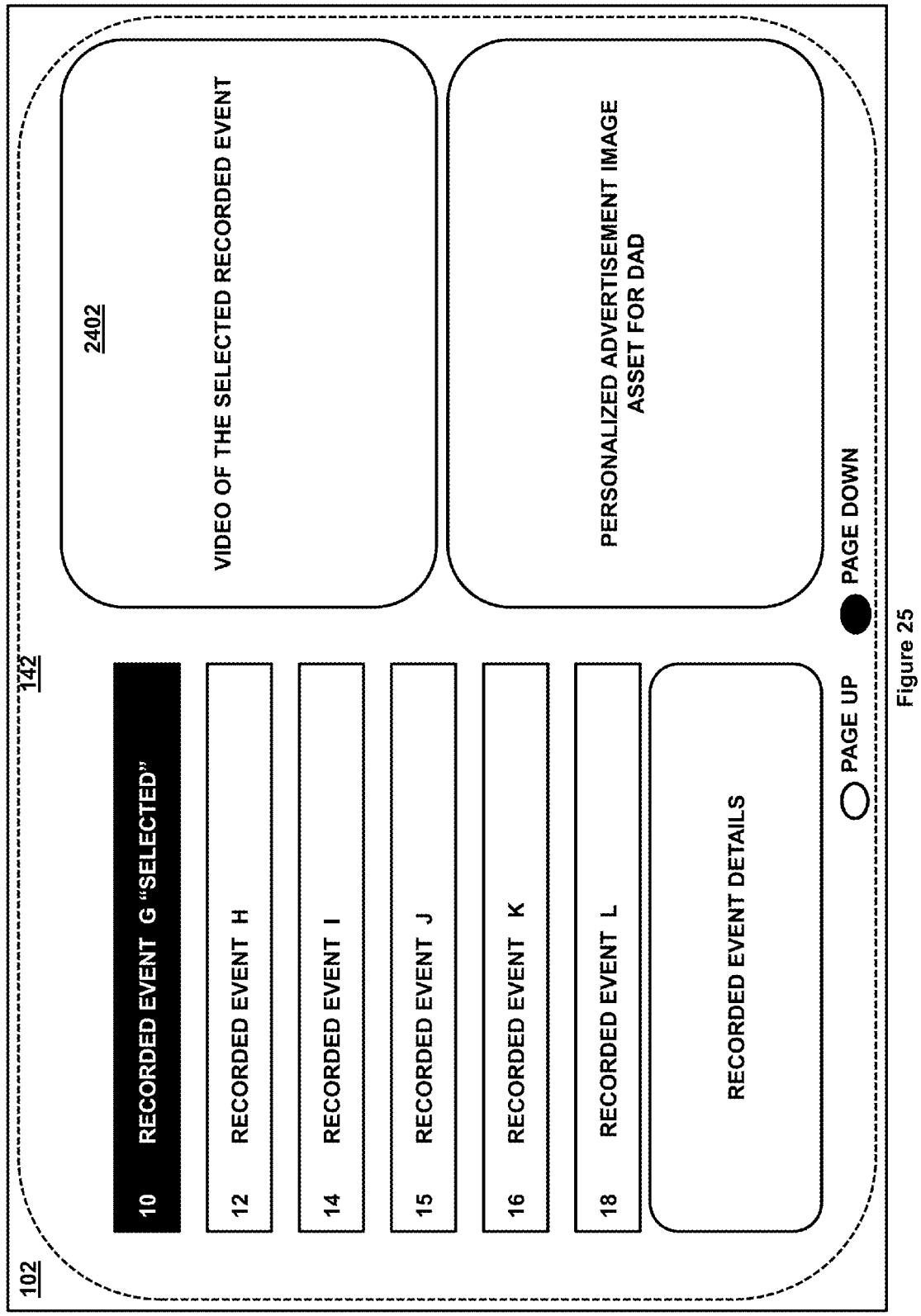
Figure 26:
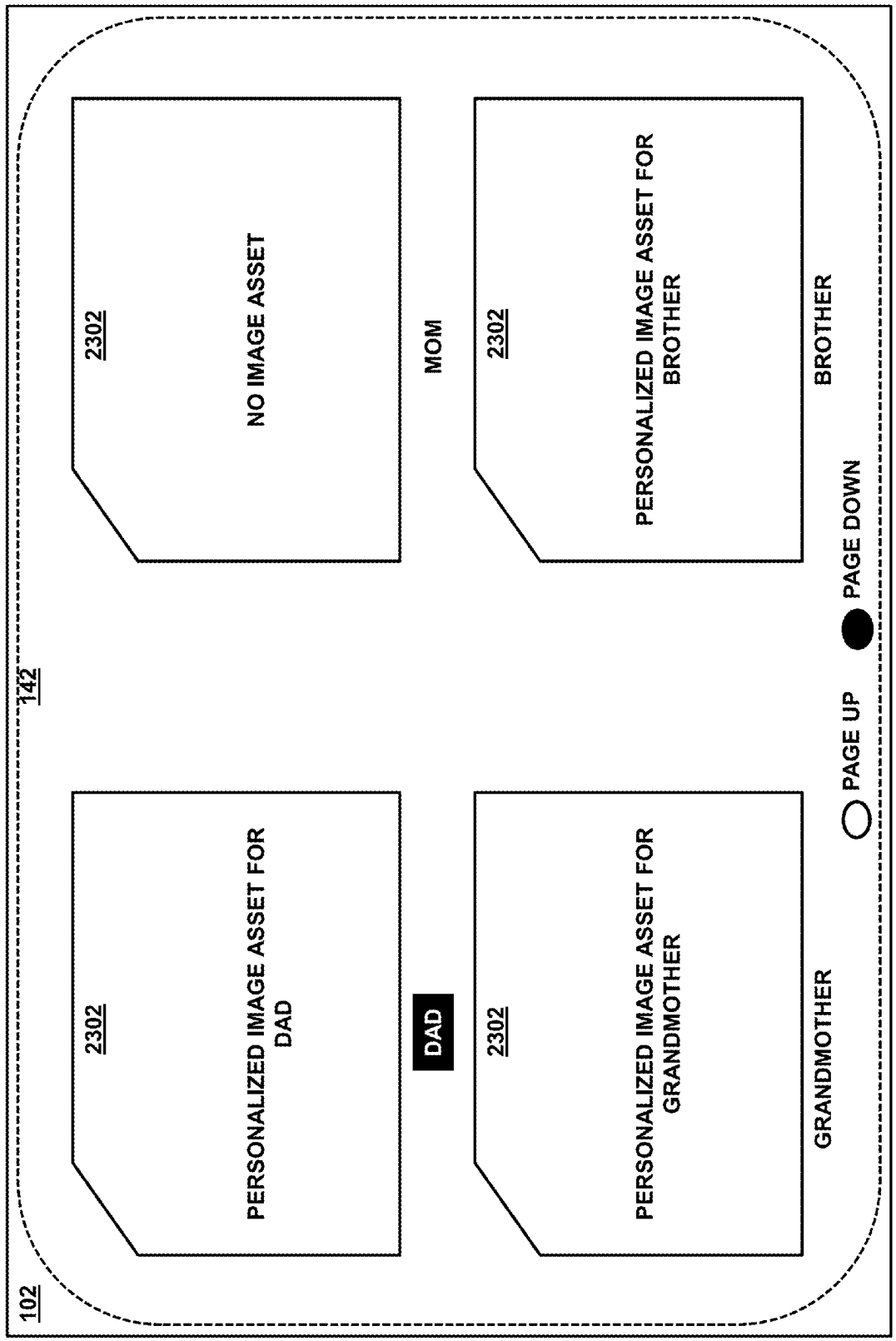
Figure 27:
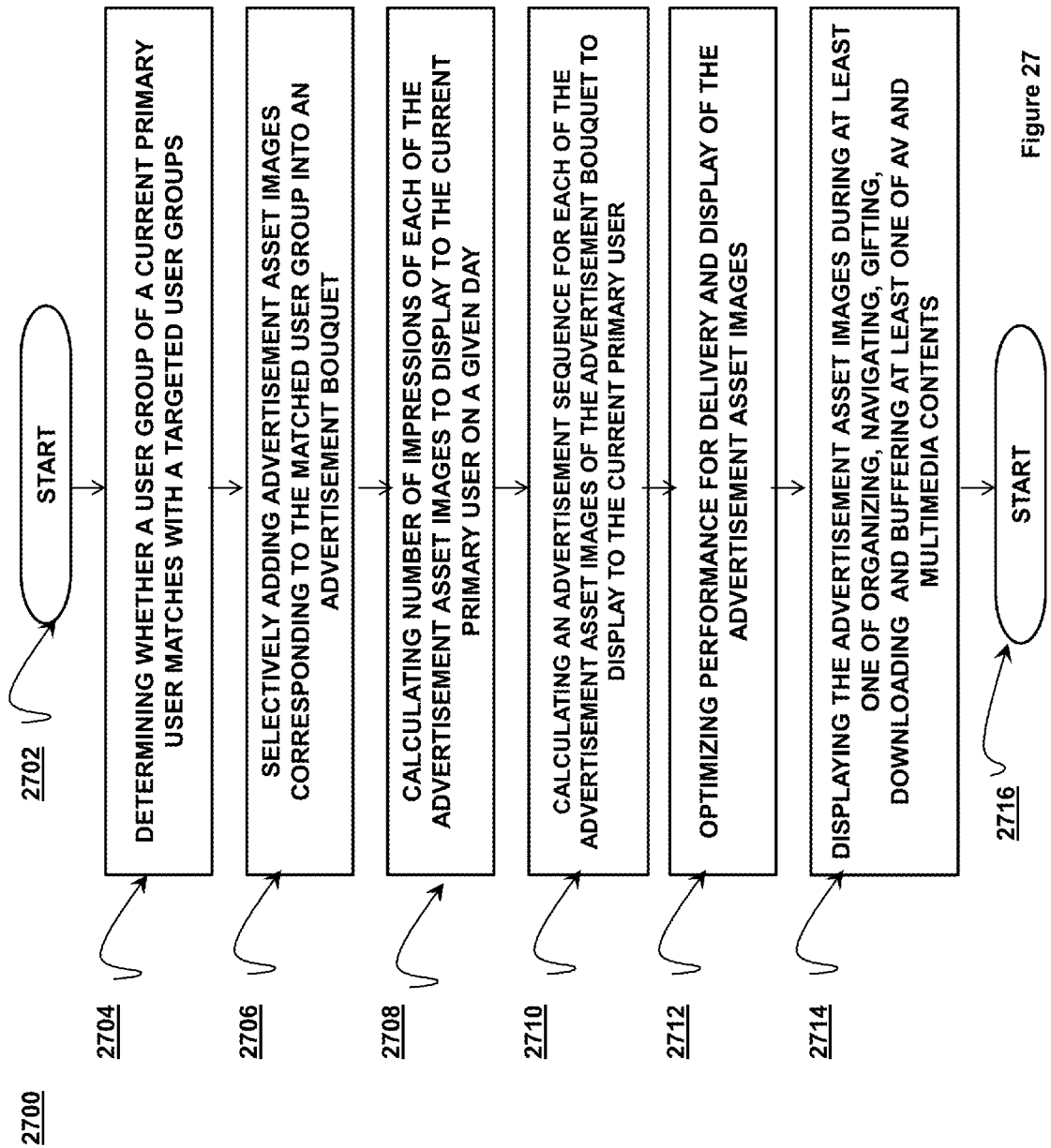

FIG(S). 21A-B is a flow diagram of a method 2100 for implementation of the first tier daily-based wakeup tasks, as performed by the routine wakeup tasks performance module 182, of FIG. 1, according to one or more embodiments;

FIG. 22 is a flow diagram of a method 2200 for implementation of the second tier dynamic on-the-fly (or real-time) tasks, as performed by the dynamic user request processing module 184, of FIG. 1, according to one or more embodiments;

FIG. 23 depicts advertisement images displayed on folder icons in at least one of a UI of a favorite channel list and recorded content organizer;

FIG. 24 depicts personalized advertisements for a specific user in a UI of a favorite channel list;

FIG. 25 depicts personalized advertisements for a specific user in a UI of a recorded content organizer;

FIG. 26 depicts the status of a folder icon for a specific user, who is unregistered or not derived or known, and thus belongs to an unidentified user group; and FIG. 27 depicts a flow diagram for a method 2700 for method for managing display of personalized advertisements in a user interface (UI) of an on-screen interactive program guide (IPG), according to one or more embodiments.

While the method and system is described herein by way of example for several embodiments and illustrative drawings, those skilled in the art will recognize that method and system for managing display of personalized advertisements in a user interface (UI) of an on-screen interactive program guide (IPG) is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of method and system for managing display of personalized advertisements in a user interface (UI) of an on-screen interactive program guide (IPG) defined by the appended claims.

DETAILED DESCRIPTION

Various embodiments of method and system for managing display of personalized advertisements in a user interface (UI) of an on-screen interactive program guide (IPG) are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing, data processing and analytics or related arts to convey the substance of their work to others skilled in the art. An algorithm is here, and is generally, considered to be a self-consistent sequence of operations or similar signal processing, data processing and analytics leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 depicts a block diagram of a system 100 for managing display of personalized advertisements (PADs) in a user interface (UI) of an on-screen interactive program guide (IPG), according to one or more embodiments.

The system 100 comprises a client device 102, a server subsystem 104 and a network subsystem 106. In some embodiments, the client subsystem 102 may be coupled to the server subsystem 104 through the network subsystem 106. Specifically, the client subsystem 102 is at least one of wiredly and wirelessly, communicably coupled to the server subsystem 104 through the network subsystem 106.

The network subsystem 106 comprises at least one of a content delivery network (CDN), Internet, television (TV) network, broadcast network, connected network and cloud-based network.

The client subsystem 102 comprises one or more client devices. In some embodiments, the one or more client devices 102 are at least one of Smart TV, Connected TV, Set-top-box (STB), Digital TV, Internet TV, Interactive TV, hybrid TV, PCTV and Hybrid Broadcast Broadband TV (HbbTV or H4TV). In some embodiments, at least one of the client devices 102 is a connected client device 102. In some embodiments, the connected client device 102 is a cloud client. In operation, the cloud client 102 relies on cloud computing for all or a majority of applications. In some scenarios, cloud applications do not require specific software on the cloud client 102 and instead use a web browser to interact with the cloud application. The connected client device 102 is coupled to the network subsystem 106. Specifically, the connected client device 102 is capable of communicating through the Internet using at least one of Internet Protocol (IP)-based connection and Data Over Cable Service Interface Specification (DOCSIS)-based cable return path. The connected client device 102 is capable of receiving at least one of audiovisual (AV) and multimedia contents through the Internet, decoding and rendering the received AV and multimedia contents that are viewable by end-users. In some embodiments, the at least one of AV and multimedia contents is at least one of Linear TV contents and contents recorded using at least one of digital video recorders (DVRs), STBs, Direct-to-videos (DTVs or D2Vs), Personal computers (PCs), tablets, mobiles, and the rest. The connected client device 102 is capable of providing Linear TV viewing, recording, playback and other facilities.

As depicted in FIG. 1, each of the client devices 102 comprises a software stack 108. The software stack 108 comprises a personalized advertisements plug-in (PAP) component 110. The PAP component 110 includes a personalized advertisement (PAD) rendering module 112, a personalized advertisement plug-in interface (PAPI) layer 114, an initialization module 116, a caching module 118, a statistical engine 120, a server communication module 122, for example a HTTP server communication module, an extensible markup language (XML) utility 124, a storage utility 126, a state machine module 128 and a personalized advertisements (PADs) glue interface layer 130, all of which facilitate fine tuning and display of targeted personalized advertisements to users.

As depicted in FIG. 1, the server subsystem 104 includes a PAD server 148, database (DB) server 150, for example MYSQL® DB server, advertisement asset server 152, a web server 154 and a billing server 156.

As used in the current context, the term "advertisement assets (or ad-assets)" refers to at least one of image advertisements of at least one of a Portable Network Graphics (PNG) and Joint Photographic Experts Group (JPEG) type, videos, animations, multimedia, for example, a combination of still images, animations and videos, shown as at least one of advertisement folder icons (or ad-folder icons), advertisement companions (or ad-companions) and gift wrapper advertisements (or gift wrapper ads).

As used in the current context, the term "advertisement folder icons (or ad-folder icons)" refers to advertisement images displayed on folder icons, for example during at least one of navigation and organizing at least one of AV and multimedia contents, based on a user.

The term "advertisement companion (or ad-companion)" refers to provision of supplementary information about a product advertised for a viewer to make purchase decisions. The ad-companion may be in the form of at least one of pictures, videos, URLs and a combination thereof.

As used herein, the term "gift wrapper advertisements" refer to advertisement images displayed upon selection, access and retrieval of a wrapped gift box icon representing a gift box enfolded with a gift wrapper for a virtual gift (or good). For example, a movie purchased by a user to give gift for another user.

The term "Model-View-Controller (MVC)" refers to an application architecture which separates the components of an application, namely a model, view and controller. The model represents the stored data used for business logic, the view represents user interface and the controller manages user input or, in some cases, the application flow, or implements the business logic.

In some embodiments, the server subsystem 104 comprises Model-View-Controller (MVC) framework based software 178. The Model-View-Controller (MVC) framework based software 178 is required to implement the system 100 and the methods therefor. The Model-View-Controller (MVC) framework based software 178 is installed in the PAD server 148, advertisement asset server 152, web server 154 and billing server 156 to optimize performance. The PAD server 148, advertisement asset server 152, web server 154 and billing server 156 communicate with each other using web services.

Figure 1A:
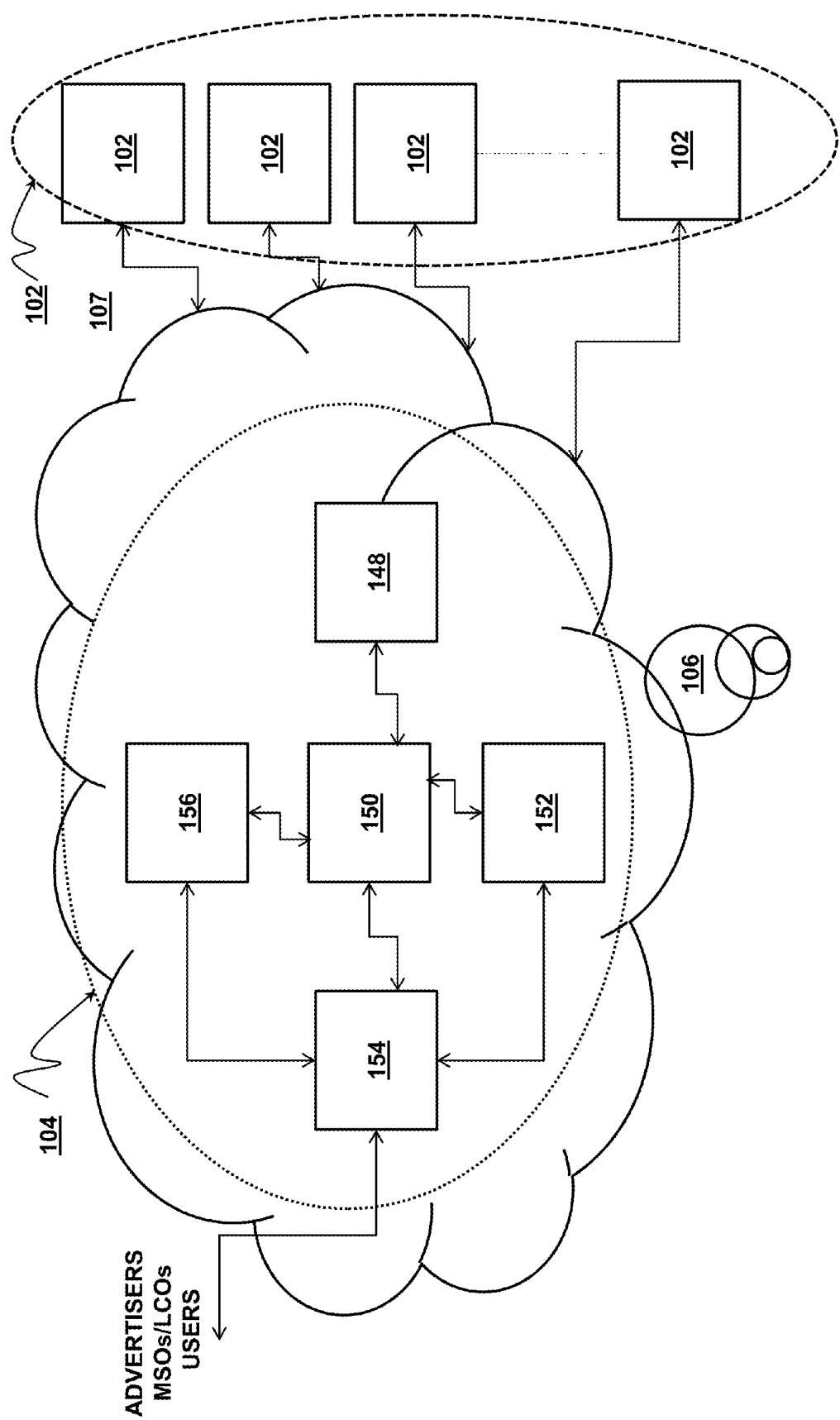
FIG. 1A depicts a top-level pictorial representation of the system 100, of FIG. 1.

FIG. 1A depicts a top-level pictorial representation of the system 100, of FIG. 1.

Figure 2:
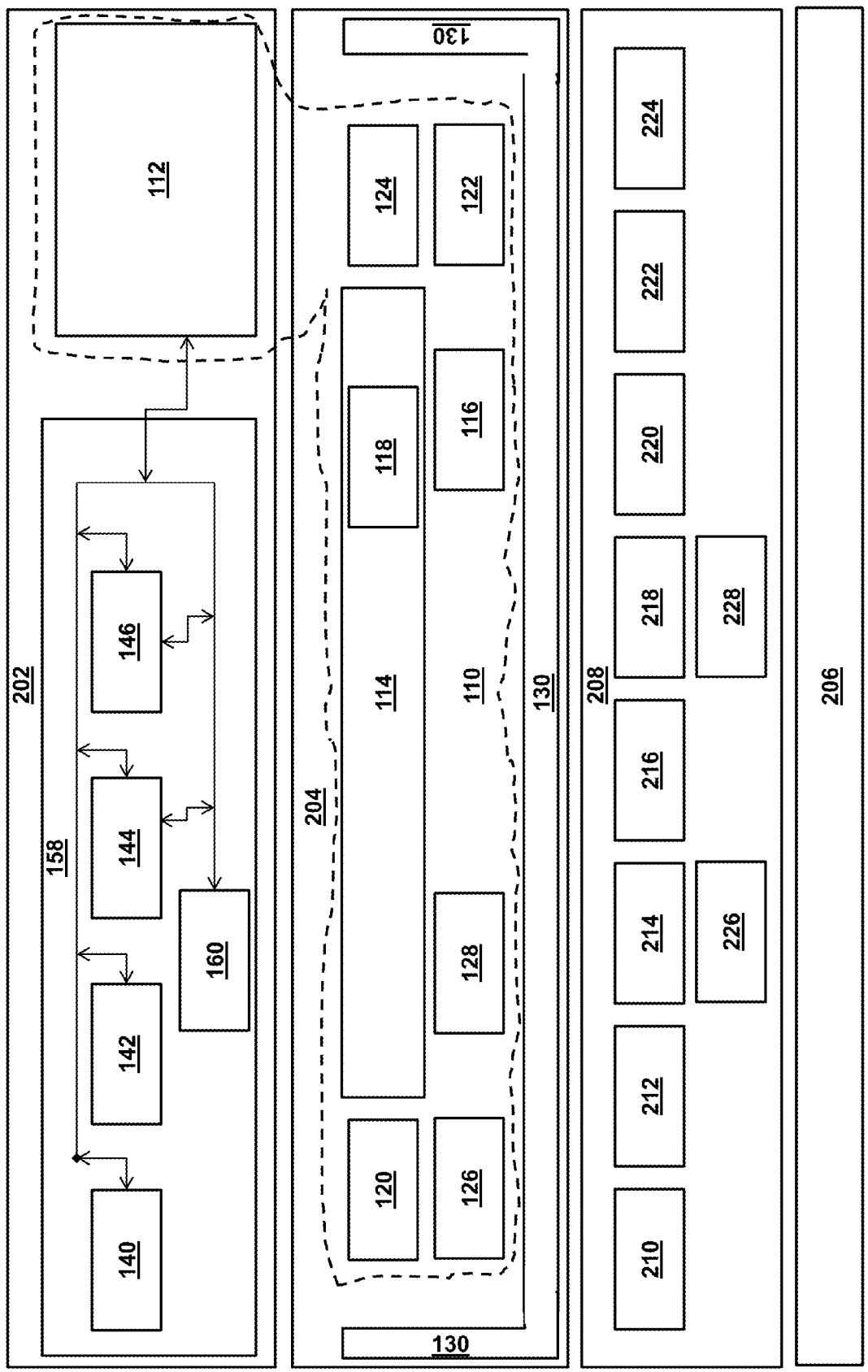
FIG. 2 depicts a block diagram for a logical three (3)-layer architecture for the PAP component.

FIG. 2 depicts a block diagram for a logical three (3)-layer architecture for the PAP component.

The logical three (3)-layer architecture 200 includes an application layer 202, a middleware layer 204 and a hardware (H/W) abstraction layer and device driver 206. The middleware layer 204 comprises one or more interfaces 208. As demarcated by dotted lines in FIG. 2, a PAP component, for example the PAP component 110 of FIG. 1, is spread across the application layer 202 and middleware layer 204 in software stacks, for example one or more of the software stack 108, of client devices, for example each of the one or more client devices 102, of FIG. 1. The PAP component 110 is a plug in to the middleware layer 204.

As depicted in FIG. 2, the application layer 202 comprises one or more host user interface (UI) applications 158, of FIG. 2, and a PAD rendering module, for example the PAD rendering module 112, of FIGS. 1 and 2.

As depicted in FIG. 2, the host UI applications 158 comprise a favorite channel list 140, recorded content organizer 142, AV/multimedia buffer/download on-screen display (OSD) UI 144, gift message OSD UI 146 and watch TV application 160, all of FIG. 2. Each of the host UI applications 158 comprises an instance of a PAD rendering module, for example the PAD rendering module 112, as depicted in FIG. 1.

As depicted in FIG. 2, the PAD rendering module 112 resides in each of the host UI applications 158.

In operation, for each of the host UI applications 158, the PAD rendering module 112, which resides in each of the host UI applications 158, displays personalized advertisements and the corresponding advertisement companion assets. Specifically, the PAD rendering module 112 displays personalized advertisements in at least one of the favorite channel list 140, recorded content organizer 142, AV/multimedia buffer/download OSD UI 144, gift message OSD UI 146 and watch TV application 160 using a PAPI layer, for example the PAPI layer 114, of FIG. 1. The PAD rendering module 112 shares a user identifier (ID) from a currently active at least one of the host UI applications 158 with the PAPI layer 114. The PAD rendering module 112 requests the PAPI layer 114 for a personalized advertisement image corresponding to the user ID shared. The PAD rendering module 112 displays the personalized advertisement image provided by the PAPI layer 114, wherein the personalized advertisement image corresponds to the user ID shared. The PAD rendering module 112 notifies the PAPI layer 114 about the duration of display of the personalized advertisement image and a feedback of a user bearing the shared user ID. The information comprising the duration of display of the personalized advertisement image and the user feedback is converted into an XML request and sent to a PAD server through a server communication module in a client device. For example, the XML request is sent to the PAD server 148, of a server subsystem, for example the server subsystem 104, of FIG. 1, through the HTTP server communication module 122 of the PAP component 110 in the software stack 108 of the client device 102, of FIG. 1.

As shown in FIG. 2, the PAP component 110 and the PAD rendering module 112 are coupled through the PAPI layer 114.

The middleware layer 204 includes the initialization module 116, PAPI layer 114, caching module 118, statistical engine 120, server communication module 122, extensible markup language (XML) utility 124, storage utility 126, state machine module 128 and personalized advertisements (PADs) glue interface layer 130, all of the foregoing from FIG. 1.

The initialization module 116 transmits the capability information and device identification details of the client device 102 as a WHOAMI XML request during the first time booting up or startup of the client device 102 to the PAD server 148, as part of the subscriber registration. In response, the initialization module 116 receives a subscriber identifier (ID) from the PAD server 148, as part of the subscriber registration. Upon reception of the subscriber ID, the initialization module 116 sends one or more additional XML requests, for instance XML requests for placement opportunity information service (POIS) and an advertisement display tracker (ADT) table, for example the advertisement display tracker (ADT) table 176F (not explicitly shown and described hereat), of a MYSQL DB server, for example the MYSQL DB server 150, of FIG. 1, to the PAD server 148. The initialization module 116 receives and stores an advertisement sequence, uniform resource locators (URLs) and at least first three (3) advertisement images (or asset images), derived from the ranking indices of the advertisement asset images in the advertisement sequence for each user, in the persistent memory of the client device 102.

The term "Placement Opportunity Information Service (or POIS)" refers to a system or process that identifies and provides descriptions of placement opportunities for media, such as the space and time availability to dynamically insert advertisements. The POIS may contain requirements and attributes that can include which platforms may be used, ownership rights, licenses, and policies that are used to publish or coordinate the placement of media. Placement opportunities are content and UI specific so they can vary based on the type of broadcast network, geographic location, or other associated content or UI attributes, such as UI application version and client device type The term "WHOAMI" requests refer to requests received from one or more client devices, for example one or more of the client device 102, when the client devices 102 asynchronously boot-up for the first time. The WHOAMI requests are parsed and stored in a WHOAMI table, for example the WHOAMI table 176E (not explicitly shown and described hereat), of the MYSQL DB server 150, of FIG. 1.

The term "advertisement sequence (or adseq)" refers to a sequence in which image assets selected for a specific user belonging to (or from) a user group is displayed in UI screens. The advertisement sequence is created in one of the tasks of a first tier daily-based wakeup tasks (not explicitly shown and described hereat), as performed by a routine wakeup tasks performance module, for example the routine wakeup tasks performance module 182, of a performance optimization component, for example the performance optimization component 180, of FIG. 1, and stored in the MYSQL DB server 150.

The PAPI layer 114 is an abstracted application programming interface (API) layer present in the middleware layer 204, and used by the PAD rendering module 112 of the application layer 202 for personalized advertisements. The PAPI layer 114 fetches one or more stored advertisement asset images from the persistent memory of the client device 102, and provides the stored advertisement asset images to the PAD rendering module 112 based on an advertisement sequence.

The terms "advertisement asset image" and "advertisement image asset" have been used interchangeably hereinafter, and throughout the specification. However, in the context of the specification both the terms imply or refer to at least one of image advertisements of at least one of a Portable Network Graphics (PNG) and Joint Photographic Experts Group (JPEG) type, videos, animations, multimedia, for example, a combination of still images, animations and videos, shown as at least one of advertisement folder icons (or ad-folder icons), advertisement companions (or ad-companions) and gift wrapper advertisements (or gift wrapper ads).

The term "advertisement impression (or impression)" refers to display of an advertisement image (or advertisement image asset) for the complete planned duration to a targeted user.

As shown in FIG. 2, the caching module 118 is part of the PAPI layer 114. The caching module 118 accesses and traverses an advertisement sequence to find out the number of targeted impressions and the ranking index for each advertisement asset image in the advertisement sequence. The caching module 118 fetches (or retrieves) and stores (or caches) at least a first set of plurality of advertisement asset images based on the present positions (or ranking indices) of the advertisement asset images in the advertisement sequence, for example first three (3) advertisement asset images, during booting up of a client device, for example the client device 102, of FIG. 1. Each of the cached first three (3) advertisement asset images of the advertisement sequence is displayed. In some scenarios, upon displaying each of the cached first three (3) advertisement asset images in the advertisement sequence, at least one of next three (3) advertisement asset images in the advertisement sequence is found different from each of the cached first three (3) advertisement asset images. Consequently, at least one of the cached first three (3) advertisement asset images of the advertisement sequence with the lowest targeted impression and ranking index is displayed. Further, a new advertisement asset image is fetched from an advertisement asset server, for example the advertisement asset server 152, of FIG. 1. Still further, the at least one of the cached first three (3) advertisement asset images in the advertisement sequence with the lowest targeted impression and ranking index is replaced with the newly fetched advertisement asset image. The aforementioned steps of fetching and storing the first three (3) advertisement asset images in the advertisement sequence, displaying each of the cached first three (3) advertisement asset images, finding whether or not at least one of next three (3) advertisement asset images in the advertisement sequence is different from each of the cached first three (3) advertisement asset images, displaying at least one of the cached first three (3) advertisement asset images of the advertisement sequence with a lowest targeted impression and ranking index, fetching a new advertisement asset image from the advertisement asset server 152, replacing the at least one of the cached first three (3) advertisement asset images of the advertisement sequence with the lowest targeted impression and ranking index with the newly fetched advertisement asset image are repeated till at least one of the validity date and the targeted impressions for the day are completed.

In some embodiments, the latency to access and retrieve an advertisement asset image from the persistent memory of the client device 102 to a random access memory (RAM) is high. As a result, the caching module 118 may be customized to pre-fetch a next advertisement asset image, to be displayed, in the RAM to improve the performance. An advertisement sequence prepared by the PAD server 148 as part of the first tier daily-based wakeup tasks (not explicitly shown and described hereat), as performed by the routine wakeup tasks performance module 182 of the performance optimization component 180, of FIG. 1, ensures that advertisement asset images in an advertisement bouquet are from active campaigns only.

The term "advertisement bouquet (or ad bouquet)" refers to a set of advertisement image assets for a user group, competing for the same UI screen space and the same advertisement time slot.

The data from a statistical engine (or the statistical engine data), for example the data from the statistical engine 120 in the client device 102, of FIG. 1, is required to derive a user group from the viewing history and viewing habits of a user. The statistical engine data comprises the viewing history and viewing habits of a user (or users) collected by the statistical engine 120 in the client device 102. In some embodiments, the statistical engine 120 periodically sends user information to the PAD server 148, of FIG. 1. For example, the user information comprising the viewing history and habits of a user is sent every 1 hour to the PAD server 148. In some embodiments, the periodicity of transmission of the user viewing information to the PAD server 148 is configurable. In some embodiments, the user information comprises a subscriber and user identifier (ID), watch start time, watch end time, event genre and audio language. The terms "subscriber" and "user ID" refer to a subscriber and a user identifier of a primary user, who is controlling the client device 102 through a smart remote control, and watching programs/events on the client device 102. The term "watch start time or start time" refers to a start time of watching an event by a user in at least one of a given and configurable time period, for example 1 hour. The term "watch end time or end time" refers to an end time of watching an event by a user in at least one of a given and configurable time period, for example 1 hour. The term "event genre" refers to genres of events, for example news, fashion, comedy, and the rest, watched by a user in at least one of a given and configurable time period, for instance 1 hour. In some embodiments, if event genre is not available, the channel genre, such as sports, news and the rest, watched by a user in at least one of a given and configurable time period, for instance 1 hour. The term "audio language" refers to language of an event watched, for English, Chinese, Malay and so forth, by a user in at least one of a given and configurable time period, for example 1 hour.

The statistical engine 120 in the client device 102 uses details of viewed events and channels provided by a state machine module, for example the state machine module 128 in the client device 102, of FIG. 1. The stored statistical engine data in the RAM of the client device 102 is sent to the PAD server 148 and the previously stored statistical engine data is flushed from the RAM of the client device 102. The statistical engine 120 manages the details of viewed events and channels by creating and maintaining a statistical engine table. For example, the statistical engine table 176B (not explicitly shown and described hereat), of the MYSQL DB server 150, comprising the details of viewed events and channels along with the respective timestamps is stored in the RAM of the client device 102 for a certain time period, for example 1 hour.

In some embodiments, the difference between hourly start and end times of watching for or over a configurable period of time, for example 3-6 months, is aggregated to calculate the average watched duration per day for each user (or per user), for a specific subscriber ID for a household. The genres watched by a user are ranked based on the average watched duration per day. One or more parameters are used for profiling a user and to identify a user group to which the profiled user belongs to. For example, one or more top ranked genres, for example topmost three (3) genres, the average watched duration per day for each user (or per user) and days of watching of a user, and so on, are used for profiling the user and to identify the user group to which the user belongs to. Based on the days a user watches, for example at least one of weekdays and weekends, and duration of watching of the user, one or more attributes, such as gender, age, employment status and marital status, of the user are derived.

The server communication module 122 is responsible for Hypertext Transfer Protocol (HTTP) communication between a client device and a PAD server, for example the client device 102 and PAD server 148, of FIG. 1. For example, the HTTP communication facilitates exchange of XML messages, advertisement asset images, videos, and the like, between the client device 102 and PAD server 148. The server communication module 122 is capable of handling communication errors and performing appropriate corrective actions.

An XML utility, for example the XML utility 124 in the client device 102, of FIG. 1, parses XML responses, i.e. XML response messages, received from the PAD server 148. The XML utility 124 generates XML requests, i.e. XML request messages, from the client device 102. The XML request and response messages are communicated between the PAD server 148 and client device 102 through HTTP.

A storage utility, for example the storage utility 126 in the client device 102, of FIG. 1, provides application programming interfaces (APIs) for storing advertisement sequence, images, videos, uniform resource locators (URLs) data into the persistent storage of a client device, for example the client device 102. The initialization module 116, PAPI layer 114, caching module 118 and statistical engine 120 in the middleware layer 204 use the storage utility 126 to read/write from, or to, a persistent storage, for example a hard disk or flash memory. The storage utility 126 accesses the middleware layer 204 through a combined personalized advertisements (PADs) glue and interface layer, for example the combined personalized advertisements (PADs) glue and interface layer 130, of FIG. 1.

The state machine module 128 monitors one or more states of the client devices 102, and changes thereof, corresponding to at least one of user actions, such as a channel change, event change, UI application change, user change, audio language change, and so on. In some scenarios, upon a change in a given state of the client device 102, the state machine module 128 notifies the components of the PAP component 110, i.e. the PAD rendering module 112, PAPI layer 114, initialization module 116, caching module 118, statistical engine 120, server communication module 122, XML utility 124, storage utility 126, state machine module 128 and personalized advertisements (PADs) glue interface layer 130, about the change along with the data, such as an event genre, a channel name, an UI ID, an audio language.

For example, in some use case scenarios, a user changes from one channel, for instance SKY®, to another channel, for instance FOX®. Upon change from one to another channel by a user, the state machine module 128 notifies the statistical engine 120 that a channel change has occurred along with a new event name, new event genre and new channel name, for example FOX.

The PADs glue interface layer 130 abstracts APIs of the middleware layer 204. The APIs of the middleware layer 204 are used by the PAP component 110, so that the same PAP component 110 may be used across different types of client devices, for example one or more of the client device 102. In some embodiments, if the middleware layer 204 changes from one client device 102 to another, then only the implementation of the PADs glue interface layer 130 needs to be changed to ensure that the PAP component 110 is not changed.

In some embodiments, the middleware layer 204 comprises one or more interfaces 208. The interfaces 208 are required for the middleware layer 204 in the client device 102. For example, the interfaces 208 include a channel and an event change information 210, an event genre and a channel genre information 212, a user ID information 214, a UI screen ID information 216, an event name and a channel name 218, an event synopsis 220, an Event Information Table (EIT) information, i.e. schedule and EIT Present/Following (P/F) 222, a client device ID and a device model number 224, a Random Access Memory (RAM), persistent memory i.e. a Hard Disk Drive (HDD)/flash memory available for PADs 226 and storage APIs, display APIs, HTTP communication APIs, XML library support 228, as depicted in FIG. 2.

In some embodiments, each of the client devices 102 comprises a storage memory 162 (not shown here explicitly). In some embodiments, the storage memory 162 is external to each of the client devices 102. For example, recorded contents are stored in a cloud storage memory 162 of a cloud server or a networked DVR hard disk or Video/Video-on-Demand (VoD) servers.

In some embodiments, the PAD rendering module 112 displays personalized advertisements in at least one of the favorite channel list application 140, personalized recorded content organizer application 142, AV/multimedia buffer/download OSD UI application 144, gift message OSD UI application 146 and watch TV application 160, all of the foregoing of FIG. 2, using the PAPI layer 114, of FIG. 1. For each of the host UI applications 158, the PAD rendering module 112 is implemented to display personalized advertisements and corresponding advertisement companion assets.

Figure 3:
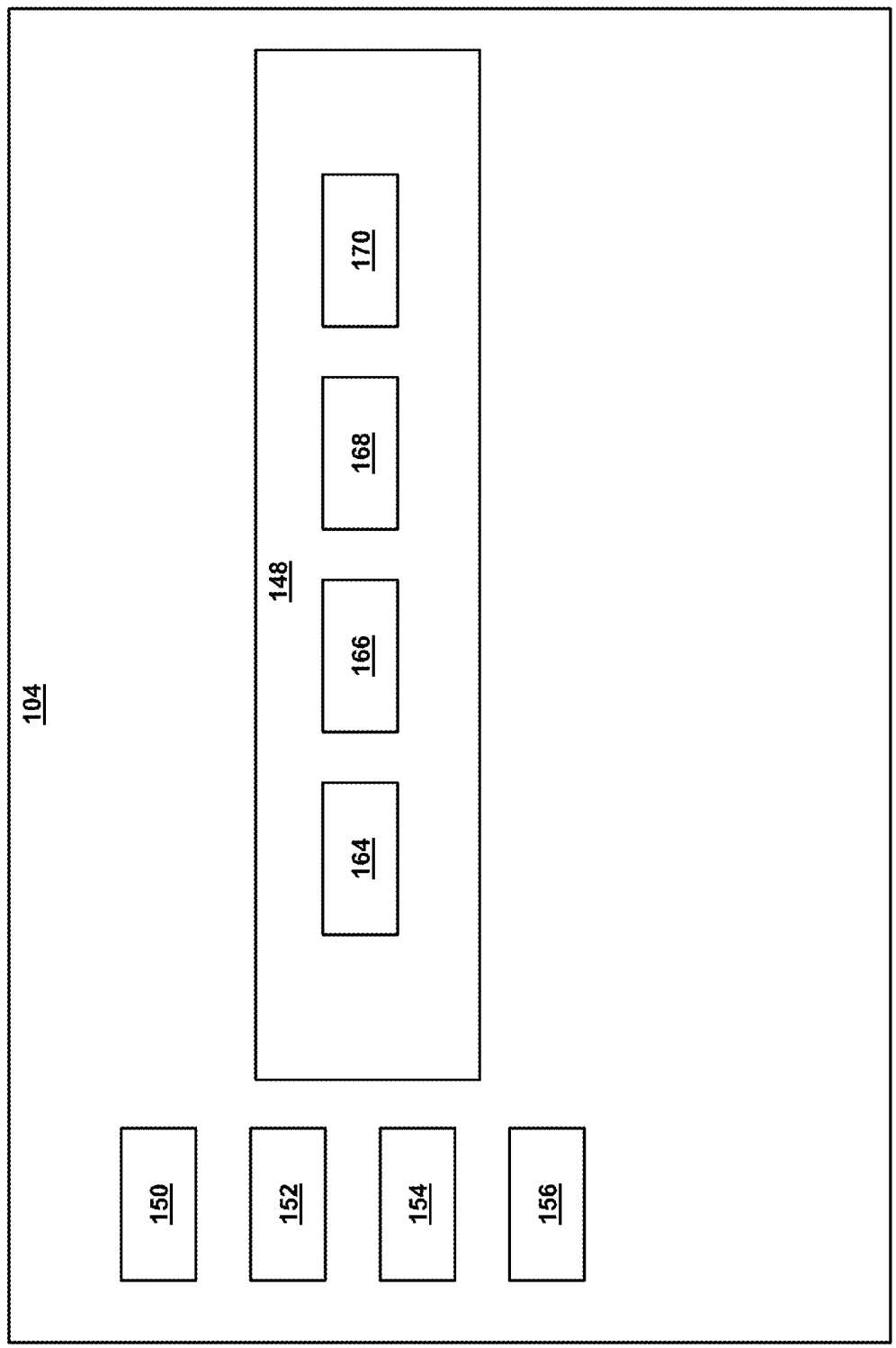
FIG. 3 depicts a detailed block diagram for a server subsystem and the components thereof.

FIG. 3 depicts a detailed block diagram for a server subsystem and the components thereof.

The server subsystem 104 includes the PAD server 148, database (DB) server 150, advertisement asset server 152, web server 154 and billing server 156, all of the foregoing of FIG. 1.

As shown in FIG. 3, the PAD server 148 includes an advertisement selection module (ASM) 164, a target impression calculation module 166, an advertisement sequence calculation module 168 and a XML communication module 170.

The advertisement selection module 164 selects an advertisement bouquet and advertisement sequence based on a user group to which a user currently watching a client device 102, of FIG. 1, belongs to, and a target user group based on target audience input provided by an advertiser, as depicted in FIG. 12.

FIG. 4 depicts a pop-up on-screen display (OSD) user interface (UI) rendered on a client device for user profile registration with a PAD server, according to one or more embodiments.

In some embodiments, during at least one of first time and subsequent installation of a client device, for example the client device 102 of FIG. 1, a user logs in and voluntarily registers his/her profile details with a PAD server, for example the PAD server 148, of FIG. 1, using the pop-up OSD UI 400. In some embodiments, an incentive in the form of discounted subscription fee is offered in the event that the user agrees to voluntarily register his/her profile details with the PAD server 148.

The term "primary user" refers to a user in a household controlling TV programs through a smart remote control. The term "secondary user(s)" refers to all other users in a group of users, comprising the primary user, watching the TV programs controlled by the primary user.

In some embodiments, at least one of fingerprint recognition (or authentication) on at least one of the frequently used keys in an advanced smart remote control facilitates identification of a primary user watching the AV content or TV program. As used in information security, the term "personally identifiable information (or PII)" refers to information that can be used solo or with other information to at least one of identify, contact, locate a single person and to identify an individual in context. The primary user information is sent to a statistical engine, for example the statistical engine 120 in the client device 102, of FIG. 1. In some embodiments, during user registration along with his/her profile details, the user also provides at least one of a fingerprint so that the user profile details along with his/her fingerprint is stored for subsequent reference and comparison in the client device 102. However, from the standpoint of information security, the fingerprint details of a primary user are considered as PII, and thus not sent to the PAD server 148. The fingerprint details of the primary user are only used locally in the client device 102 to identify user ID of the primary user controlling the client device 102. Upon identification of the primary user, the user ID of the primary user who is watching the client device 102 is sent to the PAD server 148. For example, the channel up/down remote key or other frequently used remote control keys have a finger print recognition algorithm built in the smart remote control of the client device 102.

Figure 13:
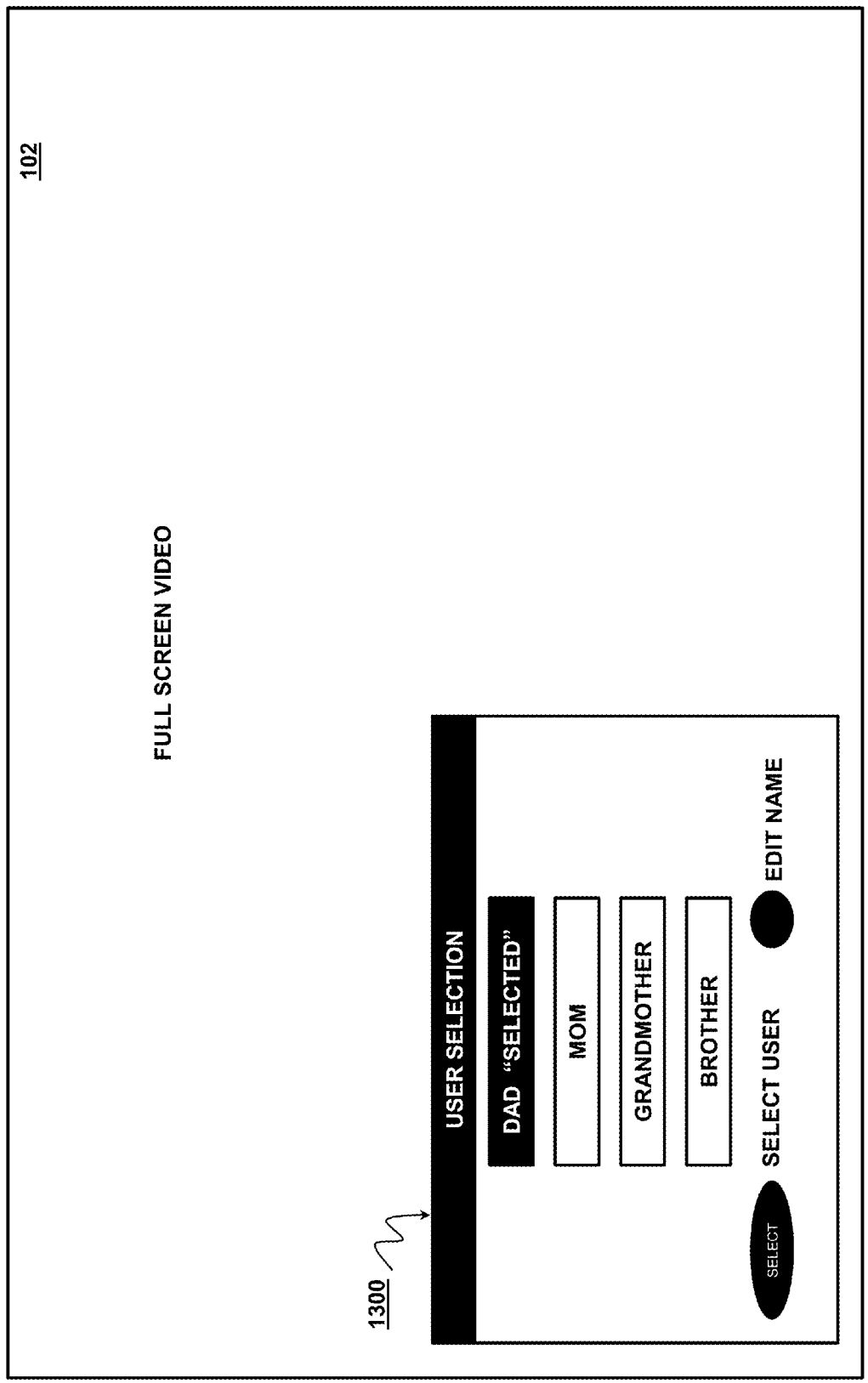
FIG. 13 depicts an on-screen user interface (UI) menu to simulate selection of a primary user, according to one or more embodiments.

FIG. 13 depicts an on-screen user interface (UI) menu to simulate selection of a primary user, according to one or more embodiments.

In some embodiments, the on-screen user interface (UI) menu 1300 facilitates at least one of modifying, i.e. changing from a currently existing primary user to a new primary user, and renaming currently existing username to a new username. It must be noted here that instead of sending the user name of the primary user watching the client device 102 to the PAD server 148, anonymous user ID information is sent to the PAD server 148. In some alternative embodiments, renaming currently existing username to a new username is used instead of finger print/facial image details.

In some embodiments, in the event that a primary user fails to give his/her user profile during installation and login using the pop-up OSD UI 400 of FIG. 4, then passive monitoring of the viewing behavior of the primary user is performed using a statistical engine, for example the statistical engine 120 in the client device 102, of FIG. 1.

In some embodiments, profile details of users in a household obtained from each client device 102 is sent to the PAD server 148. The PAD server 148 collates and stores the profile details of users into a DB server, for example the MYSQL DB server 150 of FIG. 1. The PAD server 148 identifies a user group to which each of the users in the household belongs to. In some embodiments, user groups are identified by deriving values of one or more attributes, such as gender, age group, income category, employment status, marital status, and so on, corresponding to each of the users in the user groups. An advertisement selection module, for example the advertisement selection module 164 of the PAD server 148, as depicted in FIG. 3, selects the advertisement assets for a user group based on one or more users currently using the client device 102.

Table 1 shows an exemplary tabular representation for an identifier of a user group. As shown in the Table 1, there are four columns each for one field or attribute of a user group, namely a marital status, an age group, an employment status, a gender and a household income.

| MARITAL STATUS | | AGE GROUP | | | | | EMPLOYMENT STATUS | | GENDER | | HOUSEHOLD INCOME | | |
|---|---|---|---|---|---|---|---|---|---|---|---|---|---|
| S | C | 1 | 2 | 3 | 4 | 5 | E | U | M | F | H | A | L |

Further, as shown in the Table 1, the marital status has at least one of a textual or alphabetical value "S" for users who are single and "C" for users who are committed. The age group has at least one of a numerical value "1" for users who are kids (or kid users), wherein ages of the users range from a minimum of approximately 6 years to a maximum of approximately 12 years, "2" for users who are teens (teen users), wherein ages of the users range from a minimum of approximately 13 years to a maximum of approximately 21 years, "3" for users who are youths (youth users), wherein ages of the users range from a minimum of approximately 22 years to a maximum of approximately 28 years, 4 for users who are adults (adult users), wherein ages of the users range from a minimum of approximately 29 years to a maximum of approximately 60 years, 5 for users who are old (old users), wherein ages of the users range from a minimum of approximately 60 years and above. The employment status has at least one of a textual value "E" for users who are employed and U for users who are unemployed. The gender has at least one of a textual value "M" for users who are male and "F" for users who are female. The household income has at least one of a textual value "H" for users who fall in high income group, "A" for users who fall in average income group and "L" for users who fall in low income group. Thus, for example, the term "C4EMH" refers to an identifier for a user group comprising married, adult, employed males with high household income. Likewise, for example, the term "2MA" refers to another identifier for a user group comprising teen, males with average household income.

In some embodiments, a survey is conducted over and across a given, selected sample set of a given, selected sample size comprising one or more diverse human subjects (or users) to capture, interpret and develop overall user profiles corresponding to the users, thereby facilitating design and implementation of a survey database 174 (not shown here explicitly). For example, the given, selected sample set includes 1000 diverse human subjects. In some embodiments, an overall user profile of a user comprises one or more sub profiles of the user corresponding to a biological, viewing activity and viewing interest profiles thereof.

In some embodiments, a survey questionnaire is constructed to build a survey database 174 (not shown here explicitly). The survey questionnaire comprises a series of queries for one or more human subjects (or users) comprising a given, selected sample set of a given, selected sample size. The sample questionnaire comprises one or more following queries, for example "What is your gender and age?" "Are you employed or not?," "Are you married or not?," "What is your annual income range?," "How many hours you watch TV during week days and weekends/holidays?," "At what time you watch TV during week day and weekends/holidays?," "Which are the top three (3) genres you like to watch?" and "Which are the top three (3) genres you do not like to watch?."

In some embodiments, a set of rules are derived from the survey database 174. A new survey of sufficient number of diverse human subjects is done at the location where the system 100 is installed, as the survey data is dependent on culture of people and the type of contents broadcasted in a geographical location. The derived set of rules is applied to overall viewing profile of a user obtained from a client device, for example the client device 102, of FIG. 1, to identify a user group for the user. For purposes of clarity and expediency, the derived set of rules are hereinafter referred to as RULES 1, 2, 3, 4, 5, 6, 7 and 8, in that order.

Figure 5:
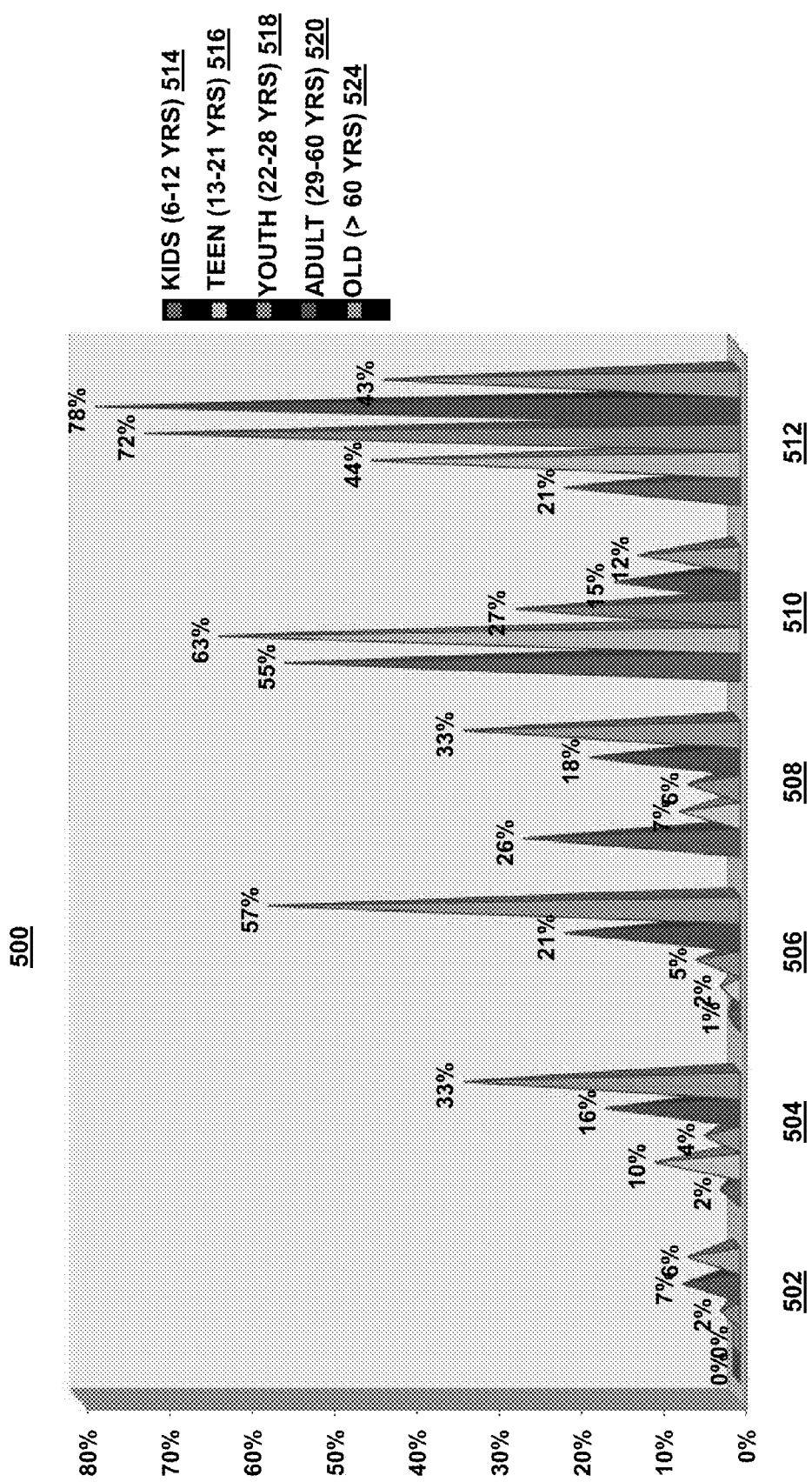
FIG. 5 depicts a first plot of percentage probabilities of TV watching time of males and females of different age groups on week days for different time slots.

FIG. 5 depicts a first plot of percentage probabilities of TV watching time of males and females of different age groups on week days for different time slots.

As depicted in FIG. 5, the first plot 500 for percentage probabilities of TV watching time of males and females of different age groups on week days for different time slots possess the following specifications and associated analytical information thereof: ordered pair is (time slot in 24 hour format, percentage probability of TV watching time); horizontal X-axis includes closed intervals in hours of time slots, namely a first time slot 502 ranging from a minimum of equal to 06:00 hrs to a maximum of equal to 08:00 hrs (or [6, 8]), a second time slot 504 ranging from a minimum of equal to 08:00 hrs to a maximum of equal to 11:00 hrs (or [8, 11]), a third time slot 506 ranging from a minimum of equal to 11:00 hrs to a maximum of equal to 14:00 hrs (or [11, 14]), a fourth time slot 508 ranging from a minimum of equal to 14:00 hrs to a maximum of equal to 16:00 hrs (or [14, 16]), a fifth time slot 510 ranging from a minimum of equal to 16:00 hrs to a maximum of equal to 19:00 hrs (or [16, 19]), a sixth time slot 512 ranging from a minimum of equal to 19:00 hrs to a maximum of equal to 23:00 hrs (or [19, 23]); vertical Y-axis includes a closed interval of percentage probabilities of TV watching time values ranging from a minimum of equal to 0% to a maximum of equal to 80%; analytical information is analysis of the first plot 500 for the percentage probabilities of TV watching time of males and females of different age groups on week days for different time slots; subject or volunteer information includes closed and partially closed/open intervals in years of males and females of different age groups, namely a kids age group 514 ranging from a minimum of equal to 6 years to a maximum of equal to 12 years, a teen age group 516 ranging from a minimum of equal to 13 years to a maximum of equal to 21 years, a youth age group 518 ranging from a minimum of equal to 22 years to a maximum of equal to 28 years, an adult age group 520 ranging from a minimum of equal to 29 years to a maximum of equal to 60 years and an old age group 522 ranging from a minimum of equal to 60 years and above.

The derived RULE 1 facilitates finding percentage probabilities of TV watching time of males and females of different age groups on week days for different time slots, based on analysis, observation and interpretation of the first plot 500, of FIG. 5. For example, in accordance with RULE 1, if the percentage probability of watching TV in a specific time slot is at least 20% more vis-à-vis other users in a household, then an age group of a user are derived, using the first plot 500, of FIG. 5.

Figure 6:
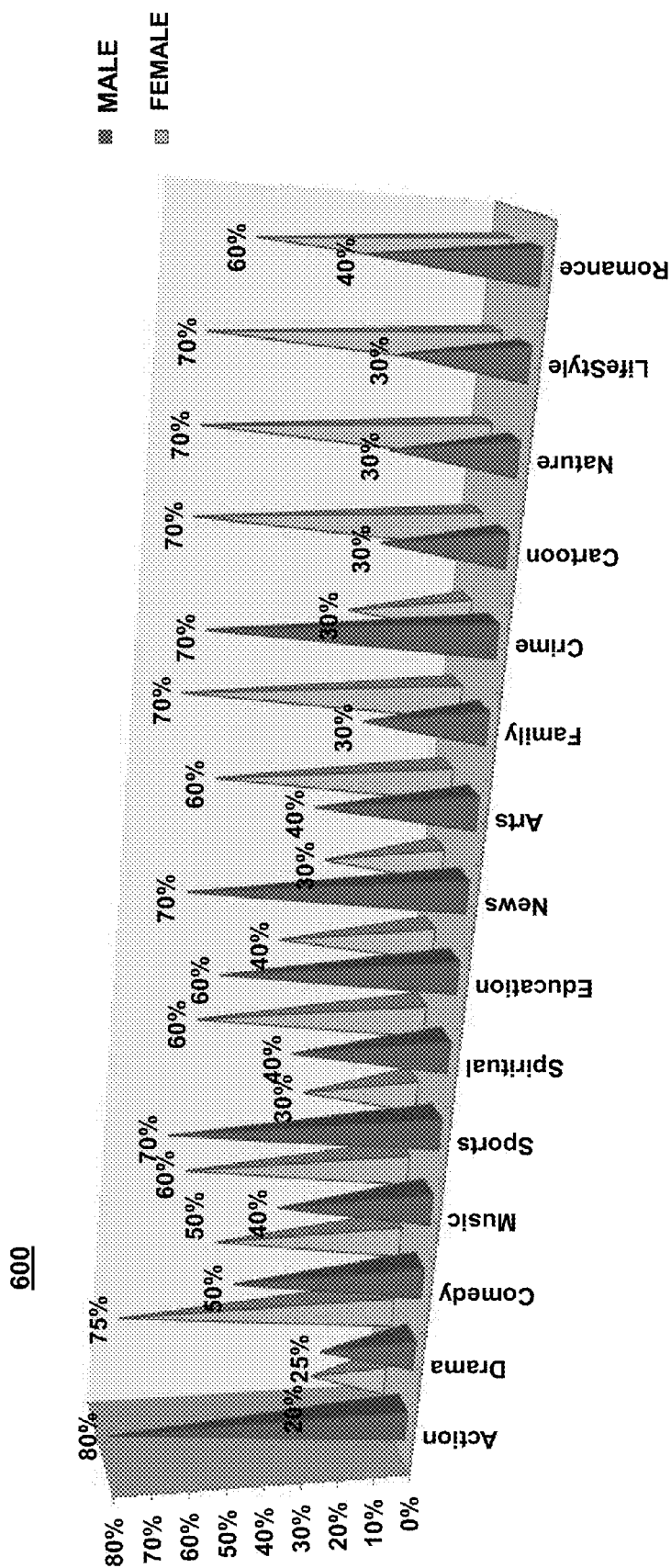
FIG. 6 depicts a second plot of percentage probabilities of TV watching time for event genres by males and females of different age groups, according to one or more embodiments.

FIG. 6 depicts a second plot of percentage probabilities of TV watching time for event genres by males and females of different age groups, according to one or more embodiments.

As depicted in FIG. 6, the second plot 600 for percentage probabilities of TV watching for event genres by males and females of different age groups possess the following specifications and associated analytical information thereof: ordered pair is (event genre, percentage probability of TV watching for event genres); horizontal X-axis includes one or more event genres, namely "action," "drama," "comedy," "music," "sports," "spiritual," "education," "news," "arts," "family," "crime," "cartoon," "nature," "lifestyle" and "romance"; vertical Y-axis includes a closed interval of percentage probabilities of TV watching for event genres ranging from a minimum of equal to 0% to a maximum of equal to 80%; analytical information is analysis of the second plot 700 for percentage probabilities of TV watching for event genres by males and females of different age groups; subject or volunteer information includes males and females of different age groups.

Figure 7:
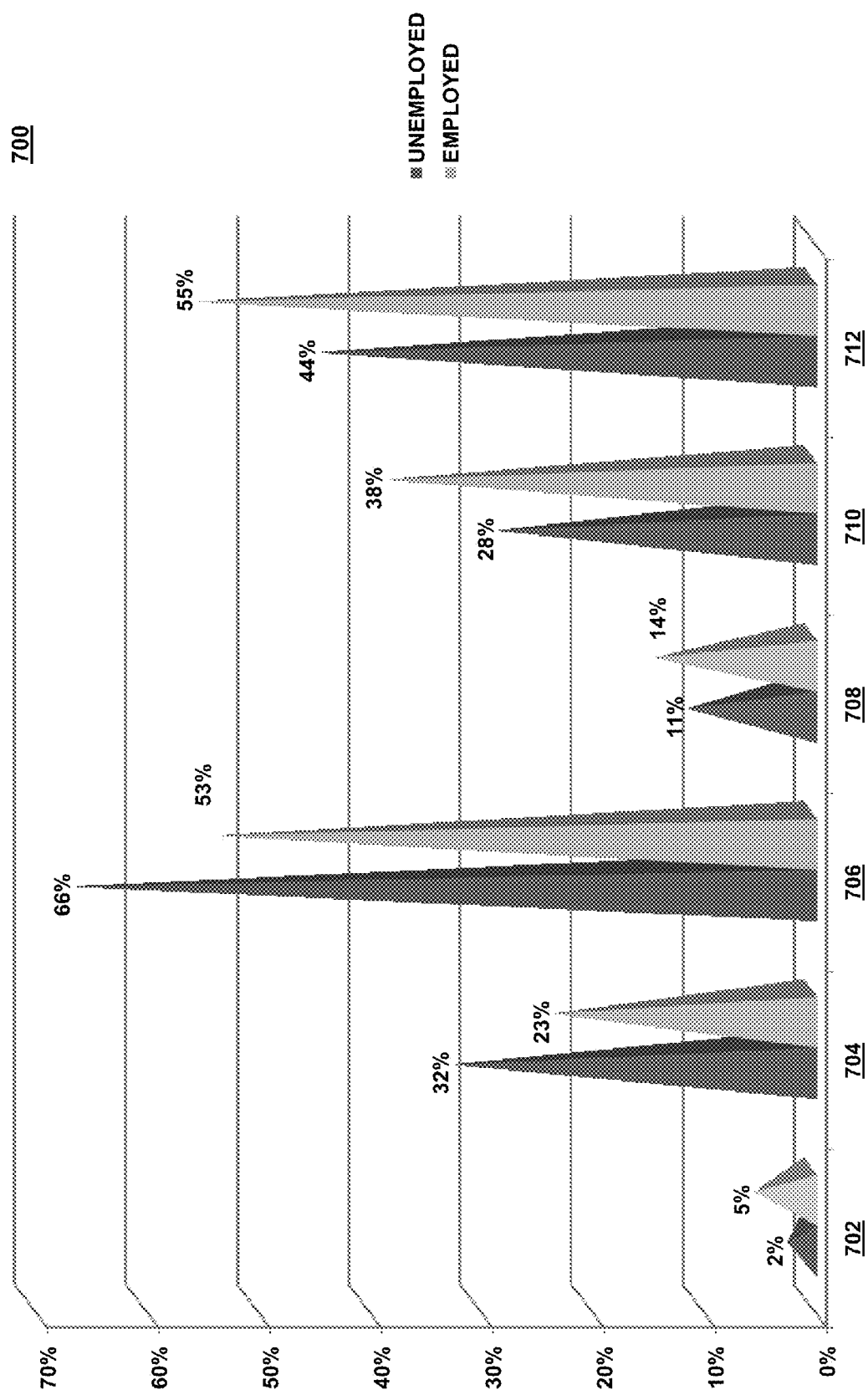
FIG. 7 depicts a third plot of percentage probabilities of TV watching time of at least one of unemployed and employed people of different age groups on weekdays.

FIG. 7 depicts a third plot of percentage probabilities of TV watching time of at least one of unemployed and employed people of different age groups on weekdays.

As depicted in FIG. 7, the third plot 700 for percentage probabilities of TV watching time of at least one of unemployed and employed people of different age groups on weekdays possess the following specifications and associated analytical information thereof: ordered pair is (time slot in 24 hr format, percentage probability of TV watching TV); horizontal X-axis includes closed intervals in hours of time slots, namely a seventh time slot 702 ranging from a minimum of equal to 06:00 hrs to a maximum of equal to 08:00 hrs (or [6, 8]), an eighth time slot 704 ranging from a minimum of equal to 08:00 hrs to a maximum of equal to 11:00 hrs (or [8, 11]), a ninth time slot 706 ranging from a minimum of equal to 11:00 hrs to a maximum of equal to 14:00 hrs (or [11, 14]), a tenth time slot 708 ranging from a minimum of equal to 14:00 hrs to a maximum of equal to 16:00 hrs (or [14, 16]), an eleventh time slot 710 ranging from a minimum of equal to 16:00 hrs to a maximum of equal to 19:00 hrs (or [16, 19]), a twelfth time slot 712 ranging from a minimum of equal to 19:00 hrs to a maximum of equal to 23:00 hrs (or [19, 23]); vertical Y-axis includes a closed interval of percentage probabilities of TV watching time ranging from a minimum of equal to 0% to a maximum of equal to 80%; analytical information is analysis of the third plot 700 for percentage probability of TV watching time of at least one of unemployed and employed people of different age groups on weekdays; subject or volunteer information includes unemployed and employed people of different age groups.

Figure 8:
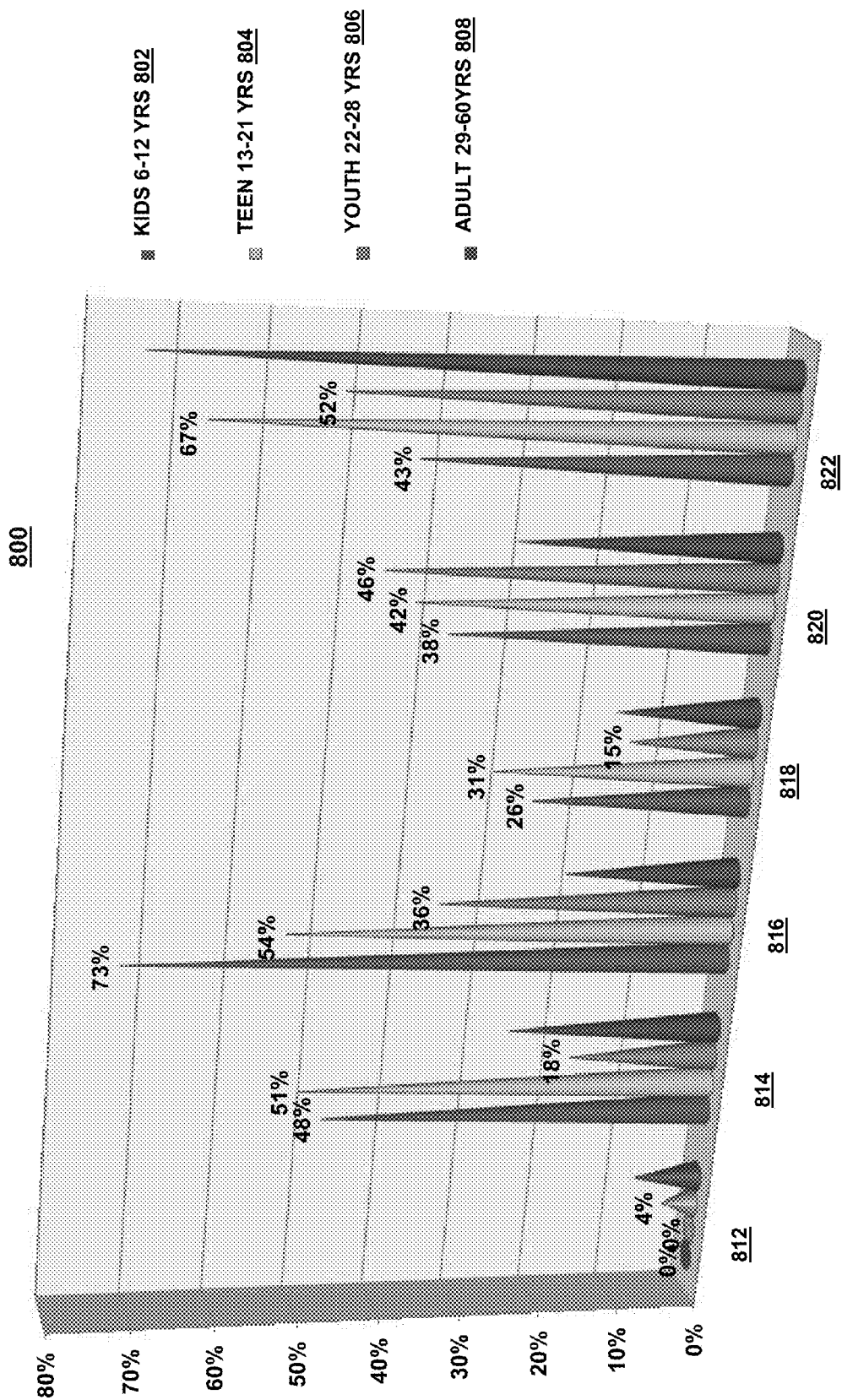
FIG. 8 depicts a fourth plot of percentage probabilities of TV watching time of people of different age groups on weekends.

FIG. 8 depicts a fourth plot of percentage probabilities of TV watching time of people of different age groups on weekends.

As depicted in FIG. 8, the fourth plot 800 for percentage probabilities of TV watching time of people of different age groups on weekends possess the following specifications and associated analytical information thereof: ordered pair is (time slot in 24 hr format, percentage probability of TV watching TV); horizontal X-axis includes closed intervals in hours of time slots, namely a thirteenth time slot 812 ranging from a minimum of equal to 06:00 hrs to a maximum of equal to 08:00 hrs (or [6, 8]), a fourteenth time slot 814 ranging from a minimum of equal to 08:00 hrs to a maximum of equal to 11:00 hrs (or [8, 11]), a fifteenth time slot 816 ranging from a minimum of equal to 11:00 hrs to a maximum of equal to 14:00 hrs (or [11, 14]), a sixteenth time slot 818 ranging from a minimum of equal to 14:00 hrs to a maximum of equal to 16:00 hrs (or [14, 16]), a seventeenth time slot 820 ranging from a minimum of equal to 16:00 hrs to a maximum of equal to 19:00 hrs (or [16, 19]), an eighteenth time slot 822 ranging from a minimum of equal to 19:00 hrs to a maximum of equal to 23:00 hrs (or [19, 23]); vertical Y-axis includes a closed interval of percentage probabilities of TV watching time ranging from a minimum of equal to 0% to a maximum of equal to 80%; analytical information is analysis of the fourth plot 800 for percentage probability of TV watching time of people of different age groups on weekends; subject or volunteer information includes people of different age groups includes closed and partially closed/open intervals in years of males and females of different age groups, namely a second kids age group 802 ranging from a minimum of equal to 6 years to a maximum of equal to 12 years, a second teen age group 804 ranging from a minimum of equal to 13 years to a maximum of equal to 21 years, a second youth age group 806 ranging from a minimum of equal to 22 years to a maximum of equal to 28 years, an second adult age group 808 ranging from a minimum of equal to 29 years to a maximum of equal to 60 years and a second old age group 810 ranging from a minimum of equal to 60 years and above.

Figure 9:
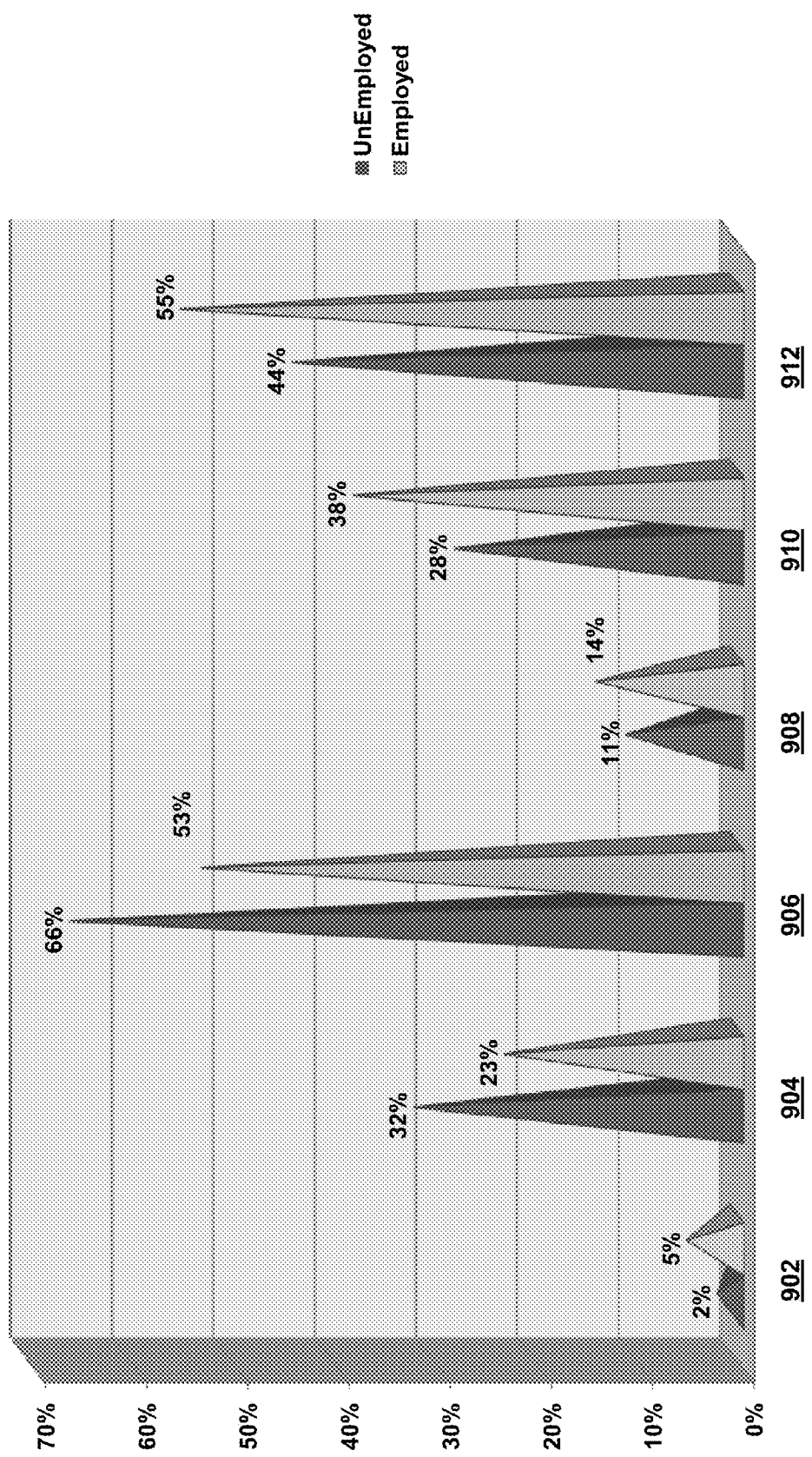
FIG. 9 depicts a fifth plot of percentage probabilities of TV watching time of at least one of unemployed and employed people of different age groups on weekends.

FIG. 9 depicts a fifth plot 900 of percentage probabilities of TV watching time of at least one of unemployed and employed people of different age groups on weekends.

As depicted in FIG. 9, the fifth plot 900 for percentage probabilities of TV watching time of at least one of unemployed/employed people of different Age groups on weekends possess the following specifications and associated analytical information thereof: ordered pair is (time slot in 24 hr format, percentage probability of TV watching TV); horizontal X-axis includes closed intervals in hours of time slots, namely a nineteenth time slot 902 ranging from a minimum of equal to 06:00 hrs to a maximum of equal to 08:00 hrs (or [6, 8]), a twentieth time slot 904 ranging from a minimum of equal to 08:00 hrs to a maximum of equal to 11:00 hrs (or [8, 11]), a fifteenth time slot 906 ranging from a minimum of equal to 11:00 hrs to a maximum of equal to 14:00 hrs (or [11, 14]), a sixteenth time slot 908 ranging from a minimum of equal to 14:00 hrs to a maximum of equal to 16:00 hrs (or [14, 16]), a seventeenth time slot 910 ranging from a minimum of equal to 16:00 hrs to a maximum of equal to 19:00 hrs (or [16, 19]), an eighteenth time slot 912 ranging from a minimum of equal to 19:00 hrs to a maximum of equal to 23:00 hrs (or [19, 23]); vertical Y-axis includes a closed interval of percentage probabilities of TV watching time ranging from a minimum of equal to 0% to a maximum of equal to 80%; analytical information is analysis of the fifth plot for percentage probability of TV watching time of at least one of unemployed/employed people of different age groups on weekends; subject or volunteer information includes unemployed/employed people of different age groups.

The derived RULE 2 facilitates finding percentage probabilities of TV watching time for event genres by males and females of different age groups, TV watching time of at least one of unemployed and employed people of different age groups on weekdays, people of different age groups on weekends and at least one of unemployed and employed people of different age groups on weekends, based on analyses, observations and interpretations of (or in connection with) the second, third, fourth and fifth plots 600, 700, 800 and 900, of FIGS. 6-9. The analyses, observations and interpretations of the second, third, fourth and fifth plots 600, 700, 800 and 900, of FIGS. 6-9, are used to develop a rule book to derive a user group from viewing habits of people (or users) observed for a selected period of time. Thus, the derivation of a user group from viewing habits of people (or users) observed for the selected period of time based on the rule book involving analyses, observations and interpretations of the plots in FIGS. 6-9 constitutes the RULE 2. In some embodiments, the selection of a period of time over which viewing habits of people (or users) are observed is configurable. For example, the selected period of time over which viewing habits of people (or users) are observed is 3 months.

The RULE 3 facilitates finding percentage probability of TV watching time for event genres by males and females of different age groups, based on the analysis, observation and interpretation of the first plot 500, of FIG. 5.

As shown in FIG. 8, the fourth plot 800 of percentage probabilities of TV watching time of people of different age groups on weekends is used to verify age groups based on derivation from the analysis, observation and interpretation of the first plot 500, of FIG. 5. The derived RULE 4, thus, facilitates verification of age groups using analysis, observation and interpretation of the fourth plot 800, of FIG. 8, based on derivation from the analysis, observation and interpretation of the first plot 500, of FIG. 5.

The derived RULE 5 facilitates finding percentage probability of TV watching time of at least one of unemployed and employed people of different age groups on weekdays, based on analysis, observation and interpretation of the third plot 700, of FIG. 7. The third plot 700 is used to derive the employment status of a user, i.e. whether the user is at least one of employed or unemployed, based on viewing pattern of the user. As shown in FIG. 9, analysis, observation and interpretation of the fifth plot 900 facilitates finding percentage probabilities of TV watching time of at least one of unemployed and employed people of different age groups on weekends. Further, in accordance with the RULE 5, the findings and derivations of the fifth plot 900 is used to verify the derived employment status of people of different age groups based on weekdays viewing pattern obtained using analysis, observation and interpretation of the third plot 700, of FIG. 7.

In accordance with the RULE 6, switching between TV channels increases in group user watching scenarios, i.e. if users are watching in a group, vis-à-vis single user watching scenarios, i.e. if a single user is watching. Likewise, movies are less watched on weekdays, if people are employed.

In accordance with the RULE 7, if at least one user in a household is a kid, and if at least another pair of users in the household are a male and female, then the inference is that the at least another pair of users in the household are married.

In accordance with the RULE 8, housewives are more likely to watch TV in the afternoon than in the forenoon on weekdays.

Table 2 shows an exemplary tabular representation for a list of users and corresponding user groups. As shown in the Table 2, there are two columns, namely a user list for a list of users and corresponding user groups based on data from a client device, for example the client device 102 of FIG. 1.

| USER LIST | EXEMPLARY USER GROUPS IN A USER TABLE DERIVED BASED ON DATA FROM A STATISTICAL ENGINE OF A CLIENT DEVICE |
|---|---|
| S100.U1 | 1ML, 1FA |
| S101.U4 | C3EFA |
| S100.U3 | C4EMH |
| S102.U1 | 1ML, 1FA |
| S103.U3 | C4EMH |

In some embodiments, users are categorized into different user groups, for example, as shown in the Table 2, based on the attributes of the users, like gender, age, marital and employment status and income.

In some embodiments, the household income is difficult to derive based on passive monitoring of the viewing habits of a user. Thus, the household income is derived on the basis of at least one of a user profile directly entered by a user, for example as shown in FIG. 4, and the available purchase profile and spending patterns of the user.

In some embodiments, the RULES 1, 2, 3, 4, 5, 6, 7 and 8 derived from the survey database 174 may be applied on the data from a statistical engine, for example the statistical engine 120 of the client device 102, of FIG. 1, obtained from users, based on their viewing patterns, to identify a user group.

The statistical engine 120 in each client device 102 sends user data (or information) including one or more parameters, such as a user ID, start watch time, end watch time, event genre and audio language periodically, for example, every one hour, to a PAD server, for example the PAD server 148 of FIG. 1. A MYSQL DB server, for example the MYSQL DB server 150 of FIG. 1, stores the hourly data in a statistical engine table, for example the statistical engine table 176B (not explicitly shown and described hereat). Upon availability of cumulative data for a selected period, for example 3 months, for a user in the statistical engine table 176B, at least one of an average watch duration and genre for different predefined time slots during weekdays and weekends is calculated, and stored in an average watch duration table, for example the average watch duration table 176I (not explicitly shown and described hereat) of the MYSQL DB server 150.

In some embodiments, the RULES 1, 2, 3, 4, 5, 6, 7, and 8 derived from the survey data in the survey database 174 are applied by an advertisement selection module, for example the advertisement selection module 164 of the PAD server 148 of the server subsystem 104, as shown in FIG. 3, on the average watch duration table 176I to identify the probable user groups from at least a plurality of user groups.

In some embodiments, an advertiser during uploading an advertisement asset of a product through a web server, for example the web server 154 of the server subsystem 104, of FIG. 1, provides targeted audience data, such as age group, gender, profession, and so on, as depicted in FIG. 12. From the targeted audience data, a set of targeted user groups from at least a plurality of user groups is obtained for each campaign asset.

Table 3 shows an exemplary tabular representation for a list of assets and corresponding targeted user groups provided by the advertisers. As shown in the Table 3, there are two columns, namely an asset list from an advertiser's campaign data and corresponding targeted user groups in an asset table, for example the asset table 176A (not explicitly shown and described hereat) of the MYSQL DB server 150.

| ASSET LIST | TARGETED USER GROUP |
|---|---|
| A1011 (KIDS CYCLE) | 1ML |
| A1014 (REAL ESTATE AGENCY) | C4EMH, C5EMH |
| A1010 (MOBILE) | S3EML, S3EFA |

In some embodiments, if a user group of a current primary user using a client device, for example the client device 102 of FIG. 1, in the Table 2, and a targeted user group in the Table 3, matches, a corresponding advertisement image is selected from the advertisement sequence for the user group, calculated for a given day is delivered to the client device. For example, a user group with a user group ID 1ML in the Table 2 matches with a targeted user group with a user group ID 1ML in the Table 3, thus a corresponding asset with an asset ID A1011, i.e. KIDS CYCLE, is delivered to the client devices 102 with user IDs S100.U1 and S102.U1.

The advertisement selection module 164 of the PAD server 148 of the server subsystem 104, as shown in FIG. 3, analyzes and applies the RULES 1-8 on historical data of a viewer recorded for or over a period of time by the statistical engine 120 in the client device 102, of FIG. 1, to obtain one or more details in connection with the viewer. For example, a gender, such as at least one of male and female, an age group, such as at least one of kid, teen, youth, adult and old, an employment status, for instance at least one of employed and unemployed, and a marital status, for instance at least one of committed and single. In some embodiments, user profile details of all users in a household needs to be (or are) identified, to derive the relationships between all the users and to find a most probabilistic user group of each user. Further, an average watch duration per day less than and equal to a configurable time duration, for example less than and equal to (or <=) 10 minutes, is ignored by the advertisement selection module 164 to increase the reliability in the identification of user group.

A target impression calculation module, for example the target impression calculation module 166 of the PAD server 148, as shown in FIG. 3, derives the number of impressions of advertisement asset images to be displayed (or to display) per user per day, namely ((NUMBER OF IMPRESSIONS)/(DAY*USER)) or NI), in UI screens based on one or more parameters.

Specifically, the target impression calculation module 166 derives the NI based on a first parameter, namely NI_TOTAL, second parameter, namely CAMPAIGN_DAYS, and third parameter, namely NU. The first parameter NI_TOTAL refers to the total number of impressions of an advertisement image asset, as specified by an advertiser as part of an advertisement campaign. The second parameter CAMPAIGN_DAYS refers to the duration of the advertisement campaign in days, as specified by the advertiser. The third parameter NU refers to the number of users in a targeted user group to which the advertisement image asset can be served or delivered.

In some embodiments, the number of advertisement impressions per user per day ((NUMBER OF IMPRESSIONS)/(DAY*USER)) or NI) is calculated for all active advertisement image assets, as part of the first tier daily-based wakeup tasks (not explicitly shown and described hereat), as performed by the daily routine wakeup tasks performance module 182 of the performance optimization component 180, of FIG. 1. Since, remaining campaign days (or campaign period in days) and total number of remaining impressions for active advertisement image assets change every day.

The number of impressions displayed on a previous day for all users for a given, selected advertisement asset image, namely NI_ACTUAL_PREVDAY, is updated in an actual impression tracker table, for example the actual impression tracker table 176G (not explicitly shown and described hereat) in the MYSQL DB server 150, of FIG. 1, as part of the first tier daily-based wakeup tasks (not explicitly shown and described hereat), as performed by the routine wakeup tasks performance module 182 of the performance optimization component 180, for the current day. In some scenarios, the target number of impressions for the given, selected advertisement asset image for the current day, namely NI_TODAY, is not met. Stated differently, if the total actual impressions displayed is less than NI_TODAY for the given, selected advertisement asset image, then the backlog is added to the total remaining impressions, namely NI_REM. The computation of the NI_REM is represented by a following Equation (1):

$$NI\_REM = NI\_REM - NI\_ACTUAL\_PREVDAY. \qquad \text{Equation (1).}$$

In some scenarios, for the first day of an advertisement campaign the NI_REM is same as the NI_TOTAL.

Figure 10:
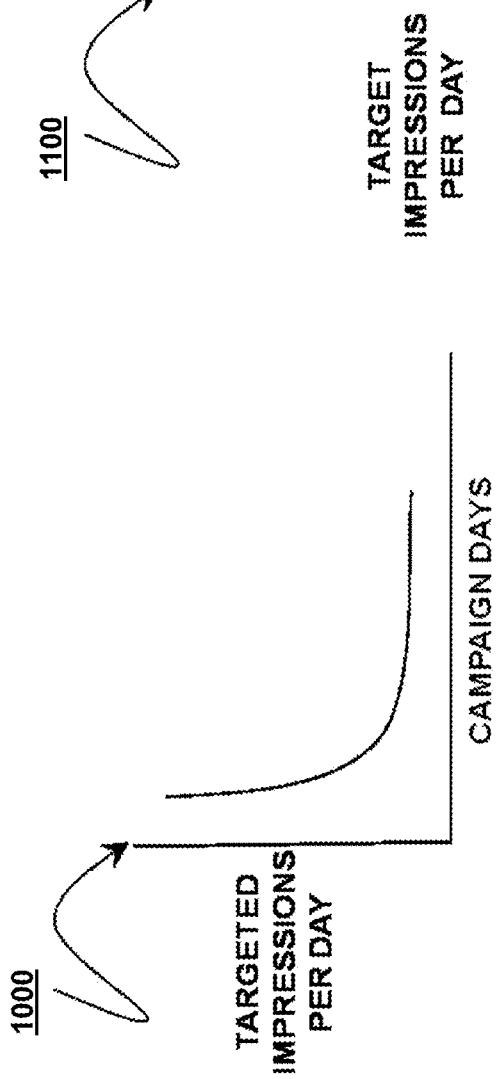
FIG. 10 depicts a sixth plot for campaign days versus target impressions per day.

FIG. 10 depicts a sixth plot 1000 for campaign days versus target impressions per day.

As depicted in FIG. 10, the sixth plot 1000 for advertisement campaign days versus target impressions for an advertisement asset image per day possess the following specifications and associated analytical information thereof: ordered pair is (day, target impressions for an advertisement asset image per day); horizontal X-axis represents days; vertical Y-axis represents target impressions for an advertisement asset image per day; analytical information is analysis of the sixth plot 1000 for advertisement campaign days and target impressions for an advertisement asset image per day.

As shown in FIG. 10, the sixth plot 1000 is a concave up, decreasing curve. As depicted herein, the concave up, decreasing curve for the sixth plot 1000 implies that the target impressions for an advertisement asset image per day exponentially decreases with increasing advertisement campaign days, or an increase in the advertisement campaign days.

Figure 11:
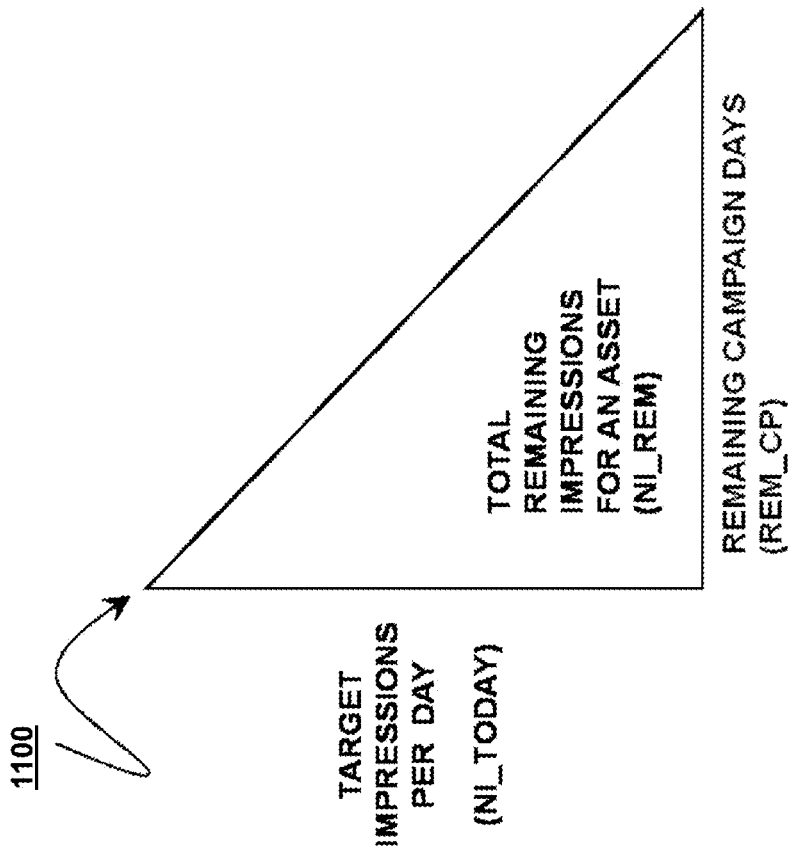
FIG. 11 depicts a seventh plot 1100 for the remaining campaign days versus target impressions per day.

FIG. 11 depicts a seventh plot 1100 for the remaining campaign days versus target impressions per day.

As depicted in FIG. 11, the seventh plot 1100 for the remaining advertisement campaign days versus target impressions for an advertisement asset image per day possess the following specifications and associated analytical information thereof: ordered pair is (remaining advertisement campaign days, target impressions per day); horizontal X-axis represents remaining campaign days; vertical Y-axis represents target impressions per day; analytical information is analysis of the seventh plot 1100 for the remaining advertisement campaign days versus target impressions for an advertisement asset image per day.

As depicted in FIG. 11, the seventh plot 1100 is a right-angled triangle. Thus, if the total remaining impressions for an advertisement asset image (NI_REM) is represented by the area of the right-angled triangle 1100, and if a remaining advertisement campaign period calculated every day, namely REM_CP, is represented by the base of the right-angled triangle 1100, then target number of impressions for today (NI_TODAY) for the asset across targeted users is represented by the height of the right-angled triangle 1100. The calculation of the targeted impressions per day (or TARGETED IMPRESSIONS/DAY) is used to give the maximum number of advertisements at the start of an advertisement campaign, to get maximum attention of users for new advertisements.

In some embodiments involving design and implementation of an algorithm for computation of the NI, advantageously the target impressions for the last days of an advertisement campaign is less because maximum part of the target impressions is achieved during an initial advertisement campaign period. Therefore, the number of impressions to be given today (NI_TODAY) across all targeted users is calculated using a following Equation (2):

$$NI\_TODAY = NI\_REM * 2 / REM\_CP. \qquad \text{Equation (2).}$$

In some embodiments, the number of impressions per user for today, namely NI/USR TODAY, is computed using a following Equation (3):

$$NI/USR\_TODAY = NI\_TODAY/NU. \qquad \text{Equation (3)},$$

where NU is the number of users in a user group to whom a given, selected advertisement asset image can be targeted.

An advertisement sequence calculation module, for example the advertisement sequence calculation module 168 of the PAD server 148, as shown in FIG. 3, determines a sequence for display of a set of advertisement images for a user group. In some embodiments, an advertiser mentions a target audience details or attributes, such as gender, age group, employment status, and so on, to which an advertisement asset is targeted.

Table 3A shows an exemplary tabular representation of the target audience details corresponding to each advertisement image asset as specified by corresponding advertisers. As shown in the Table 3A, there are three columns, namely an asset identifier (ID), a brand and product names as given in an advertisement campaign, and corresponding target user groups as provided by the corresponding advertisers.

| ASSET ID | BRAND AND PRODUCT (AS GIVEN IN AN ADVERTISEMENT CAMPAIGN) | TARGETED FOR USER GROUPS (AS PROVIDED BY AN ADVERTISER) |
|---|---|---|
| A1010 | IPHONE ® MOBILE | S3EMH, S3EFH, C4EMH, C4EFH, 2MA, 2FH, S3UMH, S3UFH, S3EMH, S3EFA |
| A1011 | AUDI ® CAR | S3EMH, S3EFH, C4EMH, C4EFH, 2MH, 2FH, S3UMH, S3UFH |
| A1012 | VERSACE ® SUN GLASSES | C4EMH, C4EFH, C5EMH, C5EFA, C3EMH |
| A1013 | ROLEX ® WATCHES | 2MH, 2FH, S3UMH, S3UFH, S3EMH, S3EFH, C4EMH |
| A1014 | THE PRUDENTIAL REAL ESTATE AFFILIATES, INC. ® | C4EMH, C4EFA, C5EMH, C5EFH, C3EMA |
| A1015 | HONDA ® BIKE | 2ML, S3EMA, S3UMH, C4EMH, C4UMH |

As shown in the Table 3A, a user group bearing ID C4EMH needs to be displayed (or provided with) one or more advertisement assets with asset IDs, namely A1010-A1015, as per the specifications provided by corresponding advertisers. The Table 3A facilitates in finding out an advertisement sequence in which the advertisement assets with asset IDs A1010-A1015 is to be advertised for a user who belongs to the user group bearing ID C4EMH.

The sequence in which a given, selected advertisement asset image is displayed for a specific user profile depends on one or more factors, such as a priority of advertisement image asset, revenue expected, brand value, a loyalty index of an advertiser, remaining advertisement impressions and so forth. The loyalty index of an advertiser is in turn based on one or more factors, such as the advertiser's prompt payment, long association with a multiple system operator (MSO), and so on. The remaining advertisement impressions for a given day NI_TODAY is derived from total remaining impressions (NI_REM) and the remaining campaign period in days, i.e. REM_CP.

FIG. 12 depicts UI of a web server for an advertiser to upload an advertisement asset.

Each advertisement asset image uploaded by an advertiser through the UI 1200 of the web server 154, of FIG. 1, is given a unique asset identification number called asset ID.

The targeted impressions per user per day (NI) for an asset is calculated every day as part of the first tier daily-based wakeup tasks (not explicitly shown and described hereat), as performed by the routine wakeup tasks performance module 182 of the performance optimization component 180, of FIG. 1.

In some embodiments, in order to speed-up decision making in connection with an advertisement sequence during reception of requests from a client device, for example the client device 102, of FIG. 1, and during implementation of a second tier dynamic on-the-fly (or real-time) tasks, as performed by a dynamic user request processing module, for example the dynamic user request processing module 184 of the performance optimization component 180, of FIG. 1, the entire advertisement sequence is created for each user group for a given, selected day, as part of the first tier daily-based wakeup tasks, as the advertisement sequence is valid only for the current day.

Table 15 shows an exemplary tabular representation for generation of an advertisement sequence. As shown in the Table 15, there are six columns, namely an advertisement asset ID, targeted impressions per user per day [NI/USR_TODAY], priority of the advertisement asset [P], loyalty index of the advertiser [LI], ranking index [NI/USR_TODAY*P*LI] and rank.

| ADVERTISEMENT ASSET ID (FROM ADVERTISEMENT BOUQUET FOR A USER GROUP BEARING AN ID C4EMH) | TARGETED IMPRESSIONS PER USER PER DAY [NI/USR_TODAY] | PRIORITY OF THE ASSET [P] {1-3} | LOYALTY INDEX OF THE ADVERTISER [LI] {1-5} | RANKING INDEX [NI/USR_TODAY * P * LI] | RANKS (1$^{ST}$ AND 2$^{ND}$ ADVERTISEMENT OPP1ORTUNITIES) |
|---|---|---|---|---|---|
| A1010 | 5 | HIGH (3) | 4 | 60 | R5 |
| A1011 | 25 | MEDIUM (2) | 2 | 100 | R4 |
| A1012 | 10 | LOW (1) | 1 | 10 | R6 |
| A1013 | 8, 7 | HIGH (3) | 5 | 120, 105 | R2 |
| A1014 | 18, 17 | MEDIUM (2) | 3 | 108, 102 | R3 |
| A1015 | 21, 20 | HIGH (3) | 4 | 252, 240 | R1 |

ADVERTISEMENT SEQUENCE (1$^{ST}$, 2$^{ND}$ OPPORTUNITIES) = {A1015, A1013, A1014}

In some embodiments, an advertisement sequence for each cycle of opportunity is concatenated and stored in the MYSQL DB server 150, of FIG. 1, for a user group, till the targeted impressions and ranking indices of all advertisement assets in an advertisement bouquet for the user group for a given day becomes zero. The generation of an advertisement sequence for each cycle of opportunity is based on the ranking index calculated using a following Equation (6):

Ranking Index=[NI/USR_TODAY*P*LI],   Equation (6), as shown in the Table 15.

The generation of the advertisement sequence for each cycle of opportunity is an activity under the first tier daily-based wakeup tasks (not explicitly shown and described hereat), as performed by the routine wakeup tasks performance module 182 of the performance optimization component 180, of FIG. 1. The generation of the advertisement sequence for each cycle of opportunity is repeated for each advertisement bouquet. The total number of advertisement sequence entries in the MYSQL database of the MYSQL DB server 150, of FIG. 1, will be equal to total number of target user groups provided by the advertisers for all active advertisement assets.

In some embodiments, a position of an advertisement asset to be displayed next, to be precise the last displayed advertisement asset position+1, in an advertisement sequence is maintained for each user. Upon display of each advertisement asset as per a stored advertisement sequence, the position of next advertisement asset to be displayed for each user is updated in the MYSQL database of the MYSQL DB server 150.

In some embodiments, the loyalty index [LI] of an advertiser is calculated by an MSO based on one or more factors. For example, the loyalty index [LI] of an advertiser is calculated based on 1) the advertiser is at least one of a first time and repeat customer of the MSO; 2) number of times the advertiser has advertised with the MSO before, if the advertiser is a repeat customer; 3) advertisement revenue from repeat business from the advertiser with the MSO, in last one year including the current one; 4) timely payment behavior and history of the advertiser; and 5) early termination or cancellation history or behavior of the advertiser in any and all advertisement campaigns before the minimum campaign duration. Each of the five factors for calculation of LI of an advertiser carries a weightage, for example a numerical value of 1, and the sum is the LI, which can vary from a minimum weightage, for example a numerical value of 1, to a maximum weightage, for example a numerical value of 5.

Likewise, the priority [P] of an advertiser is calculated by an MSO based on based on one or more factors. For example, the priority [P] of an advertiser is calculated based on 1) campaign duration, for instance duration above (>) six (6) months is considered HIGH, duration between three (3) to six (6) months, i.e. 3 months>= and <=6 months is considered MEDIUM, whereas duration below (<) three (3) months is considered LOW priority; 2) total advertisement revenue expected from the advertiser, for instance the revenue in RANGE1 is considered HIGH, in RANGE2 is considered MEDIUM, whereas in RANGE3 is considered LOW, wherein the RANGE1>=2*RANGE2; and wherein RANGE2>=2*RANGE3. In some scenarios, advertisers give better revenue to MSO after bidding, for high demand and frequently used screen spaces in UIs.

In some embodiments, in order to arrive at an advertisement sequence a rule is designed and implemented in an activity as part of the first tier daily-based wakeup tasks (not explicitly shown and described hereat), as performed by the daily routine wakeup tasks performance module 182 of the performance optimization component 180, of FIG. 1. For example, if the total number of advertisement assets in the advertisement bouquet are greater than (>) 3, and if the top $\frac{1}{3}^{rd}$ ranked advertisement assets based on ranking indices (or $\frac{1}{3}^{rd}$ of the ranks of the top three (3) ranked assets) is greater than and equal to (>=) 3, then the number of advertisement assets to be displayed in an advertisement sequence is equal to the top $\frac{1}{3}^{rd}$ ranked assets of the advertisement bouquet, rounded off to a higher integer. Else if, the top $\frac{1}{3}^{rd}$ ranked assets is less than (<) 3, then number of advertisement assets to be displayed in the decreasing order of ranking indices, is equal to top 3 ranked assets. Else if, the total number of assets in the advertisement bouquet is less than (<) 3, then the number of assets to be displayed in the decreasing order of ranking indices is all the assets in the advertisement bouquet.

In some scenarios, if the ranking indices for two or more assets are same, then an asset not yet displayed is picked up first. In some embodiments, a minimum of the top three (3) ranked assets are set to be displayed in the decreasing order of ranking indices to reduce boredom and to increase engagement level of a user. The factor 3 (for the top $\frac{1}{3}^{rd}$ rule) is configurable by an MSO, as part of the operator settings.

For example, as depicted in the Table 15, number of top $\frac{1}{3}^{rd}$ ranked assets are total number of assets/ 3=2, which is less than 3.   Equation (5)

Thus, instead of displaying the top two (2) ranked assets, with corresponding asset IDs, A1015 and A1012, the top three (3) ranked assets with corresponding asset IDs in descending order of ranking indices, A1015, A1013 and A1014, are displayed in a first ($1^{st}$) advertisement opportunity.

Upon placement of a first ($1^{st}$) set of advertisements in the first ($1^{st}$) advertisement opportunity, the ranking indices are again calculated and ranks determined for a second ($2^{nd}$) advertisement opportunity, which is again the same as the first one. Likewise, upon display of a second ($2^{nd}$) set of advertisements in the descending order of the ranking indices in the second ($2^{nd}$) advertisement opportunity, the ranking indices are again calculated and ranks determined for a third (3rd) advertisement opportunity, which is now different {A1015, A1011, A1014}, as shown in Table 16. The display of advertisements in a rank sequence is continued till the ranking indices for all advertisement assets in the advertisement bouquet become zero.

Table 16 shows an exemplary tabular representation for generation of an advertisement sequence for a third ($3^{rd}$) advertisement opportunity of an advertisement sequence. As shown in the Table 16, there are six columns, namely an advertisement asset ID, targeted impressions per user per day [NI/USR_TODAY], priority of the advertisement asset [P], loyalty index of the advertiser [LI], ranking index [NI/USR_TODAY*P*LI] and rank.

| ADVERTISEMENT ASSET ID (FROM AN ADVERTISEMENT BOUQUET FOR A USER GROUP BEARING AN ID C4EMH) | TARGETED IMPRESSIONS PER USER/ DAY [NI/ USR_TODAY] | PRIORITY OF THE ASSET [P] {1-3} | LOYALTY INDEX OF THE ADVERTISER [LI] {1-5} | RANKING INDEX [NI/ USR_TODAY * P * LI] | RANKS ($3^{RD}$ ADVERTISEMENT OPPORTUNITY) |
|---|---|---|---|---|---|
| A1010 | 5 | HIGH (3) | 4 | 60 | R5 |

| ADVERTISEMENT ASSET ID (FROM AN ADVERTISEMENT BOUQUET FOR A USER GROUP BEARING AN ID C4EMH) | TARGETED IMPRESSIONS PER USER/ DAY [NI/ USR_TODAY] | PRIORITY OF THE ASSET [P] {1-3} | LOYALTY INDEX OF THE ADVERTISER [LI] {1-5} | RANKING INDEX [NI/ USR_TODAY * P * LI] | RANKS (3$^{RD}$ ADVERTISEMENT OPPORTUNITY) |
|---|---|---|---|---|---|
| A1011 | 25 | MEDIUM (2) | 2 | 100 | R2 |
| A1012 | 10 | LOW (1) | 1 | 10 | R6 |
| A1013 | 6 | HIGH (3) | 5 | 90 | R4 |
| A1014 | 16 | MEDIUM (2) | 3 | 96 | R3 |
| A1015 | 19 | HIGH (3) | 4 | 228 | R1 |

ADVERTISEMENT SEQUENCE (3$^{RD}$ OPPORTUNITY) = {A1015, A1011, A1014}

Tables 17 and 18 show exemplary tabular representations for the start and end parts of an advertisement sequence, in the descending order of ranking indices calculated in Tables 15 and 16 above, for an example user group comprising committed, employed and married adult males aged between 36-60 yrs with a user group ID C4EMH. The advertisement sequence for a given day ends till the targeted impressions and ranking indices of all assets in the advertisement bouquet becomes zero.

| A1015 | A1013 | A1014 | A1015 | A1013 | A1014 | A1015 | A1011 | A1014 | ... |
|---|---|---|---|---|---|---|---|---|---|
| ... | A1012 | A1011 | A1014 | A1012 | A1011 | A1014 | A1012 | A1011 | |

All XML requests, i.e. XML request messages, and XML responses, i.e. XML response messages, in XML communication between the PAD server 148 and all the client devices 102, of FIG. 1, is handled by an XML communication module, for example the XML communication module 170 of the PAD server 148, as depicted in FIG. 3 and the XML utility module 124, as depicted in FIG. 2. As shown in a Table 4, the XML requests from one or more client devices 102 are generated by the XML utility module 124, and the XML responses from the PAD server 148 are generated by the XML communication module 170.

Table 4 shows an exemplary tabular representation for XML requests from one or more client devices 102 generated by the XML utility module 124, and XML responses from the PAD server 148 generated using the XML communication module 170. As shown in the Table 4, there are three columns, namely IDs, XML requests from the client device 102, and XML responses from the PAD server 148.

| ID | XML REQUEST FROM A CLIENT DEVICE | XML RESPONSE FROM A PAD SERVER |
|---|---|---|
| [XML1] | <?xml version="1.0" encoding="UTF-8"?><br><SubscriberID><br>S100045<br></SubscriberID><br><DeviceModel><br>STB123<br></DeviceModel><br><ApplicationVersion><br>1.0<br></ApplicationVersion> | <?xml version="1.0" encoding="UTF-8"?><br><Status><br><Message>Error/Success</Message><br></Status><br><User><br><ID>1 </ID><br><AdSequence><br>A1015,A1013,....<br></AdSequence><br><Non-repeatAssetDetails><br><Asset><br><ID>A1015</ID><br><DisplayedDuration>3sec<br></DisplayedDuration><br><Type>JPG</Type><br><URL><br>http://...</URL><br><ADCompanionInfo><br><AdCompanionType>PicturePlusVideo</AdCompanionType><br><AdCompanionImageUrl><br>http://</AdCompanionImageUrl><br><AdCompanionVideoUrl>http://</AdCompanionVideoUrl> |

-continued

| ID | XML REQUEST FROM A CLIENT DEVICE | XML RESPONSE FROM A PAD SERVER |
|---|---|---|
| | | </ADCompanionInfo><br></Asset><br><Asset><br>. . .<br></Asset><br></ Non-repeatAssetDetails ><br></User><br><User><br>. . .<br></User><br><Validity date><br>28$^{th}$ Jan 2013<br></Validity date> |
| [XML2] | <?xml version="1.0" encoding="UTF-8"?><br><SubscriberID><br>S100045<br></SubscriberID><br><Asset><br><AssetID>A100</AssetID><br><DisplayedDuration>3sec</DisplayedDuration><br><UserFeedback><br>Interested<br></UserFeedback><br></Asset><br><!-- If the Old ADT Details has been not sent for some assets, then the ADT details of these assets will be appended below. --><br><Asset><br></Asset> | <?xml version="1.0" encoding="UTF-8"?><br><Status><br><Code> 0 </Code><br><Message> Success </Message><br></Status><br><!-- If the Date has changed the following tags will be sent to Client --><br><AdSequence><br><UserID><br>1<br></UserID><br><UserID><br>2<br></UserID><br><Sequence><br>A1015, A1013,....<br><Sequence><br></AdSequence><br><AdSequence><br><UserID><br>3<br></UserID><br><Sequence><br>A1017, A1010,....<br><Sequence><br></AdSequence><br><!— distinct asset details across all users of the subscriber --><br><Non-repeatAssetDetails><br><Asset><br><ID>A300</ID><br><Type>JPG</Type><br><URL>http://</URL><br><ADCompanionInfo><br><AdCompanionType>Picture</AdCompanionType><br><AdCompanionImageUrl> http://</ AdCompanionImageUrl><br></ADCompanionInfo><br></Asset><br><Asset><br>. . .<br></Asset><br></Non-repeatAssetDetails ><br><Validity date><br>28$^{th}$ Jan 2013<br></Validity date> |
| [XML3] | <?xml version="1.0" encoding="UTF-8"?><br><PeriodicStatisticalEngine><br><StatisticalEngineData><br><AudioLanguage><br>English<br></AudioLanguage><br><EventName><br>Great Hunter<br></EventName><br><EventGenre><br>Nature<br></EventGenre><br><WatchStartTime><br>Feb 1 st ,4:46:15<br></WatchStartTime> | <?xml version="1.0" encoding="UTF-8"?><br><Message><br>Error/Success<br></Message><br><ExInfo><br><!-- Extra information about Status is written here --><br></ExInfo> |

| ID | XML REQUEST FROM A CLIENT DEVICE | XML RESPONSE FROM A PAD SERVER |
|---|---|---|
| | <WatchEndTime><br>Feb 1 st ,5:26:40<br></WatchEndTime><br><UserId><br>S100045U1<br></UserId><br></StatisticalEngineData><br><StatisticalEngineData><br><AudioLanguage><br>English<br></AudioLanguage><br><EventGenre><br>Thriller<br></EventGenre><br><WatchStartTime><br>Feb 1 st , 5:26:40<br></WatchStartTime><br><WatchEndTime><br>Feb 1 st , 5:46:15<br></WatchEndTime><br><UserId><br>S100045U1<br></UserId><br></StatisticalEngineData><br></PeriodicStatisticalEngine> | |

The ID [XML1] in the Table 4 corresponds to a WHOAMI XML request message including the subscriber ID, device model number and UI application version number, during booting up of a client device 102, of FIG. 1. In response, the PAD server 148 sends an XML response message including the response status of the message, for example at least one of failure (error) and success, an advertisement sequence for each of one or more user IDs in a subscriber ID for a given day, a location URL of a non-repeated advertisement asset and location URL of a corresponding advertisement companion asset present in the advertisement asset server 152, of FIG. 1, the corresponding image types of the non-repeated advertisement asset and corresponding advertisement companion assets of the advertisement sequence and the validity date of the advertisement sequence, which is the current date.

In use, the client device 102 subsequently boots up of at a selected time in a day with a valid advertisement sequence for all the user groups in a household, the first three (3) advertisement image assets for each advertisement sequence, the URLs of all advertisement image assets for all the advertisement bouquets corresponding to all the user groups in the household and the corresponding URLs of advertisement companion assets, stored in the persistent memory of the client device 102.

In some scenarios, in the event that the client device 102 at least one of boots up multiple times on the same date and fails to boot up any time on a given day owing to retention of the standby mode, the client device 102 compares the validity date of the stored advertisement sequence with the current date extracted from an AV signal or the system date. In some scenarios, in the event that the validity date of the stored advertisement sequence and the current date are different, then a new BOOTUP XML request, i.e. [XML1], is sent to the PAD Server 158 to get the new advertisement sequence and details thereof.

The ID [XML2] in the Table 4 corresponds to an advertisement display tracker (ADT) request message containing the subscriber ID, asset ID, actual displayed duration of the asset in the UI screen and the user feedback for the advertisement asset, for example "interested", and so on, after the display of each advertisement asset image in the UI Screens of the client device 102, of FIG. 1. In some scenarios, in the event that the XML1 has been already sent for a given day, the PAD server 148 responds with an XML response message including the response status of the message, for example at least one of failure (error) and success. On the contrary, in some scenarios, in the event that the XML1 has not been sent for a given day, the PAD server 148 sends the same XML1 response message to the ADT request message from the client device 102.

The ID [XML3] in the Table 4 corresponds to a periodic statistical engine data XML message including an audio language, event name, event genre, watch start time and watch end time for each of the users who watched, i.e. user IDs, in a subscriber ID for a given period of time, for example one (1) hour, sent by the statistical engine 120 in the client device 102. The PAD server 148 responds with an XML response message including the response status of the message, for example at least one of failure (error) and success, after storing the received statistical engine data in the statistical engine table 176B in the MySQL database 150, of FIG. 1.

In some embodiments, one or more XML requests are generated from the client devices 102 for one or more parameters, such as a subscriber ID, a user ID, an application version, an event genre, a width, a height, an opportunity and an asset ID. The subscriber ID is a unique identification of each client device, for example S100045. The user ID is a unique user identification of a current primary user, for example S100045.U1. The application version is a version number of a UI application. The genre is a name of an event genre on a client device 102, for example cookery, sports, history, and so on. In some scenarios, if event genre is not available, then channel genre is used. The width is the width of the available free advertisement space in pixels on a currently active UI screen. The height is height of the available free advertisement space in pixels on a currently active UI screen. The opportunity is the number of opportunities (or free advertisement spaces) present in the current UI screen. The asset ID is a unique asset identification allocated by the web server 154 for each asset image uploaded by an advertiser.

The advertisement asset server 152 has a repository (not shown here explicitly), which stores all advertisement campaign assets, for example images, video, and so forth, uploaded by different advertisers. Each asset is organized based on advertisement campaigns and is assigned with a unique Asset ID. For each unique asset ID, a storage path/URL allocated by the web server 154 is stored in the DB server 150, for example MYSQL DB server, for communicating to the client devices 102 by the PAD sever 148. The PAD server 148 provides the URL of an asset path in response to a request from a client device 102 based on an advertisement sequence stored in the PAD server 148. Based on the URL of the asset path received from the PAD server 148, the client devices 102 directly access the advertisement asset server 152 and download asset images for an advertisement.

The web server 154 provides a UI for advertisers and MSOs/LCOs to interact and use the system 100. The web server 154 provides customized interface screens for advertisers to create advertisement campaigns, upload assets and provide details of a targeted audience of an advertisement asset. The UI screens of the web server 154 provide queries and analytics support for operators and advertisers. The UI of the web server 154 provides flexibility for the MSOs/LCOs to configure and customize the system 100 based on the requirements of the MSOs/LCOs and the advertisers. The MSOs/LCOs can set up the start and stop time of a daily based wake-up task, set holidays in a year calendar. All the holidays are considered as week-ends while users are profiled.

FIG. 12 depicts UI of the web server 154 for an advertiser to upload an advertisement asset.

The advertiser needs to feed into and/or select from one or more of alphabetical, numerical values and a combination thereof, for example alphanumeric values, wherever preselected values are available as options, against one or more predefined or configurable parameters. For example, as shown in FIG. 12, the advertiser needs to feed into and/or select from the alphabetical, numerical values and alphanumeric values, wherever preselected values are available as options, against the following parameters, namely a product/service/brand/solution to be advertised fed as an alphabetical value, such as a name; a market segment of the product/service/brand/solution to be advertised selectable from following options available as preselected alphabetical values, such as HIGH, MEDIUM and LOW; an asset display duration fed as a numerical value in seconds; an asset priority selectable from following options available as preselected alphabetical values, such as HIGH, MEDIUM and LOW; a campaign period fed as an alphanumeric date value, such as a start date and end date; a total number of impressions, expected during the campaign period, namely NI_TOTAL, fed as a numerical value; an advertisement asset image type selectable from following options available as preselected alphabetical image file format values, such as JPEG, PNG, and the like; and a target audience overall profile for a product fed into and/or selected from the alphabetical, numerical values and alphanumeric values, wherever preselected values are available as options, against the following parameters, such as gender, age group, profession, annual income, and so on.

As shown in FIG. 12, the target audience overall profile (or target audience details) provided by an advertiser is parsed by the web server 154 and a target user group is identified and stored in an asset table 176A of the MYSQL DB server 150, for example MYSQL DB server, for all assets uploaded by each advertiser.

The billing server 156 provides periodic bills for advertisers to enable them to take the right advertisement decisions. During the creation of an advertisement campaign, an advertiser needs to pay an initial bill amount to make the campaign active from a start date. Upon start of the campaign, the billing server 156 provides progressive bills to the advertiser based on a campaign period. A billing amount is based on a size of an advertisement image asset, the campaign period, asset priority and number of displayed impressions.

The database (DB) server 150, for example MYSQL DB server, stores data provided by advertisers and data obtained from the client devices 102. In some embodiments, as shown in FIG. 1, the MYSQL DB server 150 maintains one or more database tables, which can be queried by the PAD server 148, advertisement asset server 152, web server 154 and billing server 156 of the system 100. Specifically, the one or more database tables of the MYSQL DB server 150 includes an asset table 176A, statistical engine table 176B, a user group table 176C, an advertisement sequence table 176D, a WHOAMI Table 176E, an advertisement display tracker table 176F, an actual impression tracker table 176G, a billing table 176H and an average watch duration table 176I.

Table 5 shows an exemplary tabular representation for the asset table 176A of the MYSQL DB server 150, of FIG. 1, for managing details of each advertisement asset. As shown in the Table 5, there are three columns, namely fields or attributes of each advertisement asset, description of each of the fields and a sample data for each of the fields.

| FIELDS | DESCRIPTION | SAMPLE DATA |
|---|---|---|
| ASSETID | A UNIQUE IDENTIFICATION NUMBER ALLOCATED BY A WEB SERVER, FOR EXAMPLE THE WEB SERVER 154, OF FIG. 1, TO IDENTIFY EACH IMPORTED ADVERTISEMENT ASSET | A1010 |
| PRODUCT_NAME | A BRIEF DESCRIPTION ABOUT A PRODUCT ASSET SPECIFIED BY AN ADVERTISER | PRUDENTIAL REAL ESTATE |
| PRODUCT_COST | THE COST OF THE PRODUCT ASSET SPECIFIED BY THE ADVERTISER | $300,000 |
| ASSET_FORMAT_TYPE | A CONTENT TYPE OF THE IMPORTED ADVERTISEMENT ASSET SPECIFIED BY THE ADVERTISER | JPEG |
| ASSET_WIDTH | A WIDTH OF THE IMPORTED ADVERTISEMENT ASSET IN PIXELS CALCULATED BY THE WEB SERVER 154 | 400 |
| ASSET_HEIGHT | A HEIGHT OF THE IMPORTED ADVERTISEMENT ASSET IN PIXELS CALCULATED BY THE WEB SERVER 154 | 900 |

-continued

| FIELDS | DESCRIPTION | SAMPLE DATA |
|---|---|---|
| ASSET_FILESIZE | A FILE SIZE OF THE IMPORTED ADVERTISEMENT ASSET IN KILOBYTES (KB), CALCULATED BY THE WEB SERVER 154 | 300 KB |
| RELATED_KEYWORDS | KEYWORDS RELATED TO THE PRODUCT ASSET SPECIFIED BY THE ADVERTISER | MORTGAGE, LOANS, LAKESIDE, LANDS, GREENARY |
| PRIMARY_ASSET_PATH | A PATH DECIDED BY THE WEB SERVER 154, WHERE THE IMPORTED ADVERTISEMENTASSET BY THE ADVERTISER IS STORED IN A REPOSITORY OF AN ADVERTISEMENT ASSET SERVER, FOR EXAMPLE THE ADVERTISEMENT ASSET SERVER 152, OF FIG. 1 | REPOSITORY\ASSETS\C100000\A1010.JPG |
| ADCOMPANION_ASSET_PATH | A PATH DECIDED BY THE WEB SERVER 154, WHERE AN ADVERTISEMENT COMPANION ASSET IMPORTED BY THE ADVERTISER IS STORED IN THE REPOSITORY OF THE ADVERTISEMENT ASSET SERVER 152 | REPOSITORY\COMPANION\C100000\A1010.JPG |
| ADCOMPANION_FORMAT_TYPE | A CONTENT TYPE OF THE ADVERTISEMENT COMPANION ASSET SPECIFIED BY THE ADVERTISER | JPEG/ PNG/ VIDEO |
| TEXT_ASSET_PATH | A PATH DECIDED BY THE WEB SERVER 154, WHERE A TEXT FILE WHICH CONTAINS AN ADDITIONAL INFORMATION ABOUT THE PRODUCT ASSET IMPORTED BY THE ADVERTISER, IS STORED IN THE REPOSITORY OF THE ADVERTISEMENT ASSET SERVER 152 | REPOSITORY/ASSETS/C10000/A1010.TXT |
| ASSET_LANGUAGE | A LANGUAGE(S) USED IN THE ADVERTISEMENT ASSET SPECIFIED BY THE ADVERTISER | ENGLISH |
| TOTAL_IMPRESSIONS | A TOTAL NO OF TIMES THE ADVERTISEMENT ASSET TO BE DISPLAYED ACROSS ALL CLIENT DEVICES 102, OF FIG. 1 FOR A CAMPAIGN PERIOD, SPECIFIED BY THE ADVERTISER | 15000 |
| ASSET_PRIORITY | A PRIORITY OF THE ASSET ASSIGNED BY THE WEB SERVER 154 BASED ON AN ADVERTISEMENT REVENUE, A NUMBER OF IMPRESSIONS AND THE CAMPAIGN PERIOD | HIGH |
| TARGETED_INCOME_CATEGORY | A TARGETED HOUSE HOLD ANNUAL INCOME RANGE SPECIFIED BY THE ADVERTISER, I.E. HIGH/MEDIUM/LOW | HIGH |
| TARGETED_PROFESSION | A TARGETED USERS' PROFESSION, SPECIFIED BY THE ADVERTISER, I.E. HOUSEWIFE, STUDENT, SALARIED, BUSINESS ETC. | SALARIED |
| TARGETED_GENDER | THE TARGETED USERS' GENDER, SPECIFIED BY THE ADVERTISER | MALE |
| TARGET_USERS_AGEGROUP | THE TARGETED USERS' AGE GROUP IN YEARS, SPECIFIED BY THE ADVERTISER, I.E. KID (6-12 YRS), TEEN (13-21 YRS), YOUTH (22 -28 YRS), ADULT (29-60 YRS), OLD (ABOVE 60 YRS) | ADULT |
| ASSET_STATUS | A STATUS OF THE CAMPAIGN CREATED BY THE ADVERTISER, I.E. PLANNED, ACTIVE, INACTIVE OR CLOSED | ACTIVE |
| TARGET_IMPRESSIONS_PERDAY_ALLUSERS | A NUMBER OF TIMES THE ADVERTISEMENT ASSET TO BE DISPLAYED PER DAY ACROSS ALL USERS, UPDATED DAILY BY A PAD SERVER, FOR EXAMPLE THE PAD SERVER 148 | 170 |
| TARGET_IMPRESSIONS_PERDAY_PERUSER | A NO OF TIMES THE ADVERTISEMENT ASSET SHOULD BE DISPLAYED PER DAY PER USER, UPDATED DAILY BY THE PAD SERVER 148 | 9 |
| TOTAL_REMAINING_IMPRESSIONSFOR_ASSET | TOTAL IMPRESSIONS TO BE DISPLAYED FOR A REMAINING CAMPAIGN PERIOD OF THE ADVERTISEMENT ASSET | 14050 |

-continued

| FIELDS | DESCRIPTION | SAMPLE DATA |
|---|---|---|
| CAMPAIGN_START_DATE | A START DATE FROM WHICH THE CAMPAIGN SHOULD BE MADE ACTIVE, AS SPECIFIED BY THE ADVERTISER | $15^{TH}$ JAN. 2013 |
| CAMPAIGN_END_DATE | AN END DATE BY WHICH THE CAMPAIGN SHOULD BE CLOSED, AS SPECIFIED BY THE ADVERTISER | $20^{TH}$ FEB. 2013 |
| ADVERTISER_ID | A UNIQUE IDENTIFICATION NUMBER GENERATED BY THE WEB SERVER 154, TO IDENTIFY EACH REGISTERED ADVERTISER | ADV0001 |
| TARG_USER_GROUP | A TARGETED USER GROUP TO WHICH THE ADVERTISEMENT ASSET SHOULD BE DELIVERED BASED ON A TARGET AUDIENCE SPECIFIED BY THE ADVERTISER | C4EMH |
| CUMULATIVE_ACTUAL_IMPR_DISPLAYED | ACTUAL IMPRESSIONS DISPLAYED ACROSS ALL USERS FOR A DAY. THIS DATA IS UPDATED BY A FIRST TIER DAILY-BASED WAKEUP TASKS, AS PERFORMED BY A ROUTINE WAKEUP TASKS PERFORMANCE MODULE, FOR EXAMPLE THE ROUTINE WAKEUP TASKS PERFORMANCE MODULE 182 OF A PERFORMANCE OPTIMIZATION COMPONENT, FOR EXAMPLE THE PERFORMANCE OPTIMIZATION COMPONENT 180, OF FIG. 1, USING THE DATA "ACTUAL NUMBER OF TIMES THE ADVERTISEMENT ASSET GOT DISPLAYED" FROM AN ACTUAL IMPRESSION TRACKER TABLE, FOR EXAMPLE THE ACTUAL IMPRESSION TRACKER TABLE 176G IN A MYSQL DB SERVER, FOR EXAMPLE THE MYSQL DB SERVER 150, OF FIG. 1 | 250 |

As shown in the Table 5, the asset table 176A is used to maintain details related to each advertisement asset. Registered advertisers upload the advertisement assets through the web server 154, of FIG. 1, via specifying one or more parameters, such as details of the advertisement asset, total impressions required, start and end dates of advertisement campaign and targeted audience for a product to be advertised. The web server 154 allocates a unique asset ID for each asset uploaded by the advertiser.

A targeted number of impressions of the advertisement asset per user per day and a cumulative actual impressions displayed for the advertisement asset till date across all users, are updated in the asset table 176A every day. An asset status is changed from active to inactive, when at least one of the total targeted number of impressions given by an advertiser is achieved, a campaign period is over and the advertiser defaults payment. The asset table 176A is updated every day by the first tier daily-based wakeup tasks (not explicitly shown and described hereat), as performed by the routine wakeup tasks performance module 182 of the performance optimization component 180, of FIG. 1, initiated by the PAD server 148, of FIG. 1.

Table 6 shows an exemplary tabular representation for the statistical engine table 176B of the MYSQL DB server 150, of FIG. 1, for storing viewing habits of each user periodically, for example on an hourly basis, as obtained from the client device 102, of FIG. 1. As shown in the Table 6, there are five columns, namely a user ID, an event name, an event genre, and audio language and a start and end time stamp.

| USER | EVENT NAME | EVENT GENRE | AUDIO LANGUAGE | START AND END TIME-STAMP |
|---|---|---|---|---|
| DAD OR S100.U1 | BREAKING NEWS | NEWS | ENGLISH | 20.00-20.25 |

-continued

| USER | EVENT NAME | EVENT GENRE | AUDIO LANGUAGE | START AND END TIME-STAMP |
|---|---|---|---|---|
| MOM OR S100.U2 | DESPERATE HOUSEWIVES | SERIAL | SPANISH | 20.26-20.45 |
| BROTHER OR S100.U3 | US IDOL | MUSIC | ENGLISH | 20.46-21.00 |

The data stored in the statistical engine table 176B is used by the advertisement selection module 164 of the PAD server 148, as shown in FIG. 3, to derive a user group for each registered user. The frequency of updation of the statistical engine table 176B depends on a number of users watching TV during an hourly monitoring window.

For example, the Table 6 shows a sample set from 20-21 hrs in 24 hr format sent from the statistical engine 120 to the PAD server 148, of FIG. 1, wherein three (3) different users, for instance Dad, Mom and Brother, in a household watched different events, namely Breaking News, Desperate Housewives and US Idol. The data received from the client device 102, of FIG. 1, will have three (3) different entries in the statistical engine table 176B corresponding to the user IDs of the three (3) different users.

Table 7 shows an exemplary tabular representation for storage of an entry corresponding to a user, for example Mom, from the sample set of data from Table 106. As shown in the Table 7, there are four columns, namely a serial number, a corresponding field(s), a corresponding description of the field, and a corresponding sample data for the field, obtained as sample set from the client device 102.

| SERIAL NUMBER | FIELDS | DESCRIPTION | SAMPLE DATA |
|---|---|---|---|
| 1 | USERID | A UNIQUE IDENTIFICATION NUMBER TO IDENTIFY A USER IN A HOUSEHOLD, FOR EXAMPLE USER IDs OF DAD, MOM AND BROTHER WILL BE DIFFERENT | S100.U2 (MOM) |
| 2 | EVENT NAME | AN EVENT NAME WATCHED BY MOM AS RECEIVED WITHIN ONE HOUR | "DESPERATE HOUSEWIVES" |
| 3 | EVENT GENRE | AN EVENT GENRE WATCHED BY MOM AS RECEIVED IN ONE HOUR | SERIAL |
| 4 | WATCH_START_TIME | A START TIME OF THE EVENT WATCHED BY MOM AS RECEIVED IN ONE HOUR | 15$^{th}$ Jan 2013 20.26:00 |
| 5 | WATCH_END_TIME | AN END TIME OF THE EVENT WATCHED BY MOM AS RECEIVED IN ONE HOUR | 15$^{th}$ Jan 2013 20.45:00 |
| 6 | AUDIO_LANGUAGE | AN AUDIO LANGUAGE OF THE EVENT WATCHED BY MOM AS RECEIVED IN ONE HOUR | SPANISH |
| 7 | RECEIVED_TIMESTAMP | A DATE AND A TIME STAMP ON WHICH USER DATA FROM A STATISTICAL ENGINE, FOR EXAMPLE THE STATISTICAL ENGINE 120 WAS RECEIVED BY A PAD SERVER, FOR EXAMPLE THE PAD SERVER 148, OF FIG. 1 | 15$^{TH}$ JAN 2013 21:00:00 |

Table 8 shows an exemplary tabular representation for a user group table, for example the user group table 176C, of MYSQL DB server 150, of FIG. 1, for storage of a derived user group of each user. As shown in the Table 8, there are four columns, namely a serial number, a corresponding field(s), a corresponding description of the field, and a corresponding sample data for the field.

| SERIAL NUMBER | FIELDS | DESCRIPTION | SAMPLE DATA |
|---|---|---|---|
| 1 | USERID | A SUBSCRIBER ID AND A USER ID OF A NEW USER, UPDATED ONLY ONE TIME AFTER RECEIVING A WHOAMI REQUEST FROM CLIENT DEVICE 102 | S100.U1 |
| 2 | USER_GROUP | SPECIFIES TO WHICH USER GROUP THE NEW USER BELONGS TO, UPDATED BY A PAD SERVER, FOR EXAMPLE THE PAD SERVER 148, OF FIG. 1, IN A WAKEUP TASK, ONCE IN A MONITORING 3 MONTHS WINDOW PERIOD (TIME PERIOD IS CONFIGURABLE) | C4EMH |
| 3 | PROFILE_START_DATE | THE PAD SERVER 148 WILL FETCH REQUIRED DATA FROM A STATISTICAL ENGINE TABLE, FOR EXAMPLE THE STATISTICAL ENGINE TABLE 176B, OF A MYSQL DB SERVER, FOR EXAMPLE THE MYSQL DB SERVER 150, OF FIG. 1, STARTING FROM A PROFILE_START_DATE, TO IDENTIFY THE USERGROUP | 15$^{TH}$ JAN. 2013 |
| 4 | PROFILE_END_DATE | A PAD SERVER, FOR EXAMPLE THE PAD SERVER 148, OF FIG. 1, WILL FETCH THE REQUIRED DATA FROM THE STATISTICAL ENGINE TABLE 176B, UP TO A | 17$^{TH}$ APR. 2013 |

| SERIAL NUMBER | FIELDS | DESCRIPTION | SAMPLE DATA |
|---|---|---|---|
| | | PROFILE_END_DATE (FROM THE PROFILE_START_DATE), TO IDENTIFY THE USERGROUP | |

As shown in the Table 8, the user group table 176C stores a derived user group of each user. The user group is derived based on viewing habits of each user captured over a configurable period of time, for example monitoring three (3) months window period, from the statistical engine table 176B of MYSQL DB server 150, of FIG. 1. In some embodiments, if the data from the statistical engine 120 in the client device 102, of FIG. 1, is received for the first time for a new user, the PAD server 148, of FIG. 1, will add the received data from the statistical engine 120 to the statistical engine table 176B with a user group as blank or null. The PAD server 148 sets a start date as a received time stamp date and sets an end date by adding a configurable monitoring window period of the statistical engine 120, for example three (3) months, to the already set start date. The data from the statistical engine 120 received for the entire three (3) months period is required to accurately identify a user group of a specific user. Once the user group of an existing user is identified in the configurable monitoring window period, for example three (3) months, the start date and end date are modified to next three (3) months monitoring window period. Only once in three (3) months, the process of identification of a user group will be repeated, because some users may move from one user group to another because of change in age or change in a employment status and so on. The user group table 176C is checked daily in a wakeup task performed by the PAD server 148, but updated only once in a monitoring window period, for example 3 months.

Table 9 shows an exemplary tabular representation for an advertisement sequence table, for example the advertisement sequence table 176D of MYSQL DB server 150, of FIG. 1, for storage of a sequence of advertisement assets to be displayed for each user group. As shown in the Table 9, there are four columns, namely a serial number, a corresponding field(s), a corresponding description of the field, and a corresponding sample data for the field.

| SERIAL NUMBER | FIELDS | DESCRIPTION | SAMPLE DATA |
|---|---|---|---|
| 1 | USER_GROUP | A USERGROUP DERIVED BASED ON THE DATA RECEIVED FROM A STATISTICAL ENGINE TABLE, FOR EXAMPLE THE STATISTICAL ENGINE TABLE 176B OF A MYSQL DB SERVER 150, OF FIG. 1 | C4EMH |
| 2 | ASSET_SEQUENCE | A SEQUENCE IN WHICH ADVERTISEMENT ASSETS OF THE USERGROUP NEEDS TO BE DISPLAYED IN A CLIENT DEVICE, FOR EXAMPLE THE CLIENT DEVICE 102, OF FIG. 1 | A1015, A1013, A1014, A1015, A1013, A1014, A1015 ... |

The advertisement sequence table 176D is used to store a sequence of advertisement assets to be displayed for each user group. The advertisement sequence table 176D will be updated daily by a first tier daily-based wakeup tasks, as performed by a routine wakeup tasks performance module, for example the routine wakeup tasks performance module 182 of a performance optimization component, for example the performance optimization component 180, of FIG. 1, initiated by the PAD server 148, of FIG. 1.

Table 10 shows an exemplary tabular representation for a WHOAMI table, for example the WHOAMI table 176E (not explicitly shown and described hereat), of the MYSQL DB server 150, of FIG. 1, for storage of overall configuration details of the client device 102 to the PAD server 148 during the first time boot-up. As shown in the Table 10, there are four columns, namely a serial number, a corresponding field(s), a corresponding description of the field, and a corresponding sample data for the field.

| SERIAL NUMBER | FIELDS | DESCRIPTION | SAMPLE DATA |
|---|---|---|---|
| 1 | SUBSCRIBER_ID | A UNIQUE IDENTIFICATION NUMBER, ASSIGNED TO EACH CLIENT DEVICE, | S000001 |

| SERIAL NUMBER | FIELDS | DESCRIPTION | SAMPLE DATA |
|---|---|---|---|
| 2 | DEVICE_TYPE | FOR EXAMPLE THE CLIENT DEVICE 102 (BY A PAD SERVER, FOR EXAMPLE THE PAD SERVER 148, OF FIG. 1) A DEVICE TYPE OF THE CLIENT DEVICE 102. FOR EXAMPLE, TV, STB, PC, CLOUD CLIENT, IPAD, ETC. | STB |
| 3 | DEVICE_MODEL | A MODEL NUMBER OF THE CLIENT DEVICE 102 | 29VRT |
| 4 | IMAGE_FORMATS_SUPPORTED | IMAGE FORMATS SUPPORTED BY THE CLIENT DEVICE 102 | JPG, PNG, GIF |
| 5 | VIDEO_FORMATS_SUPPORTED | VIDEO FORMATS SUPPORTED BY THE CLIENT DEVICE 102 | MPEG4 |
| 6 | MAC_ADDR | A PHYSICAL MAC ADDRESS/SET-TOP BOX (STB) ID OF THE CLIENT DEVICE 102 | 45C6734 |
| 7 | FEATURE_SUPPORTED | KEY FEATURES SUPPORTED BY THE CLIENT DEVICES 102 | PVR |
| 8 | IP_ADDRESS | AN IP ADDRESS OF THE CLIENT DEVICE 102 | 10.75.2.21 |

The WHOAMI Table 176E stores overall configuration data (or capability details), as shown in the Table 10, sent by the client device 102 to the PAD server 148 during the first time boot-up. Upon storing the overall configuration data received, the PAD server 148 assigns a unique subscriber ID to each of the client device 102. The overall capability data is used by the PAD server 148 to send a right type of advertisement asset to the client device 102.

Table 11 shows an exemplary tabular representation for an advertisement display tracker table, for example the advertisement display tracker table 176F of MYSQL DB server 150, of FIG. 1, for tracking details of advertisement assets displayed on a client device, for example the client device 102, and feedback of a user of the client device 102 through an advertisement companion asset. As shown in the Table 11, there are three columns, namely field(s), a corresponding description of each of the fields, and a corresponding sample data for each of the fields.

| FIELDS | DESCRIPTION | SAMPLE DATA |
|---|---|---|
| SUBSCRIBER_ID | A UNIQUE IDENTIFICATION NUMBER OF SUBSCRIBER WHERE AN ADVERTISEMENT ASSET IS DISPLAYED | S100 |
| USER_ID | A USER ID TO WHICH THE ADVERTISEMENT ASSET IS DISPLAYED | S100.U1 |
| DISPLAYED_ASSETID | AN ASSET ID OF THE ADVERTISEMENT ASSET IMAGE DISPLAYED ON A CLIENT DEVICE, FOR EXAMPLE THE CLIENT DEVICE 102 | A1010 |
| ASSET_DISPLAY_DURATION | AN ACTUAL DISPLAY DURATION OF THE ADVERTISEMENT ASSET IN SECONDS | 3 SEC |
| ASSET_DISPLAYED_TIMESTAMP | A DATE/TIME ON WHICH THE ADVERTISEMENT ASSET WAS DISPLAYED | $7^{TH}$ JAN 2013 08:29:46 |
| USER_FEEDBACK | USERS FEEDBACK ON THE ADVERTISEMENT ASSET DISPLAYED | INTERESTED |

As shown in the Table 11, the advertisement display tracker table 176F keeps track of details of advertisement assets displayed on the client device 102, and feedback of a user of the client device 102 feedbacks through an advertisement companion asset. The advertisement display tracker table 176F will be updated by the PAD server 148 as and when the advertisement asset is displayed on the client device 102, which may be frequent, for example 3 seconds. Upon displaying the advertisement asset image, the client device 102 sends an advertisement display tracking request to the PAD server 148, which is parsed and stored in the advertisement display tracker table 176F, which is done as a part of the second tier dynamic on-the-fly (or real-time) tasks, as performed by the dynamic user request processing module 184 of the performance optimization component 180, of FIG. 1.

Table 12 depicts an exemplary tabular representation for an actual impression tracker table for tracking the number of times each advertisement asset is displayed for each user on each day. As shown in the Table 12, there are three columns, namely, a field(s), a corresponding description of each of the fields, and a corresponding sample data for each of the fields.

actual impression tracker table 176G will be updated by the PAD server 148 as and when the advertisement asset is displayed on the client device 102. The actual impression tracker table 176G is updated as part of the second tier dynamic on-the-fly (or real-time) tasks, as performed by the dynamic user request processing module 184 of the performance optimization component 180, of FIG. 1, initiated by the PAD server 148. The actual impressions per advertisement asset is archived and updated in the CUMULATIVE_ACTUAL_IMPRESSIONS_PERDAY_PERUSER field in the asset table 176A, by the first tier daily-based wakeup tasks, as performed by the routine wakeup tasks performance module 182 of the performance optimization component 180, of FIG. 1, initiated by the PAD server 148. Until the cumulative actual impression of each advertisement asset reaches a total targeted impression, an asset status (or the status of an asset) will be maintained as active.

Table 13 shows an exemplary tabular representation for a billing table, for example the billing table 176H of MYSQL DB server 150, of FIG. 1, for managing a list of advertisers.

| FIELDS | DESCRIPTION | SAMPLE DATA |
|---|---|---|
| USERID_ASSETID | A USERID AND AN ASSET ID COMBINED TO FORM COMPOSITE DATABASE FIELD TO SPECIFY TO WHICH USER THE ADVERTISEMENT ASSET WAS DISPLAYED | S100.U1_A1010 |
| CUMULATIVE_ACTUAL_IMPRESSIONS_PERDAY_PERUSER | AN ACTUAL NUMBER OF TIMES AN ADVERTISEMENT ASSET GOT DISPLAYED FOR A SPECIFIC USER IN A GIVEN DAY | 12 |
| DISPLAYED_DATE | A DATE ON WHICH THE ACTUAL IMPRESSIONS GOT DISPLAYED | $7^{TH}$ JAN. 2013 |

As shown in the Table 12, the actual impression tracker table 176G keeps track of the number of times each advertisement asset is displayed for each user on each day. The As shown in the Table 13, there are three columns, namely a field(s), a corresponding description of each of the fields, and a corresponding sample data for each of the fields.

| FIELDS | DESCRIPTION | SAMPLE DATA |
|---|---|---|
| ADVERTISERID | A UNIQUE IDENTIFICATION NUMBER TO IDENTIFY EACH REGISTERED ADVERTISER WHICH IS AUTO GENERATED BY A WEB SERVER, FOR EXAMPLE THE WEB SERVER 154, OF FIG. 1 | ADV0000 |
| BRANDNAME | THE COMPANY NAME OF THE REGISTERED ADVERTISER | ROLEX ® |
| CONTACT DETAILS | AN EMAIL, ADDRESS AND CONTACT PHONE OF THE REGISTERED ADVERTISER | |
| INITIALADCOST | A PERCENTAGE OF A TOTAL ESTIMATED COST OF AN ADVERTISEMENT WHICH HAS TO BE PAID BY THE ADVERTISER AT THE START TO MAKE A CAMPAIGN ACTIVE | $1000 |
| TOTALESTIMATEDADCOST | A TOTAL ESTIMATED COST FOR EACH ADVERTISEMENT IMAGE ASSET, CALCULATED BY A BILLING SERVER, FOR EXAMPLE THE BILLING SERVER 156, OF FIG. 1, WHEN THE ADVERTISEMENT ASSET IS UPLOADED OR EDITED BY THE ADVERTISER. AN ACTUAL BILLING MAY DIFFER BASED ON THE ACTUAL DISPLAYED IMPRESSIONS | $10000 |

| FIELDS | DESCRIPTION | SAMPLE DATA |
|---|---|---|
| PROGRESSIVEADCOST | A PROGRESSIVE COST CALCULATED PERIODICALLY BY THE BILLING SERVER 156 FOR ACTUAL DISPLAYED IMPRESSIONS FOR THE ASSET | $350 |

The billing table 176H maintains a list of advertisers. The advertisers have to register with contact details through the web server 154, of FIG. 1. As shown in the Table 13, the TOTALESTIMATEDADCOST and INITIALADCOST are calculated and updated by the billing server 156 when the advertiser uploads the advertisement asset image. The PROGRESSIVEADCOST in the billing table 176H is updated daily, and informed to the advertiser periodically based on a business model agreed and executed with the advertiser.

Table 14 shows an exemplary tabular representation for an average watch duration table, for example the average watched duration table 176I of MYSQL DB server 150, of FIG. 1, for storing the average watch duration for each user for each genre for all predefined time slots for weekdays and weekends. As shown in the Table 14, there are three columns, namely a field(s), a corresponding description of each of the fields, and a corresponding sample data for each of the fields.

| FIELDS | DESCRIPTION | SAMPLE DATA |
|---|---|---|
| USERID | A UNIQUE IDENTIFICATION NUMBER TO IDENTIFY EACH USER ASSOCIATED TO A SUBSCRIBER | S100.U1 (DAD) |
| EVENTGENRE | AN EVENT GENRE WATCHED BY EACH USER ASSOCIATED TO THE SUBSCRIBER IN THE 3 MONTHS MONITORING WINDOW PERIOD | NEWS |
| TIMESLOT6TO8 | AVERAGE WATCHED DURATION OF EACH USER ASSOCIATED TO THE SUBSCRIBER FOR EACH EVENT GENRE FOR A TIME SLOT IN A DAY. (BASED ON 3 MONTHS DATA) | 0 |
| TIMESLOT8TO11 | AVERAGE WATCHED DURATION OF THE USER FOR EACH EVENT GENRE FOR THE TIME SLOT IN A DAY. (BASED ON 3 MONTHS DATA) | 30 HRS |
| TIMESLOT11TO14 | AVERAGE WATCHED DURATION OF THE USER FOR EACH EVENT GENRE FOR THE TIME SLOT IN A DAY. (BASED ON 3 MONTHS DATA) | 60 HRS |
| TIMESLOT14TO16 | AVERAGE WATCHED DURATION OF THE USER FOR EACH EVENT GENRE FOR THE TIME SLOT IN A DAY. (BASED ON 3 MONTHS DATA) | 0 |
| TIMESLOT16TO19 | AVERAGE WATCHED DURATION OF THE USER FOR EACH EVENT GENRE FOR THE TIME SLOT IN A DAY. (BASED ON 3 MONTHS DATA) | 0 |
| TIMESLOT19TO23 | AVERAGE WATCHED DURATION OF THE USER FOR EACH EVENT GENRE FOR THE TIME SLOT IN A DAY. (BASED ON 3 MONTHS DATA) | 45 MIN |
| TIMESLOT23TO6 | AVERAGE WATCHED DURATION OF THE USER FOR EACH EVENT GENRE FOR THE TIME SLOT IN A DAY. (BASED ON 3 MONTHS DATA) | 0 |

The average watch duration table 176I stores the average watch duration for each user for each genre for all predefined time slots for weekdays and weekends. The average watch duration table 176I is updated by a daily wakeup task performed by the DB server 150, for example MYSQL DB server, based on a previous (or preceding) three (3) months data from the statistical engine 120 available for each user.

FIG. 27 depicts a flow diagram for a method 2700 for method for managing display of personalized advertisements in a user interface (UI) of an on-screen interactive program guide (IPG), according to one or more embodiments.

The method 2700 starts at step 2702 and proceeds to step 2704. At step 2704, the method 2700 comprises facilitating determining whether a user group of a current primary user matches with at least one of targeted user groups. In order to determine whether the user group of the current primary user matches with at least one of the targeted user groups, the method 2700 facilitates identification of the current primary user and the user group for the current primary user. The method 2700 implements a PAD server, for example the PAD server 148, of FIG. 1. The PAD server 148 identifies the current primary user and the user group for the current primary user. Further, in order to identify the current primary user and the user group for the current primary user, the method 2700 facilitates scanning an input fingerprint of each user on each one of frequently used control keys of a remote control. In some embodiments, a client device, for example the client device 102, of FIG. 1, is adapted to implement fingerprint scanning using fingerprint scanners. The fingerprint scanning is only implemented on each one of the frequently used control keys of the remote control, for example channel up/down and select. In general, there are two types of fingerprint scanners, namely the optical scanner and capacitance scanner. The basic function of the two types of scanners is to get an image of the fingerprint of a user and find a match for the fingerprint of the user. Upon scanning the input fingerprint of each user on each one of the frequently used control keys of the remote control device, the method 2700 facilitates comparing the input fingerprint of each user with a reference fingerprint of the current primary user. For example, the fingerprint scanner in the client device 102 matches the input fingerprint of each user with the reference fingerprint of the current primary user. Still further, the method 2700 facilitates deriving user identifier information of the current primary user based on the comparison.

The PAD server 148 implements a set of rules, for example the RULES 1-8, derived from a survey database, for example the survey database 174. The RULES 1-8 are applied on the data from a statistical engine, for example the statistical engine 120 of the client device 102, of FIG. 1, obtained from users, based on the viewing patterns of the users, to identify a user group.

The PAD server 148 facilitates determining whether a user group of a current primary user using a client device matches with a targeted user group. For example, if a user group of a current primary user using the client device 102, of FIG. 1, in the Table 2, and a targeted user group in the Table 3, matches, a corresponding advertisement image selected from the advertisement sequence for the matched user group, calculated for a given day is delivered to the client device 102. The method 2700 proceeds to step 2706.

At step 2706, the method 2700 comprises facilitating selectively adding advertisement asset images corresponding to the matched user group into an advertisement bouquet. The method 2700 implements an advertisement selection module, for example the advertisement selection module 164 of the PAD server 148, as shown in FIG. 3. The advertisement selection module 164 selects an advertisement bouquet based on the user group to which the current primary user belongs to. The user group to which the current primary user belongs to is in turn based on target audience input provided by an advertiser and a user group to which a user currently watching a client device 102 belongs to. The method 2700 proceeds to step 2708.

At step 2708, the method 2700 comprises facilitating calculating a number of impressions of each of the advertisement asset images to display to the current primary user on a given day. The method 2700 implements a target impression calculation module, for example the target impression calculation module 166 of the PAD server 148, as shown in FIG. 3. The target impression calculation module 166 derives the number of impressions of an advertisement asset images to be displayed (or to display) per user per day, namely ((NUMBER OF IMPRESSIONS)/(DAY*USER)) or NI), in UI screens of the client device 102, based on one or more parameters.

The method 2700 facilitates deriving the number of impressions of advertisement asset images to display to the current primary user on the given day based on the total number of impressions of an advertisement asset image for a product specified by an advertiser under an advertisement campaign, the duration of the advertisement campaign in days specified by the advertiser and the number of users in a targeted user group to which the advertisement asset image for the product is to be served. Specifically, the target impression calculation module 166 derives the NI based on a first parameter, namely NI_TOTAL, second parameter, namely CAMPAIGN_DAYS, and third parameter, namely NU. The first parameter NI_TOTAL refers to the total number of impressions of an advertisement image asset, as specified by an advertiser as part of an advertisement campaign. The second parameter CAMPAIGN_DAYS refers to the duration of the advertisement campaign in days, as specified by an advertiser. The third parameter NU refers to the number of users in a targeted user group to which the advertisement image asset can be served or delivered.

The method 2700 facilitates calculation of the number of impressions of advertisement asset images to display for the current primary user for the given day for all active advertisement asset images, as part of a first tier daily-based wakeup tasks, since the remaining duration in days of the advertisement campaign and the total number of remaining impressions for all active advertisement asset images change every day. For example, the first tier daily-based wakeup tasks (not explicitly shown and described hereat), is performed during graveyard slot by a routine wakeup tasks performance module, for example the routine wakeup tasks performance module 182, of a performance optimization component, for example the performance optimization component 180, of FIG. 1.

The method 2700 facilitates updating the number of impressions for an advertisement asset image displayed to all users on a preceding day in an actual impression tracker table, for example the actual impression tracker table 176G (not explicitly shown and described hereat) of a MYSQL DB server, for example the MYSQL DB server 150, of FIG. 1, as part of the first tier daily-based wakeup tasks for the given day.

For example, the number of impressions displayed on a previous day for all users for a given, selected advertisement asset image, namely NI_ACTUAL_PREVDAY, is updated in an actual impression tracker table, for example the actual impression tracker table 176G (not explicitly shown and described hereat) in the MYSQL DB server 150, of FIG. 1, as part of the first tier daily-based wakeup tasks (not explicitly shown and described hereat), as performed by the routine wakeup tasks performance module 182 of the performance optimization component 180, for a current day.

In order to the update the number of impressions for the advertisement asset image displayed to all the users on the preceding day in the actual impression tracker table 176G, the method 2700 facilitates determining the achievement of the target number of impressions for the advertisement asset image for the current day. For example, if the target number of impressions for the given, selected advertisement asset image for the current day, namely NI_TODAY, is not met. Stated differently, if the total actual impressions displayed is less than NI_TODAY for the given, selected advertisement asset image, then the backlog is added to the total remaining impressions, namely NI_REM.

Upon determining failure in the achievement of the target number of impressions for the advertisement asset image for the current day, the method 2700 facilitates adding a backlog number of impressions to the total remaining impressions upon failure to achieve the target number of impressions for the advertisement asset image for the current day.

Upon adding the backlog number of impressions, the method 2700 facilitates computing the total remaining impressions as a difference the total remaining impressions on a start day of the advertisement campaign and the number of impressions displayed on the preceding day for all users for an advertisement asset image. The method 2700 proceeds to step 2710.

At step 2710, the method 2700 comprises facilitating calculating an advertisement sequence for each of the advertisement asset images to display to the current primary user on a given day.

The method 2700 implements an advertisement sequence calculation module, for example the advertisement sequence calculation module 168 of the PAD server 148, as shown in FIG. 3. The advertisement sequence calculation module 168 determines a sequence for display of a set of advertisement images from an advertisement bouquet for a user group, for example the user group of the current primary user.

In some embodiments, the sequence in which a given, selected advertisement asset image is displayed for a specific user profile depends on one or more factors, such as a priority of advertisement asset images, revenue expected, brand value, and so forth, a loyalty index of an advertiser, and remaining advertisement impressions.

In some embodiments, an advertisement sequence for each cycle of opportunity is concatenated and stored in the MYSQL DB server 150, of FIG. 1, for a user group, till the targeted impressions and ranking indices of all advertisement assets in an advertisement bouquet for the user group for a given day becomes zero.

At step 2710, the method 2700 further comprises retaining or maintaining a position of an advertisement asset to be displayed next, to be precise the last displayed advertisement asset position+1, in an advertisement sequence for each user. Upon display of each advertisement asset as per a stored advertisement sequence, the position of next advertisement asset to be displayed for each user is updated in the MYSQL database of the MYSQL DB server 150.

At step 2710, the method 2700 further comprises facilitating calculating the loyalty index [LI] of an advertiser is calculated by an MSO based on one or more factors. For example, the loyalty index [LI] of an advertiser is calculated based on 1) the advertiser is at least one of a first time or repeat customer of the MSO; 2) number of times the advertiser has advertised with the MSO before, if the advertiser is a repeat customer; 3) advertisement revenue from repeat business from the advertiser with the MSO, in last one year including the current one; 4) timely payment behavior and history of the advertiser; and 5) early termination or cancellation history or behavior of the advertiser in any and all advertisement campaigns before the minimum campaign duration. Each of the five factors for calculation of LI of an advertiser carries a weightage, for example a numerical value of 1, and the sum is the LI, which can vary from a minimum weightage, for example a numerical value of 1, to a maximum weightage, for example a numerical value of 5.

At step 2710, the method 2700 further comprises facilitating calculating the priority [P] of an advertiser by an MSO based on based on one or more factors. For example, the priority [P] of an advertiser is calculated based on 1) campaign duration, for instance duration above (>) six (6) months is considered HIGH, duration between three (3) to six (6) months, i.e. 3 months<= and <=6 months is considered MEDIUM, whereas duration below (<) three (3) months is considered LOW priority; 2) total advertisement revenue expected from the advertiser, for instance the revenue in RANGE1 is considered HIGH, in RANGE2 is considered MEDIUM, whereas in RANGE3 is considered LOW, wherein the RANGE1>=2*RANGE2; and wherein RANGE2>=2*RANGE3. In some scenarios, advertisers give better revenue to MSO after bidding, for high demand and frequently used screen spaces in UIs.

At step 2710, the method 2700 further comprises designing and implementing a rule in order to arrive at an advertisement sequence in an activity under the first tier daily-based wakeup tasks as performed by the daily routine wakeup tasks performance module 182 of the performance optimization component 180, of FIG. 1. For example, if the total number of advertisement assets in the advertisement bouquet are greater than (>) 3, and if the top $\frac{1}{3}^{rd}$ ranked advertisement assets based on ranking indices (or $\frac{1}{3}^{rd}$ of the ranks of the top three (3) ranked assets) is greater than and equal to (>=) 3, then the number of advertisement assets to be displayed in an advertisement sequence is equal to the top $\frac{1}{3}^{rd}$ ranked assets of the advertisement bouquet, rounded off to a higher integer. Else if, the top $\frac{1}{3}^{rd}$ ranked assets is less than (<) 3, then number of advertisement assets to be displayed in the decreasing order of ranking indices, is equal to top 3 ranked assets. Else if, the total number of assets in the advertisement bouquet is less than (<) 3, then the number of assets to be displayed in the decreasing order of ranking indices is all the assets in the advertisement bouquet.

In some scenarios, if the ranking indices for two or more assets are same, then an asset not displayed yet is picked up first. In some embodiments, the minimum of the top three (3) ranked assets are set to be displayed in the decreasing order of ranking indices, to reduce boredom and to increase engagement level of a user. The factor 3 (for the top $\frac{1}{3}^{rd}$ rule) is configurable by an MSO, as part of the operator settings.

Thus, instead of displaying the top two (2) ranked assets, with corresponding asset IDs the top three (3) ranked assets with corresponding asset IDs in descending order of ranking indices are displayed in a first ($1^{st}$) advertisement opportunity.

Upon placement of a first ($1^{st}$) set of advertisements in the first ($1^{st}$) advertisement opportunity, the ranking indices are again calculated and ranks determined for a second ($2^{nd}$) advertisement opportunity. The method 2700 proceeds to step 2712.

At step 2712, the method 2700 comprises facilitating optimizing performance for delivery and display of the advertisement asset images. The method 2700 implements a performance optimization component, for example the performance optimization component 180, of FIG. 1. The performance optimization component 180, in turn, implements a routine wakeup tasks performance module, for example the routine wakeup tasks performance module 182. The routine wakeup tasks performance module 182 implements a first tier daily-based wakeup tasks. The ins-and-outs in connection with the implementation of the first tier daily-based wakeup tasks, as performed by the routine wakeup tasks performance module 182 has been explained in conjunction with FIG(S). 21A-B. Further, the performance optimization component 180, in turn, implements a dynamic user request processing module, for example the dynamic user request processing module 184. The dynamic user request processing module 184 implements a second tier dynamic on-the-fly (or real-time) tasks. The ins-and-outs in connection with the implementation of the second tier dynamic on-the-fly (or real-time) tasks, as performed by the routine wakeup tasks performance module 182 has been explained in conjunction with FIG. 22. The method 2700 proceeds to step 2714.

At step 2714, the method 2700 comprises displaying the advertisement asset images during at least one of organizing, navigating, gifting, downloading and buffering at least one of AV and multimedia contents. The method 2700 proceeds to step 2716 and ends.

In some embodiments, large amount of traffic is generated due to simultaneous and/or multiple requests initiated from the client devices. The large amount of traffic may become a bottleneck that in turn may affect the fast delivery of advertisements. In some embodiments, the advertisements have to be served in the minimum possible time, so that users have a seamless viewing experience of both the advertisements and the watch TV application with no waiting period. For example, in some scenarios, large amount of traffic generated between the PAD sever 148 and the MYSQL DB server 150, of FIG. 1, due to simultaneous and/or multiple requests initiated from client devices, for example one or more of the client device 102, of FIG. 1, becomes a bottleneck that in turn may affect the speed of response of the PAD sever 148 and MYSQL DB server 150. Likewise, in some scenarios, the advertisements have to be served in the minimum possible time so that users have a seamless viewing experience of both the advertisements and the watch TV application 160, of the host UI applications 158, of FIG. 2, with no waiting period.

In some embodiments, performance optimization for facilitating fast delivery of the advertisements is disclosed. Specifically, the performance optimization facilitates fast delivery of advertisement asset images from the servers during (or responsive to) multiple and/or simultaneous requests from the client devices. More specifically, the performance optimization comprises implementation of one or more timely and dynamic tasks for selection and delivery of advertisement asset images to increase speed of response from the servers thereby facilitating fast delivery of the advertisement asset images during multiple and/or simultaneous requests from the client devices. For example, the performance optimization involves implementation of the one or more timely and dynamic tasks for selection and delivery of advertisement asset images in a two tier manner, namely a first tier daily-based wakeup tasks and a second tier dynamic on-the-fly (or real-time) tasks.

As shown in FIG. 1, the server subsystem 104 further comprises a performance optimization component 180. The performance optimization component 180 comprises a routine wakeup tasks performance module 182 and a dynamic user request processing module 184.

The performance optimization component 180 facilitates fast delivery of advertisement images during multiple and/or simultaneous requests from one or more of the client devices 102. In some scenarios involving multiple and simultaneous requests from the one or more client devices 102, one or more optimizations are performed for fast delivery of the advertisement images through a CDN.

In some scenarios involving the problem of large amount of traffic between the PAD sever 148 and the MYSQL DB server 150, the performance optimization component 180 facilitates implementation of one or more activities as part of the first tier daily-based wakeup tasks when user activities are at least one of minimum and nil in a time configurable by a MSO/LCO, for example the graveyard slot, for instance a time slot ranging approximately from a minimum of 2 AM to a maximum of 5 AM. Thus, the implementation of one or more activities as part of a first tier daily-based wakeup tasks ensures a minimum interaction with the MYSQL DB server 150 as part of a second tier dynamic on-the-fly (or real-time) tasks, to speed up the response of the PAD sever 148 and MYSQL DB server 150.

The term "graveyard slot" refers to a time period in which a television audience is very small compared to other times of the day, and therefore broadcast programming is considered far less important. Graveyard slots are usually in the early morning hours of each day, when most people are asleep. Because there is little likelihood of having a substantial viewing audience during this time period, providing useful television programming during this time is usually considered unimportant; some broadcast stations go off the air during these hours, and some audience measurement systems do not bother collecting measurements for these periods. Some broadcasters may do engineering/maintenance work at this time.

In some embodiments, the PAD server 148, MYSQL DB server 150 and advertisement asset server 152 are adapted to possess the following select specifications: architecture multi-core processor; number of computing component 1; number of independent actual CPUs (called "cores")>=4; operating frequency>=3.6 GHz and RAM specifications comprise size scalable RAM banks with RAM size>=16 GB.

By virtue of the selected specifications, the PAD server 148, MYSQLDB server 150 and advertisement asset server 152 facilitate rendering services in response to multiple and/or simultaneous requests from the client devices 102.

In some embodiments, the DB server 150 is adapted to possess the following select specifications: database name MYSQL; type relational database management system (RDBMS); database system architecture centralized; database model relational. By virtue of the selected specifications, the centralized MYSQL database, of the MYSQL DB server 150, clustered as proxies in different servers facilitates improvement of the speed of response for storing and fetching data by other servers. Additionally, in some scenarios, the number of Java Database Connectivity (JDBC®) connection pool size of the MYSQL DB server 150 is increased, for instance above 3000, to handle simultaneous requests from other servers. In alternate scenarios, the JDBC connection pool size of the MYSQL DB server 150 can be configured, for instance to 3000, based on the estimated number of simultaneous requests from the client devices 102 through the PAD server 148.

In some embodiments, one or more server infrastructure specifications facilitating improvement in the response time during scale-up to serve large number of the client devices are disclosed. In order to improve the response time during scale-up to serve large number of the client devices 102, the PAD server 148 and advertisement asset server 152 were replicated in proxy servers in different geographical locations. The replication of the PAD server 148 and advertisement asset server 152 in proxy servers in different geographical locations results in achievement of load balancing during large numbers of simultaneous requests from the client devices 102, for example approximately millions of the client devices 102 in a MSO broadcast network. By virtue of the disclosed infrastructure, at least one of the PAD server 148 and advertisement asset server 152 nearest to the client device will respond to requests quickly.

In some embodiments, the client devices 102 directly interact with the advertisement asset server 152, to fetch advertisement asset images based on the URL paths of the advertisement asset images. The advertisement asset server 152 extracts the binary file (or executable) of an advertisement asset image and sends to the client devices 102, using the Model-View-Controller (MVC) framework based software 178. In some embodiments, a CDN network 106 is used between the advertisement asset server 152 and client devices 102 to ensure that the advertisement asset images are delivered with minimum latency to the requesting client devices 102, in accordance with targeted user groups of the users.

In some embodiments, the first three (3) advertisement asset images from an advertisement sequence for each of the user groups, URLs of all advertisement asset images and the URLs of the corresponding advertisement companions are downloaded and cached in the client devices 102 during boot-up. The downloading and caching of the first three (3) advertisement asset images corresponding to each unique user groups in a household (or a subscriber), the URLs of the corresponding advertisement asset images and advertisement companions thereof facilitates quick display of the advertisement asset images with no waiting period in the UI screens of the client device 102, and reduction of the communication and traffic between the client devices 102, and the PAD server 148 and advertisement asset server 152.

In some embodiments, a numbered list comprising one or more first tier daily-based wakeup tasks is disclosed. For example, 1) changing the state of an advertisement image asset, for instance from at least one of an active to inactive and an inactive to active, based on the start and end dates of a given campaign, and a payment data of an advertiser; 2) performing an integrity check of the MYSQL database of the DB server 150, of FIG. 1, and deleting erroneous data in the MYSQL database of the DB server 150, prior to performance of implementation of queries and calculations on the MYSQL database of the DB server 150; 3) calculating the number of advertisement impressions per day per user (NI/USR_TODAY) for all active advertisement assets to be delivered to all identified user groups; 4) creating an advertisement sequence in which advertisement image assets have to be delivered for a given, selected day for each of advertisement bouquet for all user groups; 5) identifying user group to derive age, gender, marital status and employment status based on a consolidated data from the statistical engine 120, of FIG. 1, collected over a period of time, and identifying which user group a user belongs to; 6) performing transcoding of advertisement image assets based on a lookup table of image formats supported by the model of each client device 102, for example an advertisement asset in a PNG format is transcoded to corresponding image asset in a JPEG format and stored for a specific type (or model) of the client device 102; 7) synchronizing between at least one of the PAD server 148 and advertisement asset server 152, of FIG. 1, and respective proxies located across different geographical locations; 8) updating the cumulative actual impressions per asset displayed across all users in the asset table 176A of the DB server 150, of FIG. 1; and 9) updating the average watched duration per day per user per genre for all predefined viewing/viewed timeslots, based on the viewing history data of a user for at least a given, selected and configurable time period, for instance last three (3) months.

In some embodiments, a numbered list comprising one or more second tier on-the-fly (or real-time) tasks performed on a request from the client device, is disclosed. For example, 1) receiving one or more WHOAMI requests from different client devices, for instance one or more client devices 102, when the client devices 102 boot-up for the first time asynchronously, parsing and storing in the WHOAMI table 176E in the MYSQL database of the of the DB server 150; 2) upon receiving an advertisement display tracker request from the client device 102 upon display of advertisement images, 2a) updating the actual impression tracker table 176G, in the MYSQL® database of the DB server 150, with actual impressions and the corresponding timestamp for a user, and 2b) updating the advertisement display tracker table 176F with actual display duration, the user feedback and the corresponding timestamp; 3) extracting the binary file (or executable) of an advertisement asset image using the advertisement asset server 152, of FIG. 1, and sending the binary file to a requesting client device 102, in the event that the client device 102 does not have the advertisement asset image cached in its persistent storage memory; and 4) extracting the binary file of an advertisement companion image asset of the an advertisement asset image by the advertisement asset server 152 and delivering to the requesting client device 102.

In some embodiments, the routine wakeup tasks performance module 182 is implemented on a daily basis. In some embodiments, the routine wakeup tasks performance module 182 facilitates implementation of the first tier daily-based wakeup tasks. The first tier daily-based wakeup tasks are implemented proactively to keep advertisement image assets ready to deliver from the PAD sever 148 and MYSQL DB server 150, before active requests are received from the client devices 102.

Specifically, the routine wakeup tasks performance module 182 changes the status of an advertisement asset, i.e. at least one of active and inactive, based on one or more parameters, for example on a start and an end date of an advertisement campaign, and an advertiser's payment data. The routine wakeup tasks performance module 182 performs integrity check of the MYSQL database in the MYSQL DB server 150. In some scenarios, erroneous data in the MYSQL database are at least one of cleaned up and deleted during the integrity check of the of the MYSQL database, before queries or calculations. The routine wakeup tasks performance module 182 calculates the number of advertisement impressions per day per user, namely NI/USR_TODAY, for all active advertisement assets to be delivered to all identified user groups. The routine wakeup tasks performance module 182 creates advertisement sequence in which advertisement assets have to be delivered for a given, selected day for each advertisement bouquet for all user groups. The routine wakeup tasks performance module 182 derives one or more attributes of users, such as age, gender, marital and employment status, based on the consolidated statistical engine data collected over a period of time to identify which user group a user belongs to. The routine wakeup tasks performance module 182 performs transcoding of one or more image assets based on a look-up table of image formats supported by each client device 102. For example, a Portable Network Graphics (PNG) image file format transcoded to Joint Photographic Experts Group (JPEG) image file format is stored for a specific type of the client device type 102. The routine wakeup tasks performance module 182 performs synchronization between at least one of the PAD server 148, advertisement asset server 152 and corresponding proxies located across different geographical locations. The routine wakeup tasks performance module 182 updates the cumulative actual impressions per asset displayed across users in an asset table 176A of the DB server 150, for example MYSQL DB server. The routine wakeup tasks performance module 182 updates the average watched duration per day per user per genre (the average watched duration/day/user/genre) for all predefined viewing time slots, based on the viewing history data of a user for a configurable period of time, for example 3 months.

FIG(S). 21A-B is a flow diagram of a method 2100 for implementation of the first tier daily-based wakeup tasks, as performed by the routine wakeup tasks performance module 182, of FIG. 1, according to one or more embodiments. The method 2100 embodies the deployment and implementation of the routine wakeup tasks performance module 182 of the performance optimization component 180.

The method 2100 starts at step 2102 and proceeds to step 2104. At step 2104, the method 2100 facilitates implementation of the routine wakeup tasks performance module 182 for performing an integrity check on a database storing data provided by advertisers and data obtained from the client devices 102. The routine wakeup tasks performance module 182 performs the integrity check of the MYSQL database in the MYSQL DB server 150 to detect erroneous data. In some scenarios, the erroneous data in the MYSQL database are at least one of cleaned up and deleted during the integrity check of the MYSQL database, prior to implementation of queries and calculations on the MYSQL database of the DB server 150. The method 2100 proceeds to step 2106.

At step 2106, the method 2100 facilitates implementation of the routine wakeup tasks performance module 182 for changing the state of an advertisement image asset. For instance from at least one of an active to inactive and vice versa, based on the start and end dates of an advertisement campaign, and the payment data of an advertiser. The method 2100 proceeds to step 2108.

At step 2108, the method 2100 facilitates implementation of the routine wakeup tasks performance module 182 for updating the average watched duration for a given day of each user for each genre for all predefined, viewed timeslots, based on the viewing history data of a user for at least a given, selected and configurable time period, for example past 3 months. The method 2100 proceeds to step 2110.

At step 2110, the method 2100 facilitates implementation of the routine wakeup tasks performance module 182 for deriving a plurality of attributes for each user based on a consolidated data collected over a period of time for identification of a user group of a user. For example, the routine wakeup tasks performance module 182 derives an age, a gender, a marital status, an income and an employment status of a user based on a consolidated data from the statistical engine 120 collected over a period of time, and identifies which user group the user belongs to. The method 2100 proceeds to step 2112.

At step 2112, the method 2100 facilitates implementation of the routine wakeup tasks performance module 182 for updating the cumulative actual impressions for each advertisement image asset displayed across users in an asset table maintaining details related to each advertisement asset image. For example, the routine wakeup tasks performance module 182 updates the cumulative actual impressions for each advertisement image asset displayed across users in the asset table 176A of the MYSQL DB server 150. The method 2100 proceeds to step 2114.

At step 2114, the method 2100 facilitates implementation of the routine wakeup tasks performance module 182 for calculating the number of advertisement impressions for a given day for each user for all active advertisement asset images to be delivered to all identified user groups. For example, the routine wakeup tasks performance module 182 calculates the number of advertisement impressions per user per day, namely NI, for all active advertisement asset images to be delivered to all identified user groups. The method 2100 proceeds to step 2116.

At step 2116, the method 2100 facilitates implementation of the routine wakeup tasks performance module 182 for creating an advertisement sequence for delivery of the advertisement image assets for the given day for each advertisement bouquet for all the identified user groups. The method 2100 proceeds to step 2118.

At step 2118, the method 2100 facilitates implementation of the routine wakeup tasks performance module 182 for transcoding the advertisement image assets based on a lookup table of image formats supported by each of the client devices, for example each of the client devices 102. For example, an advertisement asset in a PNG format is transcoded to corresponding image asset in a JPEG format and stored for a specific type of the client device 102. The method 2100 proceeds to step 2120.

At step 2120, the method 2100 facilitates implementation of the routine wakeup tasks performance module 182 for synchronizing between at least one of a personalized advertisement (PAD) server and an advertisement asset server and respective proxies located across different geographical locations. For example, the routine wakeup tasks performance module 182 synchronizes between the PAD server 148 and advertisement asset server 152, and respective proxies, located across different geographical locations. The method 2100 proceeds to step 2122 and ends.

FIG. 22 is a flow diagram of a method 2200 for implementation of the second tier dynamic on-the-fly (or real-time) tasks, as performed by the dynamic user request processing module 184, of FIG. 1, according to one or more embodiments. The method 2200 embodies the deployment and implementation of the dynamic user request processing module 184 of the performance optimization component 180.

The method 2200 starts at step 2202 and proceeds to step 2204. At step 2204, the method 2200 facilitates implementation of the dynamic user request processing module 184 for receiving requests from client devices during first time asynchronous booting up of the client devices for parsing and storing the requests. For example, the dynamic user request processing module 184 parses and stores WHOAMI XML requests received from the different client devices, for instance the one or more client devices 102, in the WHOAMI table 176E of the MYSQL database server 150. The method 2200 proceeds to step 2206.

At step 2206, the method 2200 facilitates implementation of the dynamic user request processing module 184 for determining whether or not the persistent storage of a client device has in cache an advertisement asset image, and extracting using an advertisement server the binary (or executable) file of the advertisement image to send to a requesting client device. For example, the advertisement asset server 152 extracts the binary file of the advertisement asset image and sends to the requesting client device 102 in the event that the client device 102 does not have that the advertisement asset image cached in the persistent storage of the client device 102. The method 2200 proceeds to step 2208.

At step 2208, the method 2200 facilitates extracting using an advertisement asset server the binary file of a corresponding advertisement companion of the advertisement asset image for sending to requesting client devices. For example, the advertisement asset server 152 extracts the binary file of the corresponding advertisement companion of the advertisement asset image for sending to the requesting client devices 102. The method 2200 proceeds to step 2210.

At step 2210, the method 2200 facilitates implementation of the dynamic user request processing module 184 for updating an actual impression tracker with actual displayed impressions and the corresponding timestamp for a user, in addition to updating an advertisement display tracker table with actual display duration, user feedback and corresponding timestamp, upon receipt of a request for an advertisement display tracker from a client device subsequent to display of advertisement image assets. For example, the dynamic user request processing module 184 updates the actual impression tracker table 176G, of the MYSQL database in the MYSQL DB server 150, with actual display duration, user feedback and corresponding timestamp, upon receipt of a request for the advertisement display tracker (ADT) table 176F from the client device 102, of the MYSQL database in the MYSQL DB server 150, subsequent to display of advertisement image assets. The method 2200 proceeds to step 2212 and ends.

In some embodiments, managing display of personalized advertisements (PADs) in a UI of an onscreen IPG comprises displaying personalized advertisements during organizing and navigating at least one of AV and multimedia contents. Specifically, the method and system for managing display of personalized advertisements (PADs) facilitate displaying personalized advertisement folder icons during at least one of organizing and navigating, at least one of recorded and Linear TV AV and/or multimedia contents in a UI of at least one of a favorite channel list and recorded content organizer.

In some embodiments, users can organize at least one of recorded and Linear TV AV and/or multimedia contents into personal folders. The personal folders are labeled with identifiers identifying the users, such as the names of the users, for ease of use and navigation.

FIG. 23 depicts advertisement images displayed on folder icons in at least one of a UI of a favorite channel list and recorded content organizer.

In some embodiments, at least one of recorded and purchased AV and/or multimedia contents in one or more client devices, for example one or more of the client device 102, of FIG. 1, can be organized, based on users who at least one of recorded and purchased the AV and/or multimedia contents. Likewise, at least one of Linear AV and/or multimedia contents can be organized into different personal favorite channels using a personalized or favorite channel list, for example the favorite channel list 140, of the host UI applications 158, of FIG. 2.

FIG. 24 depicts personalized advertisements for a specific user in a UI of a favorite channel list.

For example, in FIG. 24, personalized advertisements for a specific user, such as DAD, are shown in a UI of a favorite channel list, for example the favorite channel list 140 of the host UI applications 158, comprising the application layer 202 of FIG. 2.

FIG. 25 depicts personalized advertisements for a specific user in a UI of a recorded content organizer.

For example, in FIG. 25, personalized advertisements for a specific user, such as DAD, are shown in a UI of a recorded content organizer, for example the recorded content organizer 142 of the host UI applications 158, comprising the application layer 202 of FIG. 2.

As shown in FIGS. 23-25, each user in a household may have different set of favorite channels, which can be organized into each folder 2302 labeled with the name of each user. For example, in a household including a 47 year old father, 40 year old mother, 15 year old son and 69 year old grandmother, all the favorite channels of the father will be organized under a folder labeled "DAD" with an advertisement image as the folder icon, as shown in FIG. 23. The text label below each folder icon carries the name of each user in the household to easily navigate between the different folders. Users can at least one of edit and change or rename the text label of each folder icon using, for example at least one of a software (or on-screen), virtual and standard keyboards. The folder label is unique to each user, and is paired with the unique user ID for each user. The user ID information is used to select and display personalized advertisement images in the folder icons as image slide show, with display duration for example 3 seconds, for each of the selected advertisement image cached in the client device 102.

In some embodiments, the total number of folders will be equal to the total number of users in the household. For example, as shown in FIG. 23, four folder icons with their respective labels are shown in the UI of the recorded content 142 and also in the UI of the favorite list 140, of the host UI applications 158, of FIG. 2. More the number of users more will be the number of folder icons and the UI navigation pages.

FIG. 26 depicts the status of a folder icon for a specific user, who is unregistered or not derived or known, and thus belongs to an unidentified user group.

As shown in FIG. 26, each of the folders, for example one or more of the folders 2302, of FIG. 23, are not merely plain folder icons, but will have a personalized advertisement image asset displayed inside. For example, as shown in FIG. 26, in the event that a specific user, such as MOM, who is unregistered, and thus belongs to an unidentified user group, the folder icon of a corresponding folder 2302, of FIG. 23, for the specific user will remain blank, and thus not displayed with any personalized advertisement asset image.

An advertisement asset image displayed inside the folder icon of the folder 2302 is selected based on a user group to which a user belongs to. For example, as shown in FIG. 23, the folder icon for a specific user, such as the folder icon labeled "DAD", has an advertisement asset for a real estate agency, for instance "PRUDENTIAL CALIFORNIA REALTY®. Likewise, the folder icons labeled "BROTHER" and "GRAND MOTHER" will have advertisement asset images relevant or corresponding to the user profiles. For example, the user "DAD" belongs to a user group C4EMH, and thus an advertisement asset image "REAL ESTATE AGENCY" is selected based on the asset table 176A of the MYSQL DB server 150, of FIG. 1, represented by the Table 3 therefor. In some scenarios, for example, as shown in FIG. 26, in the event that a specific user, such as MOM, who is unregistered, and thus belongs to an unidentified user group, the folder icon of a corresponding folder 2302, of FIG. 23, for the specific user will remain blank, and thus unpopulated with any personalized advertisement image asset.

For example, in some scenarios, based on the usage pattern of users it is found that the users will stay in the UI of the host UI applications 158, of FIG. 2, between a minimum of approximately 3 seconds to a maximum of approximately 30 seconds only. So, the duration of display of each advertisement image in a folder icon is configured for example for 3 seconds only, to maximize the number of impressions for an advertiser. Upon completion of the duration of display of each advertisement image in the folder icon, for example 3 seconds, the next pre-decided advertisement folder image asset based on an advertisement sequence stored in a client device, for example the client device 102, of FIG. 1, is displayed as an image slide show within the folder icon. Additionally, a company/brand logo can be added as a watermark in the image for brand promotion.

In the event that a user stays in the same page of the UI of the recorded content organizer 142 or favorite list organizer 140, for example for 12 seconds, 4 different personalized advertisement asset images will be shown one after the other, as per the advertisement sequence downloaded from a PAD server, for example the PAD server 148, of FIG. 1, and stored in the client device 102, at the boot-up.

In some scenarios, a user selects a folder icon to list the AV contents organized under a personalized folder.

As shown in FIG. 24, in use, the selection of the UI of the favorite channel list 140 of the host UI applications 158, of FIG. 2, lists the favorite channels chosen by the user for "DAD", while the selection of the UI of the recorded content organizer 142 of the host UI applications 158, of FIG. 2, lists all the AV contents recorded by the user labeled "DAD", as shown in FIG. 25. For both the UIs of the favorite channel list 140 and recorded content organizer 142, along with the AV content list and corresponding video, the advertisement image for "DAD" is also shown for 3 seconds (configurable), in the bottom right corner just below a video window 2402, of FIGS. 24 and 25. The relevant personalized advertisement images selected based on the user profile are displayed one after the other in accord with an advertisement sequence stored in the client device 102, received from the PAD server 148 during boot-up. For example, if "DAD" records 30 events or has 30 favorite channels, then the contents will be organized in five navigation pages with each page occupying around 6 events/channels.

Each UI screen corresponding to one or more host UI applications 158, for example the favorite channel list 140, recorded content organizer 142, has a unique UI identification (or UI ID) number defined for a specific application UI version of the software stack 108 of the client device 102, as shown in FIGS. 1-2.

Each UI ID paired with the user labels displayed in the UI screens of the favorite channel list 140 and recorded event organizer 142 are used to extract the corresponding user groups. Based on the user group the corresponding advertisement sequence is read from the cached memory of the client device 102 and the first image asset from the advertisement sequence is displayed on the UI screen for each user, if users in the household belong to different user groups. In the event that multiple users of the same user group are displayed in the current UI screen, then the first advertisement image from the advertisement sequence for the given user group is displayed in one folder icon and the next image from the advertisement sequence of the same user group is displayed for the subsequent folder icon and so on, until all users of the given user group are completed in the current UI screen.

In some embodiments, the system 100 facilitates display of personalized advertisements during presentation or offer of at least one of recorded, purchased AV and multimedia contents as a virtual gift from one user to another. In some embodiments, the client subsystem 102 comprises one or more client devices adapted to display personalized advertisements during presentation or offer of at least one of recorded, purchased AV and multimedia contents as a virtual gift from one user to another. For example, if a first user (or a sending user or sender) likes at least one of recorded, purchased AV and multimedia contents, for instance a movie, then the first user may like to present the movie as a virtual gift (or good) to a second user (or receiving user or recipient), for instance a friend of the first user, through (or using) the network subsystem 106.

Figure 14:
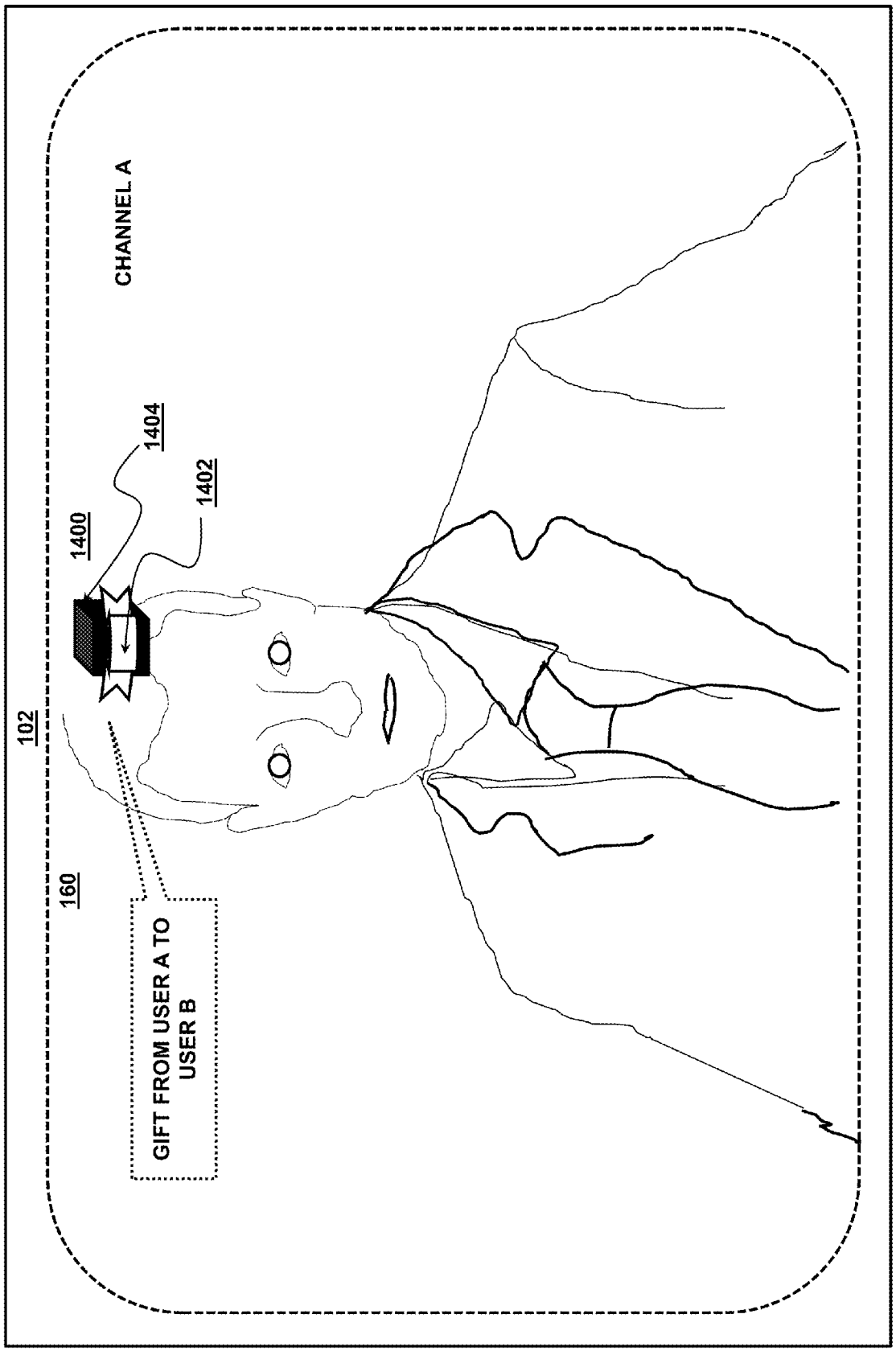
FIG. 14 depicts a watch TV application displaying a wrapped gift box icon, representing a gift box with a gift wrapper, for a virtual gift (or goods), in a watch TV onscreen display (OSD)

FIG. 14 depicts a watch TV application displaying a wrapped gift box icon, representing a gift box with a gift wrapper, for a virtual gift (or goods), in a watch TV onscreen display (OSD).

As used herein, the term "gift wrapper advertisements" refers to advertisement images displayed upon selection, access and retrieval of a wrapped gift box icon representing a gift box enfolded with a gift wrapper for a virtual gift (or good).

As shown in FIG. 14, a watch TV application, for example the watch TV application 160, of FIG. 1, renders or displays in (or through) a watch TV OSD 1400 a wrapped gift box icon 1402 representing a gift box enfolded with a gift wrapper for a virtual gift (or good) 1404, for instance a movie. Further, the gift wrapper, also represented by the gift box icon 1402, is a gift wrapper advertisement, for instance a personalized advertisement matching with the user group of the second user.

Figure 15:
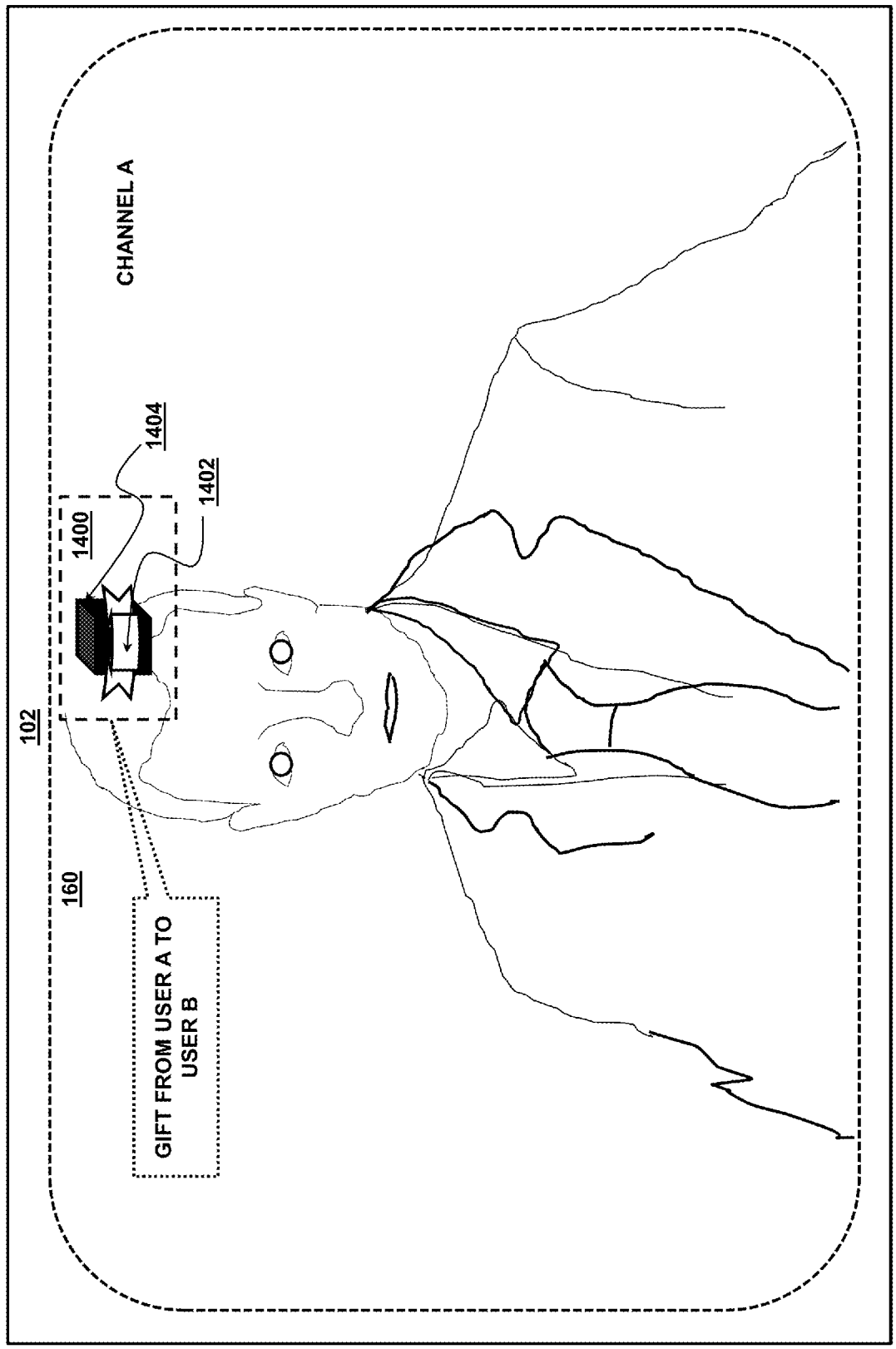
FIG. 15 depicts a selection of a wrapped gift box icon, displayed in a watch TV OSD, by a user viewing a watch TV application.

FIG. 15 depicts a selection of a wrapped gift box icon, displayed in a watch TV OSD, by a user viewing a watch TV application.

As shown in FIG. 15, upon receiving the virtual gift (or good) 1404, of FIG. 14, for instance a movie, a user selects, access and retrieves, for example by double-clicking (or selecting) and opening, the wrapped gift box icon 1402 in the watch TV OSD 1400, of FIG. 14, displayed in the watch TV application 160, of FIG. 1.

Figure 16:
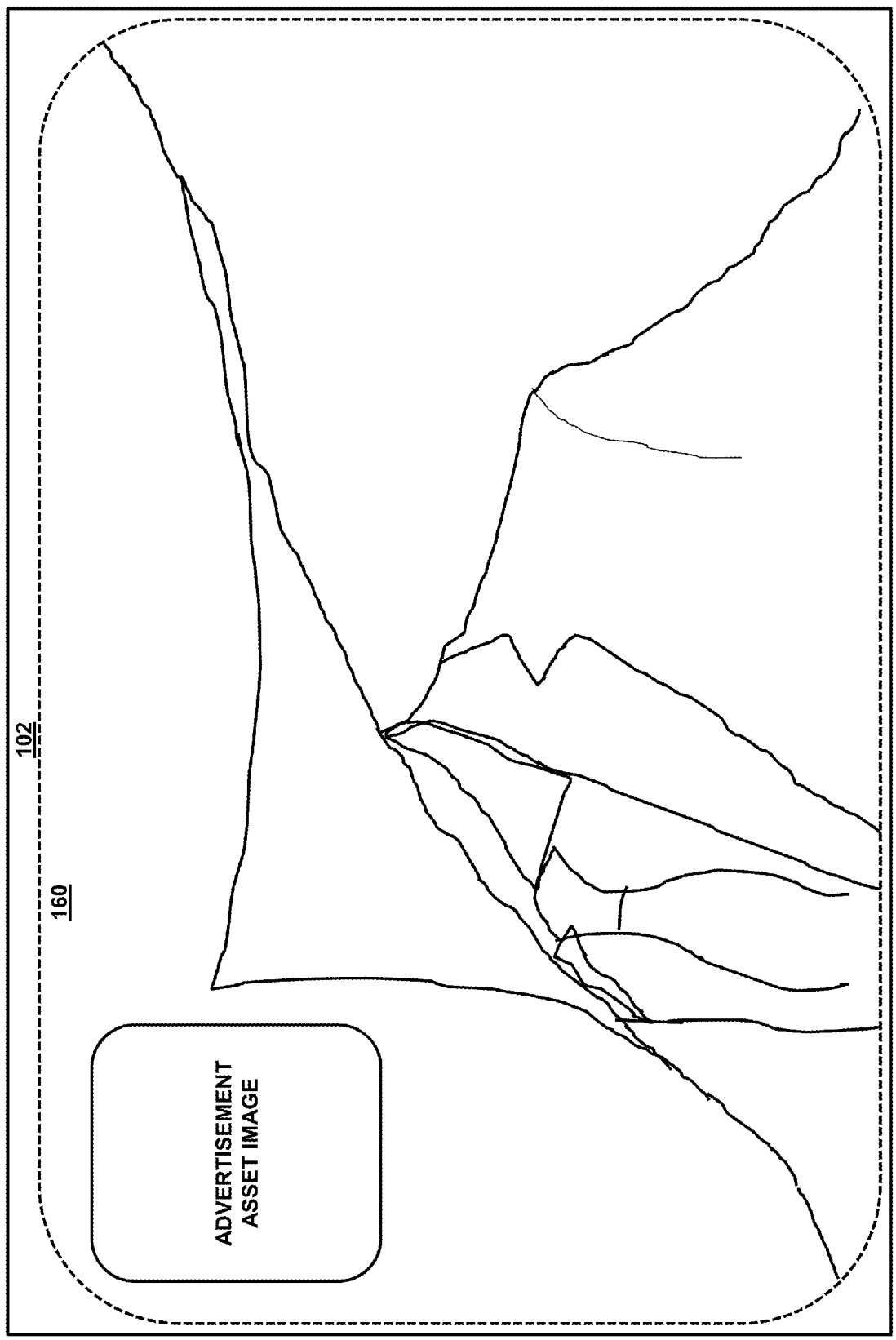
FIGS. 16 and 17 depict an unfolding of a gift wrapper advertisement upon selection, access and retrieval of a wrapped gift box icon by a user receiving the virtual gift (or goods)
Figure 17:
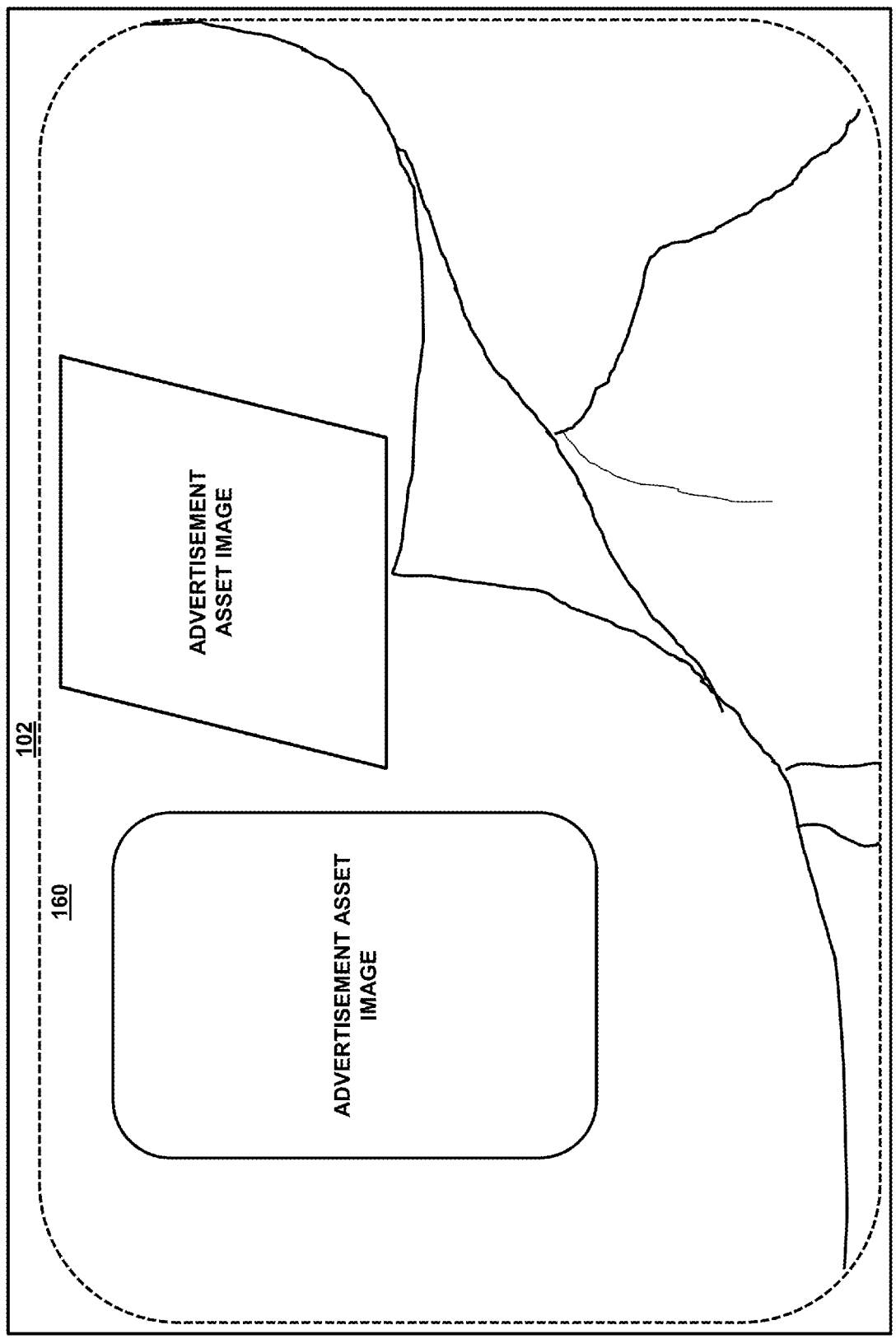

FIGS. 16 and 17 depict an unfolding of a gift wrapper advertisement upon selection, access and retrieval of a wrapped gift box icon by a user receiving the virtual gift (or good).

As shown in FIGS. 16 and 17, corresponding to the continuous unfolding or unwrapping of the gift wrapper advertisement, a personalized advertisement image transpires partially to fully on the screen on top, or in the foreground, of video displayed in watch TV application 160, of FIG. 1.

In some embodiments, the user receiving the gift, for instance a movie, may choose to at least one of retrieving more information about an advertised product, and continue downloading the gifted movie from at least one of an external storage and video server. In some embodiments, in the event that the receiving user chooses to selecting, accessing and retrieving more information about the advertised product, an advertisement companion image that gives more details about the advertised product appears. On exit from the advertisement companion, the user can watch the gifted movie by at least one of streaming and downloading the gifted movie.

Figure 18:
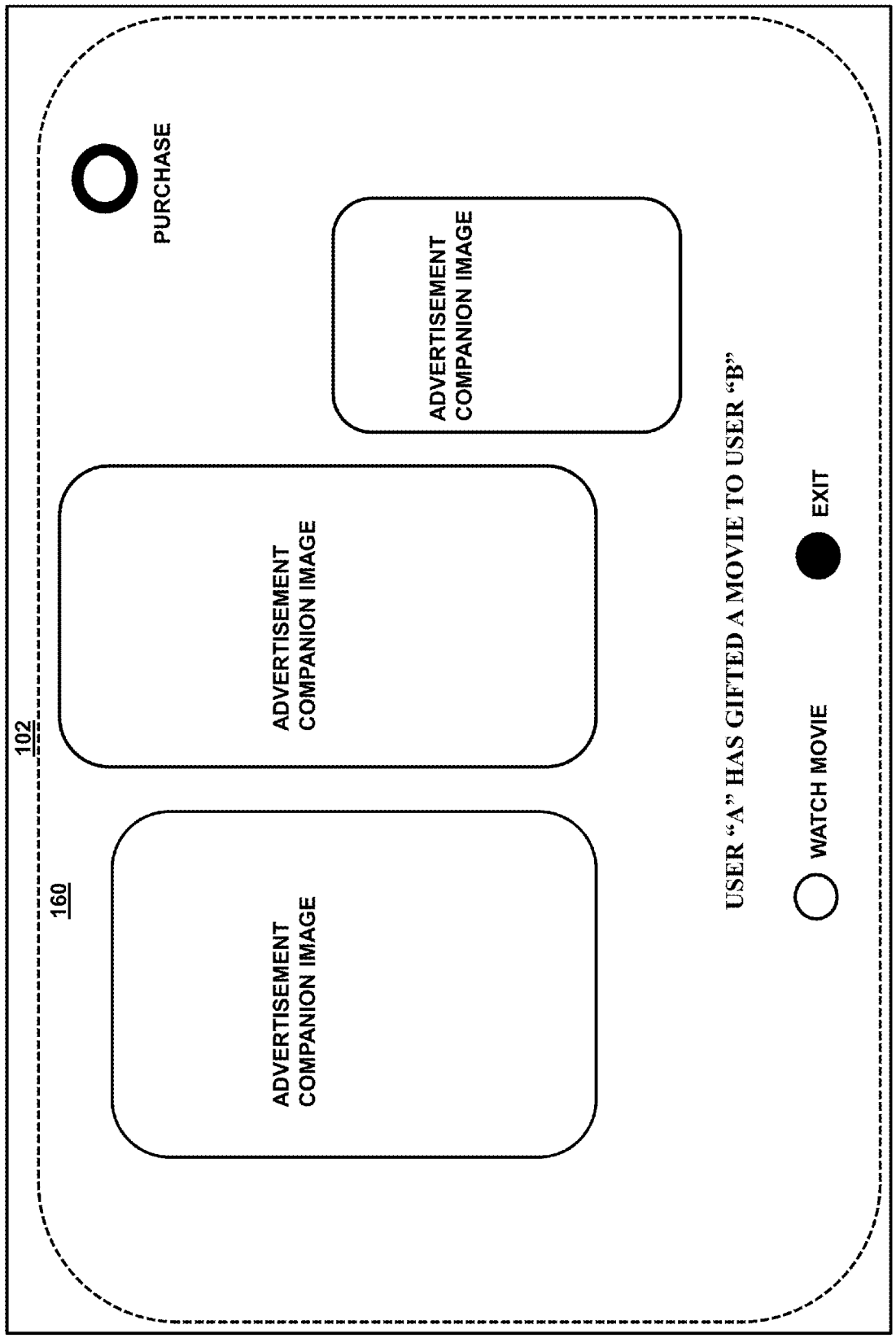
FIG. 18 depicts a gift wrapper advertisement in a fully unfolded state, thereby providing a user to choose from at least one of retrieving more information about an advertised product, and continue streaming or downloading a virtual gift.

FIG. 18 depicts a gift wrapper advertisement in a fully unfolded state, thereby providing a user to choose from at least one of retrieving more information about an advertised product, and continue streaming or downloading a virtual gift.

In some embodiments, in use, a first user wishes to present a virtual gift, for instance a movie or any other AV content, to a second user connected to a common network, for instance the network subsystem 106. The first user selects the name of the second user, and clicks a gift button (not shown here explicitly). Upon receiving the virtual gift by the first user, a client device, for instance the client device 102, of the second user sends a request for a gift wrapper advertisement to the PAD server 148, of FIG. 1. An advertisement asset image with the highest rank based on an advertisement sequence for the user group to which the second user belongs to is selected, accessed and retrieved by the advertisement selection module (ASM) 164 of the PAD server 148, as the gift wrapper advertisement. The PAD server 148 sends the URL path of the gift wrapper advertisement on a wrapped gift box icon, for instance the wrapped gift box icon 1404, representing a gift box enfolded with a gift wrapper for a virtual gift (or good) 1402, of FIG. 14, along with the URL path of the virtual gift (or good) 1402, for instance a gifted movie, to the client device 102 of the second user.

The PAD rendering module 112, residing in the watch TV application 160, of FIG. 1, of the client device 102 of the recipient, downloads an advertisement image for the gift wrapper advertisement from the advertisement asset server 152. The PAD rendering module 112 of the client device 102 of the recipient downscales the advertisement image for the gift wrapper advertisement to a stamp size, as shown in FIG. 14. In some embodiments, the recipient selects the wrapped gift box icon 1404, representing a gift box enfolded with a gift wrapper for a virtual gift (or good) 1402, of FIG. 14, to access and retrieve the gift 1402. The recipient double-clicks (or selects) and opens the gift 1402. As shown in FIGS. 16 and 17, an animation sequence provided by the PAD rendering module 112 depicts the unfolding or unwrapping of the gift wrapper advertisement image from the stamp size to full size. The animation sequence of the gift wrapper advertisement image is dependent on the graphics and display capability of the client device 102 of the recipient. An advertisement companion asset image is dynamically downloaded from the advertisement asset server 152 URL, in the event that the recipient requests for more information about the virtual gift wrapper advertisement image.

In some embodiments, the system 100 facilitates display of personalized advertisements during at least one of buffering and downloading of at least one of recorded, purchased AV and multimedia contents through network 106. In some embodiments, the client subsystem 102 comprises one or more client devices adapted to display personalized advertisements during at least one of buffering and downloading of at least one of recorded, purchased AV and multimedia contents.

Figure 19:
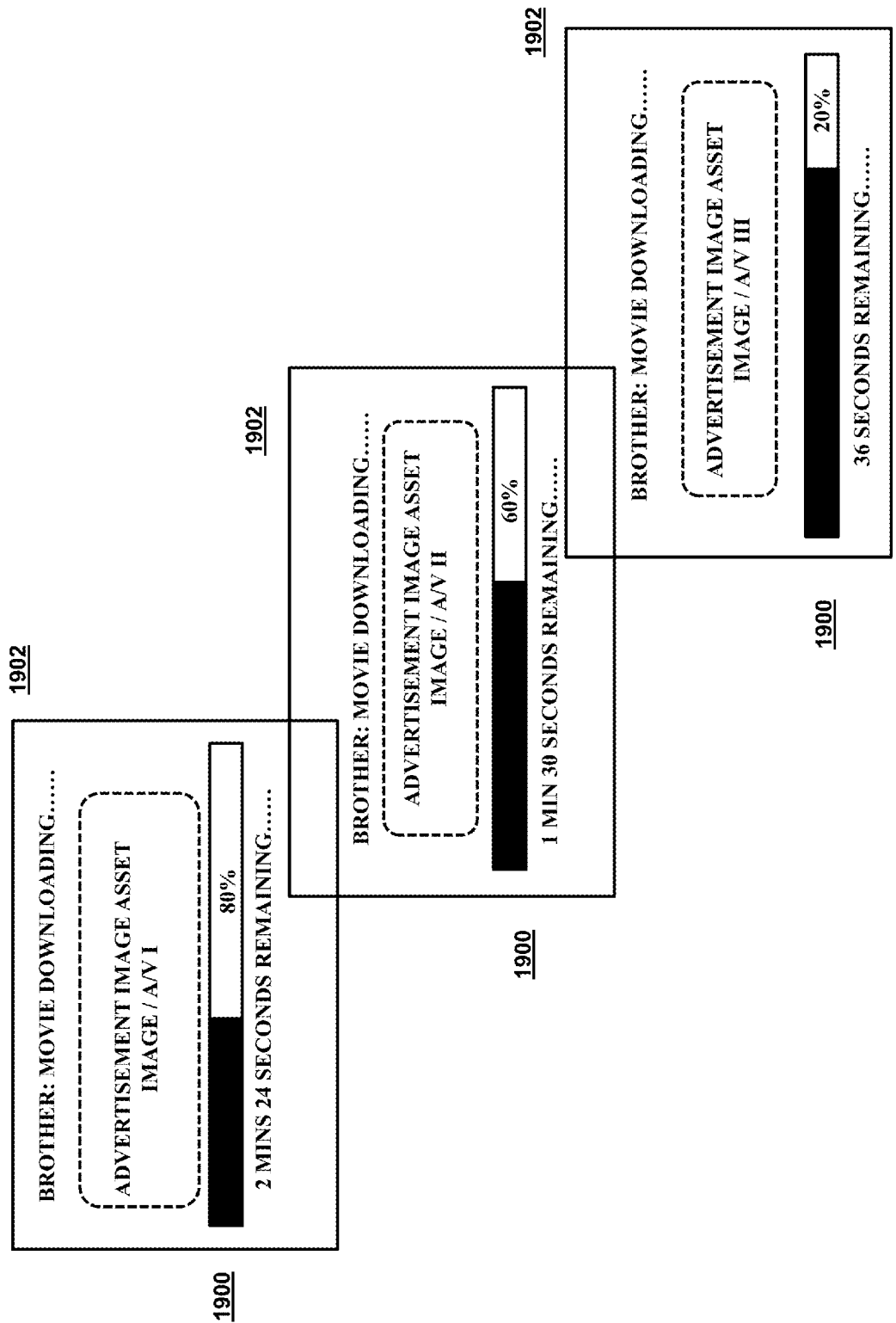
FIGS. 19 and 20 depict a watch TV application displaying a linear and circular progress bar in a watch TV onscreen display (OSD) including dynamically changing display of personalized ad images till the completion of at least one of buffering and downloading of AV content.
Figure 20:
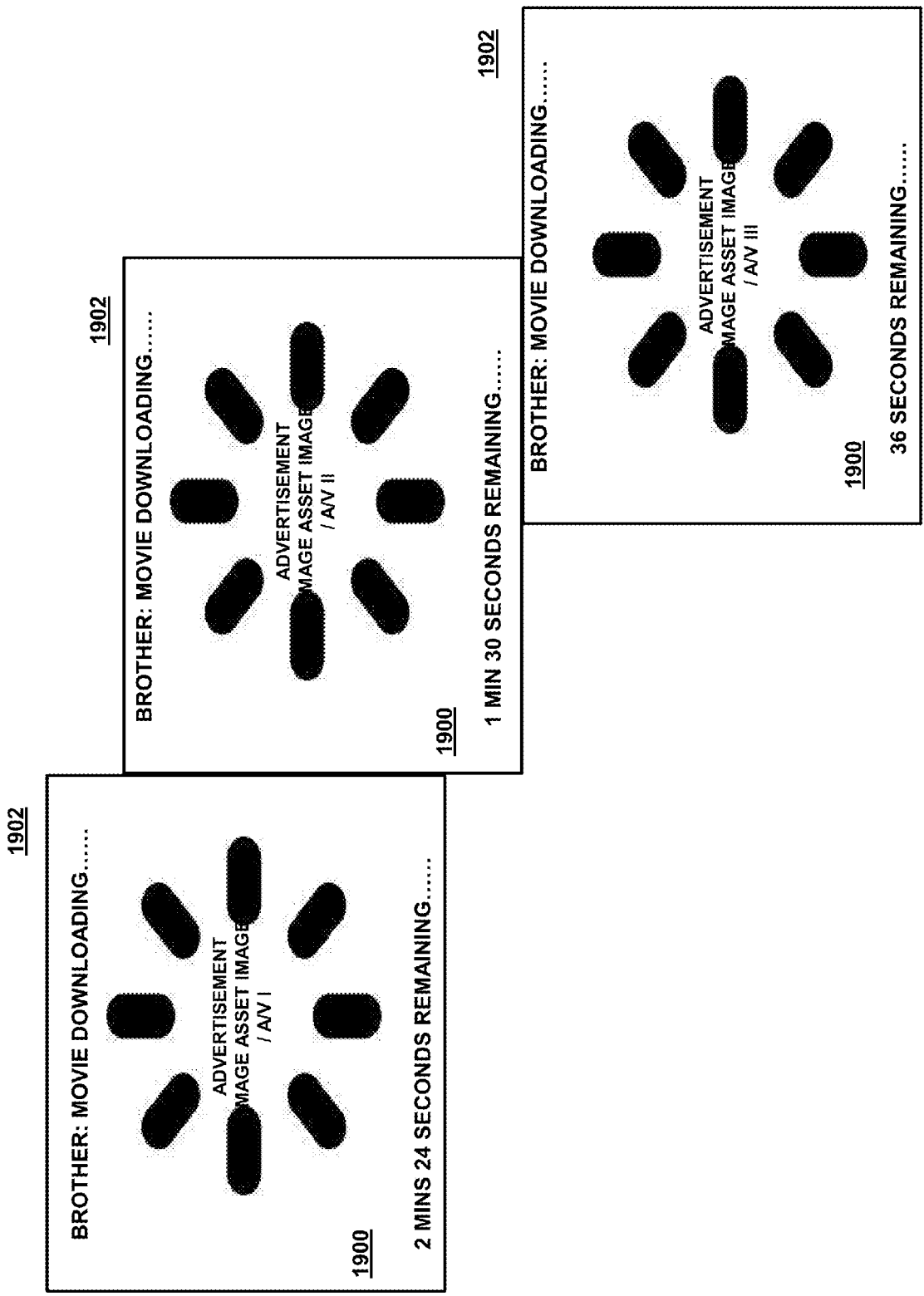
Figure 21A:
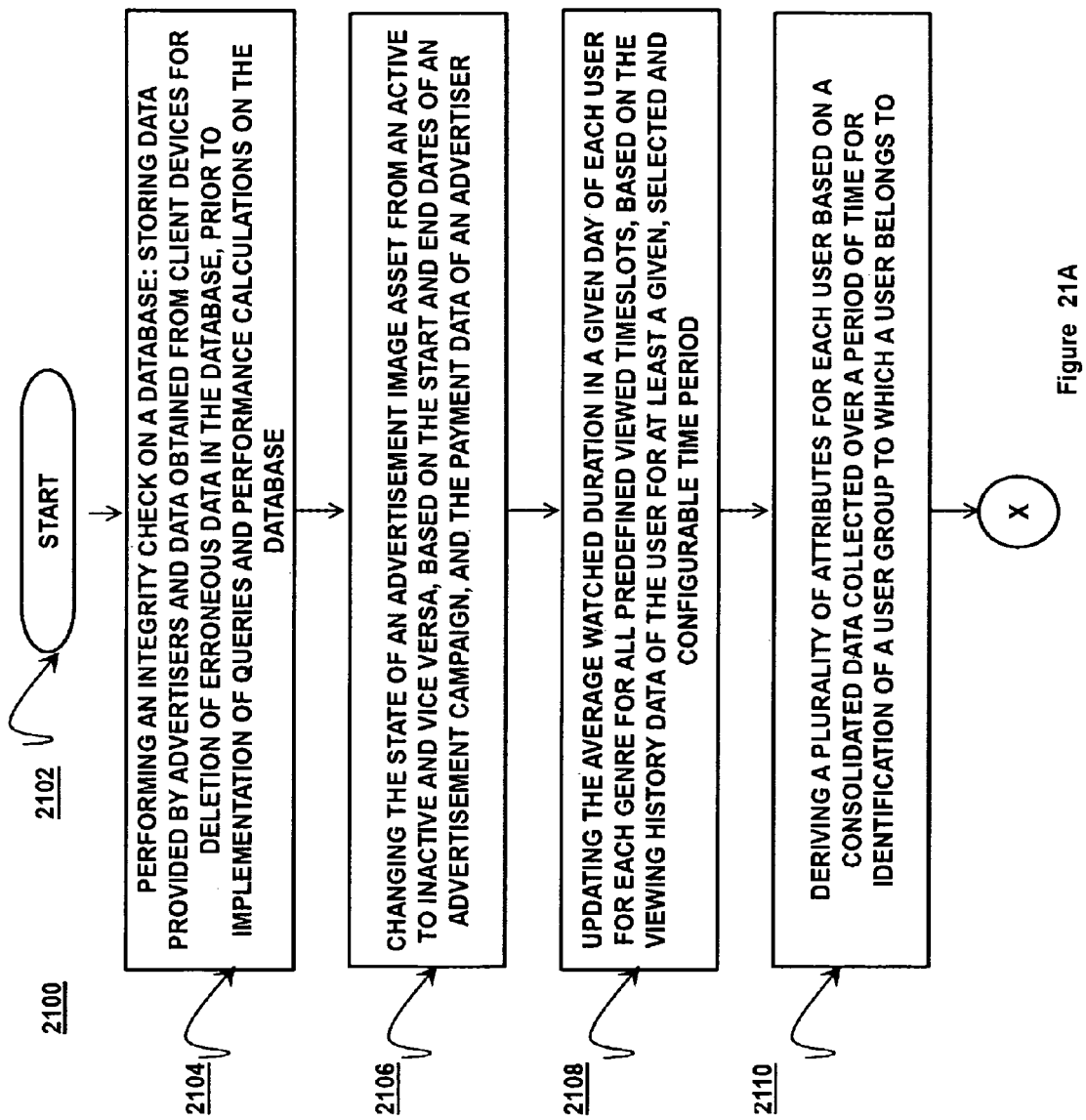

FIGS. 19 and 20 depict a watch TV application displaying a linear and circular progress bar in a watch TV onscreen display (OSD) including dynamically changing display of personalized ad images till the completion of at least one of buffering and downloading of an AV content.

In some embodiments, in use, during at least one of the buffering and downloading period, at least one of waiting, loading icon and progress bar 1900 appears in a watch TV OSD 1902, of the watch TV application 160, of FIG. 1, when at least one of recorded, purchased AV and multimedia contents stored in a cloud or an external storage, is streamed to a client device, for example the client device 102, of FIG. 1. The waiting period can be pre-calculated in the client device 102 based on the size of the at least one of recorded, purchased AV and multimedia contents being buffered, and the available network bandwidth. During the entire waiting period different advertisements can be displayed in the at least one of waiting, loading icon and progress bar 1900 based on the user group of a user.

An advertisement image asset is retrieved and resized and displayed based on the type and shape of at least one of waiting, loading icon and progress bar 1900 displayed in the watch TV OSD 1902 of the watch TV application 160, of FIG. 1, of the client device 102. For example, in some scenarios the progress bar 1900 may be a linear progress bar, as shown in FIG. 19, while in other scenarios the progress bar 1900 may be a circular progress bar, as shown in FIG. 20. Both FIGS. 19 and 20 show how different advertisement images are placed with respect to the linear and circular progress bars 1900, till the remaining waiting period for at least one of buffering and downloading AV content becomes zero.

In some embodiments, during at least one of the buffering and downloading period, if a user opts to know more about a product then user can select an advertisement for the product to access the advertisement companion asset image for the advertisement for more details. While the user accesses the advertisement companion asset image for the advertisement for more details, the downloading continues in the background without any interruption, and the progress status of the downloading in terms of percentage completion is displayed on the advertisement companion asset image. In the event that the user exits out of the advertisement companion asset image, the user can watch the downloaded AV content.

The embodiments of the present invention may be embodied as methods, system, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A method for managing display of personalized advertisements in a user interface (UI) of an on-screen interactive program guide (IPG), the method comprising:
   determining whether a user group of a current primary user matches with at least one of targeted user groups;
   selectively adding advertisement asset images corresponding to the matched user group into an advertisement bouquet;
   calculating a number of impressions of each of the advertisement asset images to display to the current primary user on a given day, wherein the number of impressions for each of the advertisement asset images displayed to the current primary user on a preceding day is updated in an actual impression tracker table of a database (DB) server, as part of a first tier daily-based wakeup tasks for the given day;
   calculating an advertisement sequence for each of the advertisement asset images to display to the current primary user on the given day;
   optimizing performance for delivery and display of the advertisement asset images comprises:
      finding the number of targeted impressions for each advertisement asset image in the advertisement sequence,
      implementing the first tier daily-based wakeup tasks during the graveyard slot, and
      implementing second tier dynamic on-the-fly tasks performed on a request from a client device; and
   displaying the advertisement asset images during at least one of organizing, navigating, gifting, downloading and buffering at least one of AV and multimedia contents, wherein the advertisement asset images are displayed in the areas in the folder icons in a favorite channel list and recorded content organizer.

2. The method of claim 1, wherein determining whether the user group of the current primary user matches with at least one of the targeted user groups comprises:
   identifying the current primary user and the user group for the current primary user, wherein identifying the current primary user and the user group for the current primary user comprises:
      scanning an input fingerprint of each user on each one of frequently used control keys of a remote control of a client device,
      comparing the input fingerprint of each user with a reference fingerprint of the current primary user, and
      deriving a user identifier information of the current primary user based on the comparison.

3. The method of claim 1, wherein calculating the number of impressions of advertisement asset images to display to the current primary user on the given day is based on the total number of impressions of an advertisement asset image for at least one of a product and service specified by an advertiser under an advertisement campaign, the duration in days of the advertisement campaign specified by the advertiser and the number of users in a targeted user group to which the advertisement asset image for at least one of the product and service is to be served.

4. The method of claim 3, wherein the. number of impressions of advertisement asset images to display to the current primary user for the given day is calculated daily, for all active advertisement asset images, as part of a first tier daily-based wakeup tasks, since the remaining duration in days of the advertisement campaign and the total number of remaining impressions for all active advertisement asset images change every day.

5. The method of claim 4, wherein the number of impressions for an advertisement asset image displayed to all users on a preceding day is updated in an actual impression tracker table of a database (DB) server, as part of the first tier daily-based wakeup tasks for the given day, and wherein updating the number of impressions for the advertisement asset image displayed to all the users on the preceding day in the actual impression tracker table comprises:
   determining the achievement of the target number of impressions for the advertisement asset image for the current day,
   adding a backlog number of impressions to the total remaining impressions upon failure to achieve the target number of impressions for the advertisement asset image for the current day, and
   computing the total remaining impressions as a difference of the total remaining impressions on a start day of the advertisement campaign and the cumulative number of impressions displayed till the preceding day for all users for an advertisement asset image.

6. The method of claim 5, wherein the computing the total remaining impressions for the advertisement asset image comprises:
   representing the total remaining impressions of the advertisement asset image via the area of a right-angled triangle,
   representing the remaining advertisement campaign period calculated every day via the base of the right-angled triangle, and
   representing the target number of impressions for the current day for the advertisement image asset across targeted users via the height of the right-angled triangle.

7. The method of claim 1, wherein the calculating the advertisement sequence for each of the advertisement asset images to display to the current primary user comprises:
   determining a sequence for display of the advertisement asset images for the user group of the current primary user based on a priority of the advertisement asset images, an expected revenue, a brand value, a loyalty index of an advertiser, and a remaining number of advertisement impressions derived from the total remaining impressions and remaining duration in days of the advertisement campaign.

8. The method of claim 7, wherein the determining the sequence for display of the advertisement asset images for the user group of the current primary user comprises:
   (a) generating an advertisement sequence for each cycle of opportunity for an advertisement bouquet,
   (b) concatenating the advertisement sequence for each cycle of opportunity,
   (c) storing the concatenated advertisement sequence for each cycle of opportunity for the user group until the targeted impressions and ranking indices of all advertisement assets in the advertisement bouquet for the user group for a given day becomes zero, and
   (d) repeating steps (a)-(c) for each advertisement bouquet.

9. The method of claim 1, wherein the optimizing performance for delivery and display of the advertisement asset images comprises:
   finding the number of targeted impressions for each advertisement asset image in the advertisement sequence comprising:

(a) retrieving and storing at least first three (3) advertisement asset images based on ranking indices of the advertisement asset images in the advertisement sequence,
(b) displaying each of the first three (3) advertisement asset images,
(c) determining whether at least one of next three (3) advertisement asset images in the advertisement sequence is different from each of the first three (3) advertisement asset images,
(d) displaying at least one of the first three (3) advertisement asset images in the advertisement sequence, with a lowest ranking index,
(e) fetching a new advertisement asset image from an advertisement asset server,
(f) replacing at least one of the first three (3) advertisement asset images in the advertisement sequence having the lowest ranking index with the newly fetched advertisement asset image, and
(g) repeating steps (a)-(f) until at least one of a validity date and a planned number of impressions are completed.

10. The method of claim 1, wherein the optimizing performance for delivery and display of the advertisement asset images further comprises:
implementation of a first tier daily-based wakeup tasks during the graveyard slot comprising:
changing the state of the advertisement image assets from active to inactive and vice versa based on the start and end dates of advertisement campaigns, and the payment data of advertisers,
performing an integrity check on a database storing data provided by advertisers and data obtained from client devices for deletion of erroneous data in the database, prior to implementation of queries and performance of calculations on the database,
calculating the number of advertisement impressions each day for each user for all active advertisement asset images to be delivered to all identified user groups,
creating an advertisement sequence for delivery of the advertisement image assets for a given day for each advertisement bouquet for all the identified user groups,
deriving a plurality of attributes for each user based on a consolidated data collected over a period of time for identification of a user group to which a user belongs to,
transcoding advertisement image assets based on a lookup table of image formats supported by each of the client devices,
synchronizing between at least one of a personalized advertisement (PAD) server and an advertisement asset server and respective proxies located across different geographical locations,
updating the cumulative actual impressions for each advertisement image asset displayed across users in an asset table maintaining details related to each advertisement asset image, and
updating the average watched duration for a given day of each user for each genre for all predefined viewed timeslots, based on the viewing historical data of a user for at least a given, selected and configurable time period.

11. The method of claim 1, wherein the optimizing performance for delivery and display of the advertisement asset images comprises:
finding the number of targeted impressions for each advertisement asset image in the advertisement sequence,
implementing the first tier daily-based wakeup tasks during the graveyard slot, and
implementation of a second tier dynamic on-the-fly tasks performed on a request from the client device comprising:
parsing capability requests from client devices during the first time asynchronous booting up of the client devices for storage of the capability requests in the database,
upon receipt of a request for an advertisement display tracker from the client device upon display of the advertisement asset images, updating an actual impression tracker with actual impressions and corresponding timestamp for the current primary user, as well as the advertisement display tracker with actual display duration, user feedback and the corresponding timestamp,
determining whether the persistent storage of the client device has in cache an advertisement asset image for extraction of the binary (or executable) file of an advertisement asset image to send to a requesting client device, and
extracting the binary file of a corresponding advertisement companion of the advertisement asset image to send to the requesting client device.

12. A system for managing display of personalized' advertisements in a user-interface (UI) of an on-screen interactive program guide (IPG), the system comprising:
a client subsystem comprising:
a personalized advertisements plug-in (PAP) component; and a server subsystem comprising: a personalized advertisement (PAD) server and a processing unit configured to:
select an advertisement bouquet based on a user group of a current primary user,
calculate number of impressions of each advertisement asset image in the selected advertisement bouquet to display to the current primary-user on a given day, wherein the number of impressions for each of the advertisement asset images displayed to the current primary user on a preceding day is updated in an actual impression tracker table of a database ODB) server as part of the first daily based wakeup tasks for the given day calculate an advertisement sequence for each of the advertisement asset images to display to the current primary user on the given day, and
optimize delivery and display:
the number of targeted impressions for each advertisement asset image in the advertisement sequence;
implement the first tier daily-based wakeup tasks during the graveyard slot;
implement second tier dynamic on-the-fly tasks performed on a request from a client device and;
display the advertisement asset images during at least one of organizing, navigating, gifting, downloading and buffering at least one of AV and multimedia contents.

13. The system of claim 12, wherein the PAP component has a logical three (3)-layer architecture comprising:
an application layer, wherein the application layer comprises one or more host user interface (UI) applications and a personalized advertisement (PAD) rendering module,
a middleware layer and wherein the middleware layer comprises an initialization module , a Personalized Advertisement Plug-in Interface (PAPI) layer, a caching module , statistical engine, server communication module, an Extensible Markup Language (XML) utility, a storage utility, state machine module and a personalized advertisements (PADs) glue interface layer, and a hardware (H/W) abstraction layer and device driver.

14. The system of claim 13, wherein the host user interface (UI) applications comprises a favorite channel list, recorded content organizer, an Audio Visual (AV) (or multimedia) buffer (or download) On-Screen Display (OSD) user interface (UI), a gift message OSD UI and a watch TV application and wherein each of the host user interface (UI) applications comprise an instance of the personalized advertisement (PAD) rendering circuitry for displaying personalized advertisements for specific users in at least one of the host user interface (UI) applications using the PAPI layer.

15. The system of claim 12, wherein the server subsystem comprises the PAD server, a database (DB) server, an advertisement asset server, a web server and billing server, wherein the PAD server comprises a XML communication module, wherein the DB server comprises an asset table, a statistical engine table, user group table, an advertisement sequence table, a whoami table, an advertisement display tracker table, an actual impression tracker table, a billing table and an average watch duration table.

16. The system of claim 12, wherein the client subsystem comprises client devices adapted to display PADs during organization and navigation of at least of AV and multimedia contents in the favorite channel list and recorded content organizer, and wherein each of the favorite channel list and recorded content organizer comprise an instance of the personalized advertisement (PAD) rendering module for displaying personalized advertisements for specific users in at least one of the host user interface (UI) applications using the PAPI layer.

17. The system of claim 16, wherein the PADs are displayed as an image slideshow in the areas in the folder icons during organization and navigation of at least of AV and multimedia contents in the favorite channel list and recorded content organizer.

18. The system of claim 12, wherein the client subsystem comprises client devices adapted to display PADs during gifting at least one of recorded and purchased AV and multimedia contents.

19. The system of claim 18, wherein the PADs are displayed as at least one of still images, videos and animations during gifting at least one of recorded and purchased AV and multimedia contents.

20. The system of claim 12, wherein the client subsystem comprises client devices adapted to display PADs during at least one of downloading and buffering at least one of AV and multimedia contents to the client devices.

* * * * *